(12) United States Patent
Nagaraja et al.

(10) Patent No.: US 12,726,522 B2
(45) Date of Patent: Sep. 1, 2026

(54) ACTIVITY MONITORING DURING UNLOCKED STATE OF SECURITY POLICIES WITHIN A CLOUD ENVIRONMENT

(71) Applicant: Oracle International Corporation, Redwood Shores, CA (US)

(72) Inventors: Girish Nagaraja, Seattle, WA (US); Vineet Sarda, Seattle, WA (US); Choon Chea Chua, Seattle, WA (US)

(73) Assignee: Oracle International Corporation, Redwood Shores (CA)

( * ) Notice: Subject to any disclaimer, the term of this patent is extended or adjusted under 35 U.S.C. 154(b) by 24 days.

(21) Appl. No.: 18/967,214

(22) Filed: Dec. 3, 2024

(65) Prior Publication Data

US 2026/0156156 A1 Jun. 4, 2026

(51) Int. Cl.
*H04L 9/40* (2022.01)

(52) U.S. Cl.
CPC .................................... *H04L 63/20* (2013.01)

(58) Field of Classification Search
CPC ....................................................... H04L 63/20
See application file for complete search history.

(56) References Cited

U.S. PATENT DOCUMENTS 9,396,145 B1 * 7/2016 Chu .................... G06F 11/3466
2012/0185913 A1 * 7/2012 Martinez ............. G06F 9/45558 726/1
2017/0093913 A1 3/2017 Summers et al.
2017/0223026 A1 8/2017 Amiri et al.
2019/0364020 A1 11/2019 Wardell et al.
2020/0364078 A1 11/2020 Potter
2022/0060517 A1 2/2022 Dozorets et al.
2022/0245256 A1 * 8/2022 Wang .................... G06F 21/316
2024/0070037 A1 * 2/2024 Arora ........................ G06F 9/54
2024/0348657 A1 10/2024 Tembey et al.
(Continued)

OTHER PUBLICATIONS

Kappes et al., "Multitenant Access Control for Cloud-Aware Distributed Filesystems," 2019. In IEEE Transactions on Dependable and Secure Computing, vol. 16, No. 6, pp. 1070-1085, Nov. 1-Dec. 2019, doi: 10.1109/TDSC.2017.2715839.
(Continued)

*Primary Examiner* — Ayoub Alata
(74) *Attorney, Agent, or Firm* — Mughal Gaudry & Franklin PC

(57) ABSTRACT

Techniques for monitoring activity during an unlocked state of one or more security policies associated with a security zone of a tenancy of a cloud environment are disclosed. A request to temporarily unlock the one or more security policies is received. The plurality of security policies are applicable to the security zone that encompasses a plurality of cloud resources of the tenancy. The one or more security policies are unlocked. While the one or more security policies are unlocked, a plurality of application programming interface (API) calls destined for the plurality of cloud resources within the security zone are logged. In an example, the logging is performed in response to, or simultaneous with unlocking the one or more security policies, such that prior to unlocking the one or more security policies, API calls destined for the plurality of cloud resources within the security zone are not logged.

22 Claims, 23 Drawing Sheets

(56) References Cited

U.S. PATENT DOCUMENTS

| | | | |
|---|---|---|---|
| 2024/0364707 | A1 | 10/2024 | Elmenshawy et al. |
| 2025/0310379 | A1 | 10/2025 | Pannala et al. |
| 2025/0373611 | A1 | 12/2025 | Ferenczi |

OTHER PUBLICATIONS

Non-Final Office Action for U.S. Appl. No. 18/967,203 notified May 4, 2026.

* cited by examiner

Figure 2:
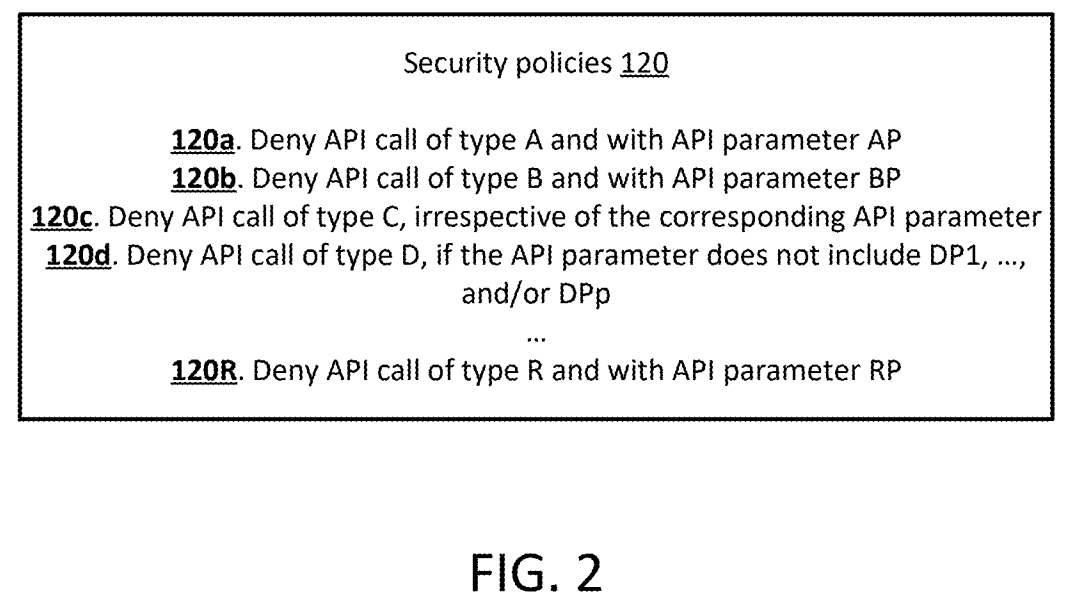

Security policies 120

120a. Deny API call of type A and with API parameter AP
120b. Deny API call of type B and with API parameter BP
120c. Deny API call of type C, irrespective of the corresponding API parameter
120d. Deny API call of type D, if the API parameter does not include DP1, ..., and/or DPp
...
120R. Deny API call of type R and with API parameter RP

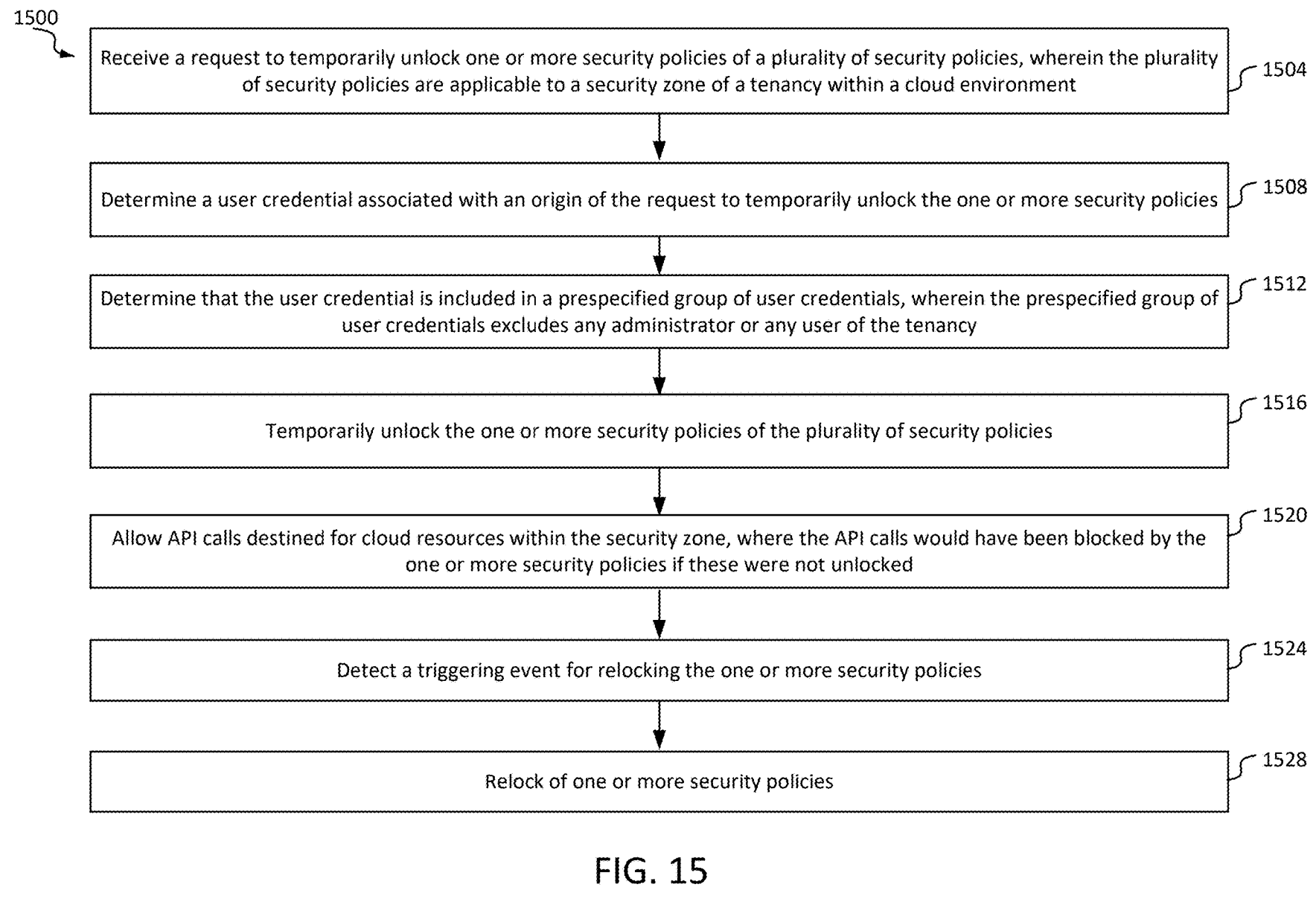

1504 Receive a request to temporarily unlock one or more security policies of a plurality of security policies, wherein the plurality of security policies are applicable to a security zone of a tenancy within a cloud environment 1508 Determine a user credential associated with an origin of the request to temporarily unlock the one or more security policies 1512 Determine that the user credential is included in a prespecified group of user credentials, wherein the prespecified group of user credentials excludes any administrator or any user of the tenancy 1516 Temporarily unlock the one or more security policies of the plurality of security policies 1520 Allow API calls destined for cloud resources within the security zone, where the API calls would have been blocked by the one or more security policies if these were not unlocked 1524 Detect a triggering event for relocking the one or more security policies 1528 Relock of one or more security policies

FIG. 15

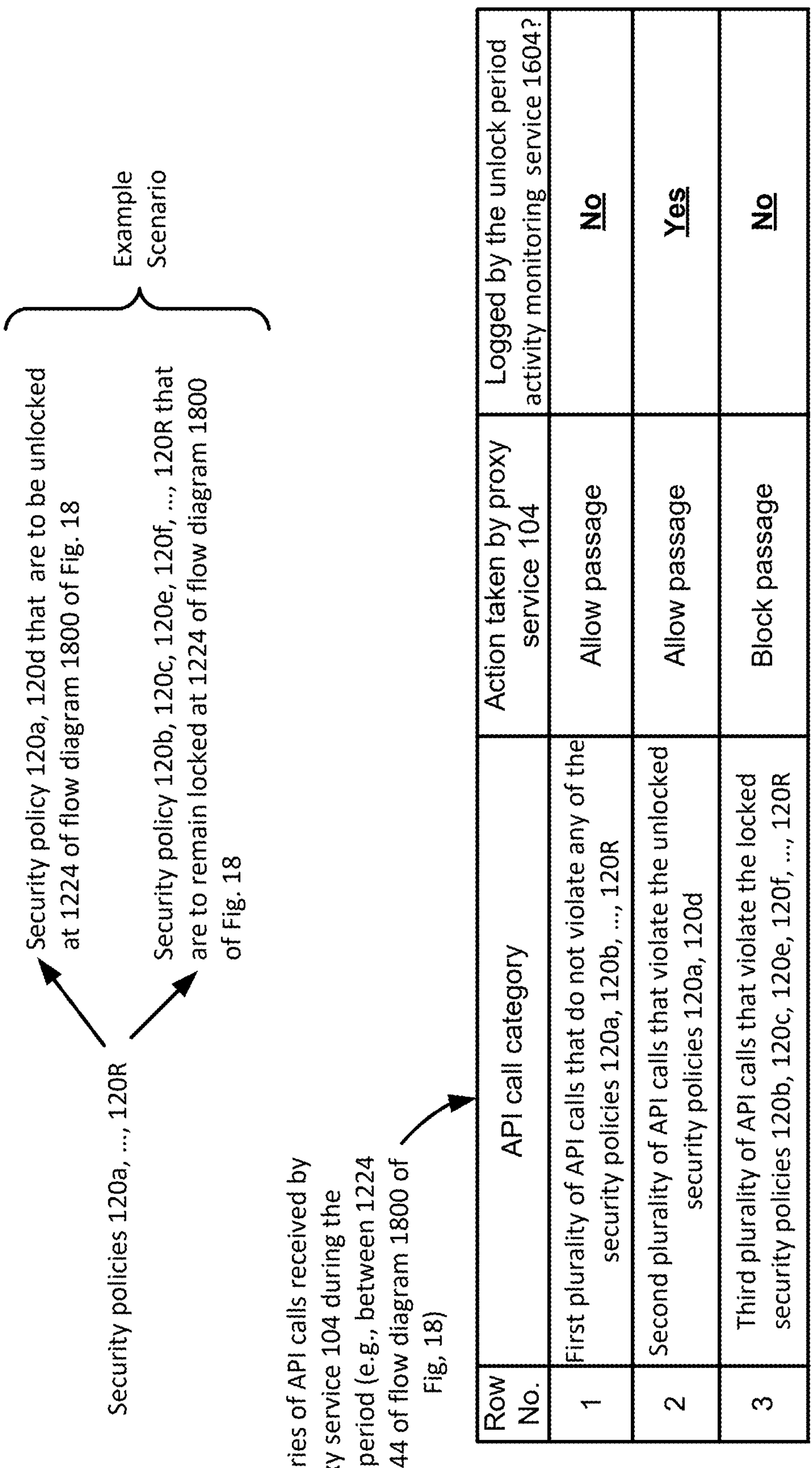

| Row No. | API call category | Action taken by proxy service 104 | Logged by the unlock period activity monitoring service 1604? |
|---|---|---|---|
| 1 | First plurality of API calls that do not violate any of the security policies 120a, 120b, ..., 120R | Allow passage | **No** |
| 2 | Second plurality of API calls that violate the unlocked security policies 120a, 120d | Allow passage | **Yes** |
| 3 | Third plurality of API calls that violate the locked security policies 120b, 120c, 120e, 120f, ..., 120R | Block passage | **No** |

FIG. 19

ACTIVITY MONITORING DURING UNLOCKED STATE OF SECURITY POLICIES WITHIN A CLOUD ENVIRONMENT

BACKGROUND

A cloud provider provides on-demand, scalable computing resources of a cloud environment to its cloud customers. A cloud customer generally desires to run its cloud resources without monitoring, scanning, or other interference by the cloud provider or other cloud customers. Therefore, the cloud provider offers "tenancies" to its cloud customers. A tenancy is an isolated partition within the cloud environment, such that resources in different tenancies are isolated from each other unless explicitly shared. Each tenancy runs a plurality of virtual machine compute instances.

BRIEF SUMMARY

In some embodiments, a non-transitory computer-readable medium includes instructions that when executed by one or more processors, cause a system including the one or more processors to perform operations including: receiving an application programming interface (API) call destined for a cloud resource that is within a security zone of a tenancy of a cloud environment; determining a call type and a call parameter associated with the API call; determining (i) a match between the call type of the API call and a predefined call type of a security policy applicable to the security zone, and (ii) a match between the call parameter of the API call and a predefined call parameter of the security policy; and blocking passage of the API call to the cloud resource within the security zone, based at least in part on determining (i) the match between the call type of the API call and the predefined call type, and (ii) the match between the call parameter of the API call and the predefined call parameter.

In an example, the API call is a first API call, the call type is a first call type, the call parameter is a first call parameter, the predefined call type is a first predefined call type, the predefined call parameter is a first predefined call parameter, and wherein the operations further include: receiving a second API call destined for the cloud resource that is (i) within the security zone of the tenancy of the cloud environment and (ii) also within an access control zone of the tenancy of the cloud environment; determining that a second call type and a second call parameter associated with the second API call does not match with predefined call types and predefined call parameters of any of a plurality of security policies; determining that the second call type and the second call parameter associated with the second API call match with a second predefined call type and a second predefined call parameter, respectively, of at least one access control policy of a plurality of access control policies; and allowing passage of the second API call to the cloud resource. In an example, the security zone of the tenancy in part, and not fully, overlaps with the access control zone of the tenancy. In an example, the operations further include: receiving a request to modify or delete an access control policy of the plurality of access control policies; determining that the request to modify or delete the access control policy of the plurality of access control policies is from a user credential of an administrator or a user of the tenancy; and allowing the request to modify or delete the access control policy of the plurality of access control policies. In an example, the operations further include: receiving a request to modify or delete a security policy of a plurality of security policies; determining that the request to modify or delete the security policy of the plurality of security policies is from a user credential of an administrator or a user of the tenancy; and rejecting the request to modify or delete the security policy of the plurality of security policies, in response to determining that the request to modify or delete the security policy of the plurality of security policies is from the user credential of the administrator or the user of the tenancy. In an example, the operations further include: receiving a request to modify or delete a security policy of a plurality of security policies; determining that the request to modify or delete the security policy of the plurality of security policies is from a user credential of an administrator or a user of another tenancy that is different from the tenancy in which the security zone is implemented; and allowing the request to modify or delete the security policy of the plurality of security policies, based at least in part on determining that the request is from the user credential of the administrator or the user of the other tenancy different from the tenancy in which the security zone is implemented. In an example, allowing the request to modify or delete the security policy of the plurality of security policies further comprises: receiving a cryptographic key along with the request to modify or delete the security policy of the plurality of security policies; authenticating the cryptographic key; and allowing the request to modify or delete the security policy of the plurality of security policies, based at least in part on (i) determining that the request is from the user credential of the administrator or the user of the other tenancy different from the tenancy in which the security zone is implemented and (ii) authenticating the cryptographic key.

In an example, the API call is a first API call, the call type is a first call type, the call parameter is a first call parameter, the predefined call type is a first predefined call type, the predefined call parameter is a first predefined call parameter, and wherein the operations further include: receiving a second API call destined for the cloud resource that is (i) within the security zone of the tenancy of the cloud environment and (ii) also within an access control zone; blocking passage of the second API call to the cloud resource, in response to at least one of: a second call type and a second call parameter associated with the second API call matching with a second predefined call type and a second predefined call parameter, respectively, of at least one a plurality of security policies; and the second call type and the second call parameter associated with the second API call not matching with predefined call types and predefined call parameters any of a plurality of access control policies.

In an example, the API call is a first API call, the call type is a first call type, the call parameter is a first call parameter, the predefined call type is a first predefined call type, the predefined call parameter is a first predefined call parameter, and wherein the operations further include: receiving a second API call destined for the cloud resource that is (i) within the security zone of the tenancy of the cloud environment and (ii) also within an access control zone; allowing passage of the second API call to the cloud resource, in response to both of: a second call type and a second call parameter associated with the second API call not matching with predefined call types and predefined call parameters of any of a plurality of security policies; and the second call type and the second call parameter associated with the second API call matching with a second predefined call type and a second predefined call parameter, respectively, of at least one a plurality of access control policies. In an example, the predefined call type of the security policy is for adding a user identification (ID) to a group of the tenancy;

and the predefined call parameter of the security policy indicates a group name of the tenancy to be an administrator group of the tenancy, such that the security policy is associated with denying API calls to add a user ID to an administrator group of the tenancy. In an example, the predefined call type of the security policy is for creating a compute instance; and the predefined call parameter of the security policy indicates a list of safe images for creating a compute instance, such that the security policy is associated with denying API calls to create a compute instance from an image not listed in the list of safe images. In an example, the predefined call type of the security policy is for terminating a compute instance; and the predefined call parameter of the security policy indicates a predefined type of compute instance, such that the security policy is associated with denying API calls to terminate a compute instance of the predefined type of compute instance. In an example, the security zone encompasses one of (i) an entirety of the tenancy, or (ii) one or more compartments within the tenancy, and not the entirety of the tenancy. In an example, the operations further include: storing the security policy in a storage repository that is within the security zone of the tenancy of the cloud environment.

In some embodiments, a method comprises: implementing a security policy within a security zone of a first tenancy of a cloud environment, wherein the security policy is associated with denying API calls having a first predefined call type and a first predefined call parameter; implementing an access control policy within an access control zone of the first tenancy of the cloud environment, wherein the access control policy is associated with allowing API calls having a second predefined call type and a second predefined call parameter; receiving, from a first credential of a first user or a first administrator of the first tenancy, (i) a first request to alter the security policy and (i) a second request to alter the access control policy; receiving, from a second credential of a second user or a second administrator of second tenancy different from the first tenancy, a third request to alter the security policy; denying the first request to alter the security policy; and allowing (ii) the second request to alter the access control policy, and (ii) the third request to alter the security policy. In an example, the security policy (i) cannot be altered by any user or any administrator of the first tenancy, and (ii) can be altered by a first predefined group of users of the second tenancy or a first predefined group of administrators of the second tenancy. In an example, the access control (i) can be altered by a predefined group of users or administrators of the first tenancy, and (ii) cannot be altered by any user or administrator of the second tenancy. In an example, the security zone encompasses one of (i) an entirety of the first tenancy, or (ii) first one or more compartments within the first tenancy, and not the entirety of the first tenancy; and the access control zone encompasses one of (i) the entirety of the first tenancy, or (ii) second one or more compartments within the first tenancy, and not the entirety of the first tenancy.

In some embodiments, a system comprises: one or more processors; and one or more non-transitory computer-readable media storing instructions, which, when executed by the system, cause the system to perform operations including: receiving an application programming interface (API) call destined for a cloud resource that is within a security zone of a tenancy of a cloud environment; determining a call type and a call parameter associated with the API call; determining (i) a match between the call type of the API call and a predefined call type of a security policy applicable to the security zone, and (ii) a match between the call parameter of the API call and a predefined call parameter of the security policy; and blocking passage of the API call to the cloud resource within the security zone, based at least in part on determining (i) the match between the call type of the API call and the predefined call type, and (ii) the match between the call parameter of the API call and the predefined call parameter. In an example, the API call is a first API call, the call type is a first call type, the call parameter is a first call parameter, the predefined call type is a first predefined call type, the predefined call parameter is a first predefined call parameter, and wherein the operations further include: receiving a second API call destined for the cloud resource that is (i) within the security zone of the tenancy of the cloud environment and (ii) also within an access control zone; determining that a second call type and a second call parameter associated with the second API call does not match with predefined call types and predefined call parameters of any of a plurality of security policies; determining that the second call type and the second call parameter associated with the second API call match with a second predefined call type and a second predefined call parameter, respectively, of at least one access control policy of a plurality of access control policies; and allowing passage of the second API call to the cloud resource.

In some embodiments, a non-transitory computer-readable medium includes instructions that when executed by one or more processors, cause a system including the one or more processors to perform operations including: receiving a request to temporarily unlock one or more security policies of a plurality of security policies, wherein the plurality of security policies are applicable to a security zone of a tenancy within a cloud environment, the security zone encompassing a plurality of cloud resources of the tenancy; determining a user credential associated with an origin of the request to temporarily unlock the one or more security policies; determining that the user credential is included in a prespecified group of user credentials, wherein the prespecified group of user credentials excludes any administrator or any user of the tenancy; and in response to determining that the user credential is included in the prespecified group that excludes any administrator or any user of the tenancy, temporarily unlocking the one or more security policies of the plurality of security policies. In an example, one or more user credential in the prespecified group of user credentials include user credentials of corresponding one or more users or administrators of a service tenancy that is separate from the tenancy in which the security zone is implemented.

In an example, the request is a first request, the one or more security policies are first one or more security policies, the user credential is a first user credential, and wherein operations further include: receiving a second request to temporarily unlock second one or more security policies of the plurality of security policies; determining a second user credential associated with an origin of the second request; determining the second user credential to be that of any administrator or any user of the tenancy; and denying the second request, based at least in part on determining the second user credential to be that of any administrator or any user of the tenancy. In an example, temporarily unlocking the one or more security policies comprises temporarily unlocking the plurality of security policies associated with the security zone, such that the security zone is nonoperational upon the temporary unlocking of the plurality of security policies. In an example, the one or more security policies are first one or more security policies; the plurality of security policies includes (i) the first one or more security policies that are requested to be temporarily unlocked, and (ii) second one or more security policies of the plurality of security policies that are not requested to be unlocked; and temporarily unlocking the one or more security policies comprises temporarily unlocking the first one or more security policies, without unlocking the second one or more security policies.

In an example, the one or more security policies that are temporarily unlocked includes a first security policy, and wherein operations further include: while the one or more security policies of the plurality of security policies are temporarily unlocked, receiving an application programming interface (API) call destined for a cloud resource that is within the security zone of the tenancy, wherein the API call has a call type and a call parameter that matches a predefined call type and a predefined call parameter, respectively, of the first security policy; and allowing passage to the API call to the cloud resource, based at least in part on the first security policy being temporarily unlocked. In an example, the API call is a first API call, and wherein operations further include: subsequent to temporarily unlocking the one or more security policies of the plurality of security policies, relocking the one or more security policies of the plurality of security policies; subsequent to relocking the one or more security policies of the plurality of security policies, receiving a second API call destined for the cloud resource that is within the security zone of the tenancy, wherein the second API call has the call type and the call parameter that (i) matches the call type and the call parameter, respectively, of the first API call, and (ii) also matches the predefined call type and the predefined call parameter, respectively, of the first security policy; and denying passage to the second API call to the cloud resource, based at least in part on the one or more security policies of the plurality of security policies being relocked.

In an example, at least one security policy of the plurality of security policies is associated with denying API calls that (i) have a predefined call type and one or more predefined call parameters, and (ii) are destined to cloud resources within the security zone of the tenancy. In an example, the operations further include: subsequent to temporarily unlocking the one or more security policies of the plurality of security policies, relocking the one or more security policies of the plurality of security policies. In an example, relocking the one or more security policies of the plurality of security policies comprise: after elapse of a predefined time period from temporarily unlocking the one or more security policies of the plurality of security policies, automatically relocking the one or more security policies of the plurality of security policies. In an example, relocking the one or more security policies of the plurality of security policies comprise: (i) subsequent to temporarily unlocking the one or more security policies of the plurality of security policies and (ii) in response to receiving a confirmation that one or more API calls, which were prespecified to be transmitted during an unlocking period, has been transmitted during the unlocking period, relocking the one or more security policies of the plurality of security policies. In an example, relocking the one or more security policies of the plurality of security policies comprise: subsequent to temporarily unlocking the one or more security policies of the plurality of security policies, relocking the one or more security policies of the plurality of security policies in response to at least one of: receiving a confirmation that one or more API calls, which were prespecified to be transmitted during an unlocking period, has been transmitted during the unlocking period, and elapse of a predefined time period from temporarily unlocking the one or more security policies of the plurality of security policies. In an example, one or more user credential in the prespecified group of user credentials include user credentials of corresponding one or more users or administrators of a service tenancy that is separate from the tenancy in which the security zone is implemented, and wherein operations further include: conducting, from the service tenancy, software assurance on the tenancy including the security zone.

In some embodiments, a method comprises: receiving a request to temporarily unlock one or more security policies of a plurality of security policies, wherein the plurality of security policies are applicable to a security zone of a tenancy within a cloud environment, the security zone encompassing a plurality of cloud resources of the tenancy; determining a user credential associated with an origin of the request to temporarily unlock the one or more security policies; determining that the user credential is included in a prespecified group of user credentials, wherein the prespecified group of user credentials excludes any administrator or any user of the tenancy; and in response to determining that the user credential is included in the prespecified group that excludes any administrator or any user of the tenancy, temporarily unlocking the one or more security policies of the plurality of security policies. In an example, one or more user credential in the prespecified group of user credentials include user credentials of corresponding one or more users or administrators of a service tenancy that is separate from the tenancy in which the security zone is implemented. In an example, the request is a first request, the one or more security policies are first one or more security policies, the user credential is a first user credential, and wherein operations further include: receiving a second request to temporarily unlock second one or more security policies of the plurality of security policies; determining a second user credential associated with an origin of the second request; determining the second user credential to be that of any administrator or any user of the tenancy; and denying the second request, based at least in part on determining the second user credential to be that of any administrator or any user of the tenancy. In an example, temporarily unlocking the one or more security policies comprises temporarily unlocking the plurality of security policies associated with the security zone, such that the security zone is nonoperational upon the temporary unlocking of the plurality of security policies. In an example, the one or more security policies are first one or more security policies; the plurality of security policies includes (i) the first one or more security policies that are requested to be temporarily unlocked, and (ii) second one or more security policies of the plurality of security policies that are not requested to be unlocked; and temporarily unlocking the one or more security policies comprises temporarily unlocking the first one or more security policies, without unlocking the second one or more security policies.

In some embodiments, a system comprises: one or more processors; and one or more non-transitory computer-readable media storing instructions, which, when executed by the system, cause the system to perform operations including: receiving a request to temporarily unlock one or more security policies of a plurality of security policies, wherein the plurality of security policies are applicable to a security zone of a tenancy within a cloud environment, the security zone encompassing a plurality of cloud resources of the tenancy; determining a user credential associated with an origin of the request to temporarily unlock the one or more security policies; determining that the user credential is included in a prespecified group of user credentials, wherein the prespecified group of user credentials excludes any administrator or any user of the tenancy; and in response to determining that the user credential is included in the prespecified group that excludes any administrator or any user of the tenancy, temporarily unlocking the one or more security policies of the plurality of security policies. In an example, one or more user credential in the prespecified group of user credentials include user credentials of corresponding one or more users or administrators of a service tenancy that is separate from the tenancy in which the security zone is implemented.

In some embodiments, a non-transitory computer-readable medium includes instructions that when executed by one or more processors, cause a system including the one or more processors to perform operations including: receiving a request to temporarily unlock one or more security policies of a plurality of security policies, wherein the plurality of security policies are applicable to a security zone of a tenancy within a cloud environment, the security zone encompassing a plurality of cloud resources of the tenancy; unlocking the one or more security policies of the plurality of security policies; and while the one or more security policies of the plurality of security policies are unlocked, logging a plurality of application programming interface (API) calls destined for the plurality of cloud resources within the security zone, wherein prior to unlocking the one or more security policies, API calls destined for the plurality of cloud resources within the security zone are not logged.

In an example, the operations further include: relocking the one or more security policies of the plurality of security policies; and terminating the logging of API calls destined for the plurality of cloud resources within the security zone, in response to, or immediately prior to, or simultaneously with relocking the one or more security policies. In an example, the one or more security policies that are unlocked are first one or more security policies; the plurality of security policies comprises (i) the first one or more security policies that are unlocked, and (ii) second one or more security policies that remain locked while the first one or more security policies are unlocked; and the operations further include: while the first one or more security policies are unlocked, receiving (i) first one or more API calls, each of which is in violation of a corresponding one of the first one or more security policies, (ii) second one or more API calls, each of which is in violation of a corresponding one of the second one or more security policies, and (iii) third one or more API calls, none of which is in violation of any of the plurality of security policies, wherein each of the first one or more, second one or more, and third one or more API calls are destined for corresponding one of the plurality of cloud resources within the security zone; and in response to unlocking the first one or more security policies, allowing passage of the first one or more API calls and the third one or more API calls to their respective destinations within the security zone. In an example, logging the plurality of API calls destined for the plurality of cloud resources within the security zone comprises: logging the first one or more API calls, without logging the second one or more API calls or the third one or more API calls. In an example, logging the plurality of API calls destined for the plurality of cloud resources within the security zone comprises logging the first one or more API calls, and wherein the operations further include: prior to unlocking the first one or more security policies, receiving a list of API calls that (i) are in violation with the first one or more security policies, and (ii) are to be transmitted while the first one or more security policies are to be unlocked; subsequent to relocking the first one or more security policies, comparing (i) the list of API calls and (ii) the logged second one or more API calls; and causing to display a result of the comparison. In an example, the operations further include: while the first one or more security policies are unlocked and in response to the second one or more security policies remaining locked, blocking passage of the second one or more API calls to their respective destination within the security zone. In an example, logging the plurality of API calls destined for the plurality of cloud resources within the security zone comprises: logging the first one or more API calls and the second one or more API calls. In an example, logging the plurality of API calls destined for the plurality of cloud resources within the security zone comprises: logging the first, second, and third one or more API calls.

In an example, logging the plurality of API calls destined for the plurality of cloud resources within the security zone comprises: while the one or more security policies of the plurality of security policies are unlocked, logging all API calls destined for the plurality of cloud resources within the security zone. In an example, logging the plurality of API calls destined for the plurality of cloud resources within the security zone comprises: receiving, while the one or more security policies of the plurality of security policies are unlocked, (i) first one or more API calls, each of which is in violation of a corresponding security policy of the one or more security policies, and (ii) second one or more API calls, none of which is in violation of the one or more security policies; and logging the first one or more API calls, without logging the second one or more API calls. In an example, logging the plurality of API calls destined for the plurality of cloud resources within the security zone comprises: logging an API call type, an API call parameter, and/or a destination of a first API call of the logged plurality of API calls. In an example, the tenancy is a first tenancy, wherein the logging occurs within a second tenancy, and wherein the operations include: transmitting the log of the plurality of API calls to a third tenancy, to cause analysis of the logged plurality of API calls.

In some embodiments, a method comprises: receiving a request to temporarily unlock one or more security policies of a plurality of security policies, wherein the plurality of security policies are applicable to a security zone of a tenancy within a cloud environment, the security zone encompassing a plurality of cloud resources of the tenancy; unlocking the one or more security policies of the plurality of security policies; and while the one or more security policies of the plurality of security policies are unlocked, logging a plurality of application programming interface (API) calls destined for the plurality of cloud resources within the security zone, wherein prior to unlocking the one or more security policies, API calls destined for the plurality of cloud resources within the security zone are not logged. In an example, the method further comprises: relocking the one or more security policies of the plurality of security policies; and terminating the logging of API calls destined for the plurality of cloud resources within the security zone, in response to, or immediately prior to, or simultaneously with relocking the one or more security policies. In an example, the one or more security policies that are unlocked are first one or more security policies; the plurality of security policies comprises (i) the first one or more security policies that are unlocked, and (ii) second one or more security policies that remain locked while the first one or more security policies are unlocked; and the method further comprises: while the first one or more security policies are unlocked, receiving (i) first one or more API calls, each of which is in violation of a corresponding one of the first one or more security policies, (ii) second one or more API calls, each of which is in violation of a corresponding one of the second one or more security policies, and (iii) third one or more API calls, none of which is in violation of any of the plurality of security policies, wherein each of the first one or more, second one or more, and third one or more API calls are destined for corresponding one of the plurality of cloud resources within the security zone; and in response to unlocking the first one or more security policies, allowing passage of the first one or more API calls and the third one or more API calls to their respective destinations within the security zone.

In an example, logging the plurality of API calls destined for the plurality of cloud resources within the security zone comprises: logging the first one or more API calls, without logging the second one or more API calls or the third one or more API calls. In an example, logging the plurality of API calls destined for the plurality of cloud resources within the security zone comprises logging the first one or more API calls, and wherein the method further comprises: prior to unlocking the first one or more security policies, receiving a list of API calls that (i) are in violation with the first one or more security policies, and (ii) are to be transmitted while the first one or more security policies are to be unlocked; subsequent to relocking the first one or more security policies, comparing (i) the list of API calls and (ii) the logged second one or more API calls; and causing to display a result of the comparison.

In some embodiments, a system comprises: one or more processors; a storage repository; and one or more non-transitory computer-readable media storing instructions, which, when executed by the system, cause the system to perform operations including: receiving a request to temporarily unlock one or more security policies of a plurality of security policies, wherein the plurality of security policies are applicable to a security zone of a tenancy within a cloud environment, the security zone encompassing a plurality of cloud resources of the tenancy; unlocking the one or more security policies of the plurality of security policies; and while the one or more security policies of the plurality of security policies are unlocked, logging, within the storage repository, a plurality of application programming interface (API) calls destined for the plurality of cloud resources within the security zone, wherein prior to unlocking the one or more security policies, API calls destined for the plurality of cloud resources within the security zone are not logged.

In an example, the tenancy is a first tenancy; the storage repository is a first storage repository that is within a second tenancy; and the operations further include relocking the one or more security policies of the plurality of security policies; and transferring the log of the plurality of API calls from the first storage repository within the second tenancy to a second storage repository within a third tenancy, to cause analysis of the logged plurality of API calls. In an example, the one or more security policies that are unlocked are first one or more security policies; the plurality of security policies comprises (i) the first one or more security policies that are unlocked, and (ii) second one or more security policies that remain locked while the first one or more security policies are unlocked; and the operations further include: while the first one or more security policies are unlocked, receiving (i) first one or more API calls, each of which is in violation of a corresponding one of the first one or more security policies, (ii) second one or more API calls, each of which is in violation of a corresponding one of the second one or more security policies, and (iii) third one or more API calls, none of which is in violation of any of the plurality of security policies, wherein each of the first one or more, second one or more, and third one or more API calls are destined for corresponding one of the plurality of cloud resources within the security zone; and in response to unlocking the first one or more security policies, allowing passage of the first one or more API calls and the third one or more API calls to their respective destinations within the security zone.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 2 illustrates examples of security policies implemented on application programming interface (API) calls destined for cloud resources within a security zone of a customer tenancy.

FIG. 15 illustrates a method for temporary unlocking and relocking of one or more security policies implemented within a security zone of a customer tenancy of a cloud environment.

FIG. 19 illustrates an example categorization of API calls processed by a proxy service, wherein the API calls are destined for cloud resources within a security zone of a customer tenancy within a cloud environment, and further illustrates an example manner in which an unlock period activity monitoring service monitors and/or logs one or more API calls.

DETAILED DESCRIPTION

Figure 1:
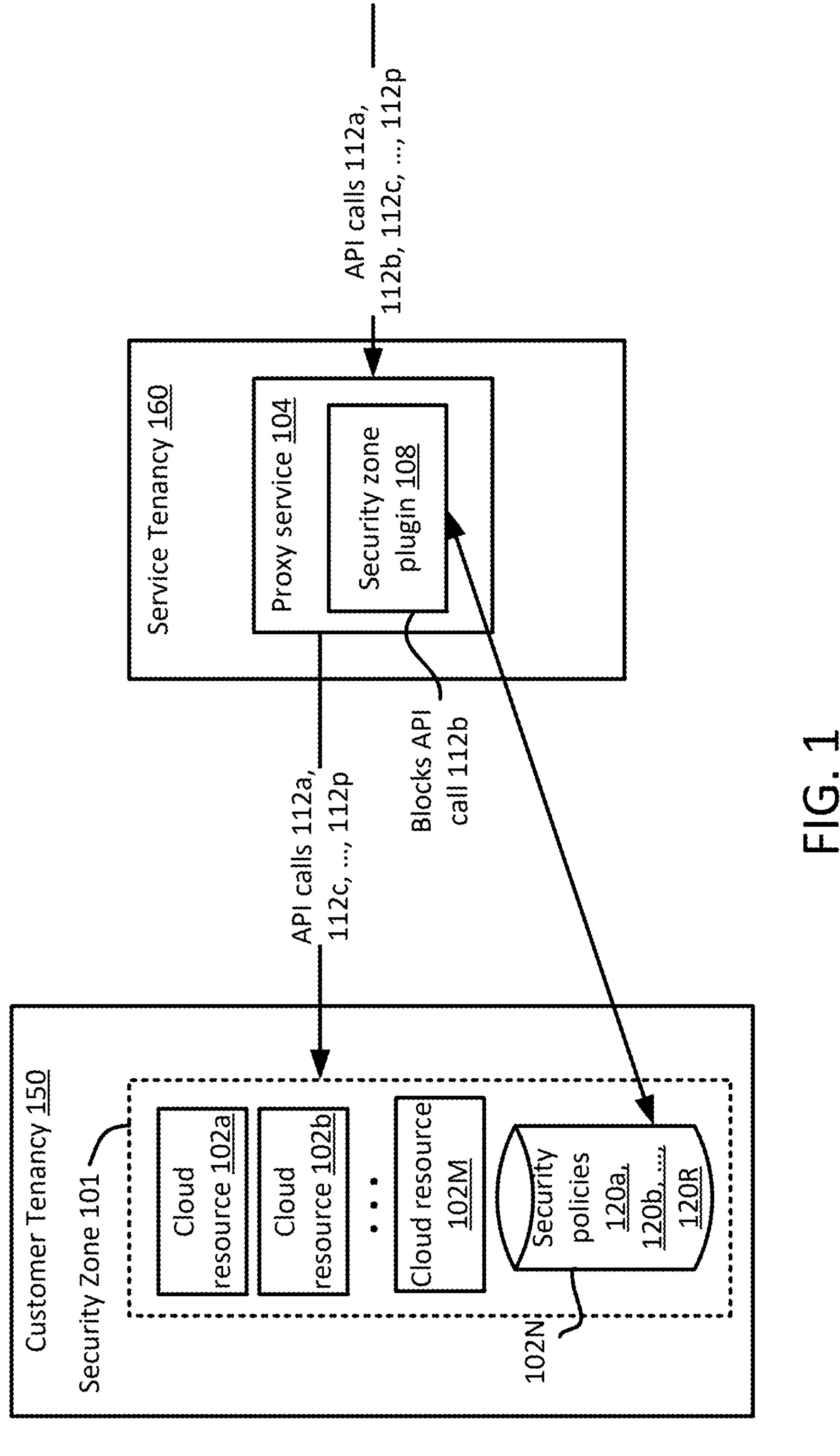
FIG. 1 illustrates a block diagram of a cloud environment that includes a security zone plugin for implementing a security zone within a customer tenancy.

Maintaining security of a cloud environment involves controlling access to cloud resources based on permissions specified by respective cloud customers. A cloud customer can grant permissions for accessing cloud resources that it rents, but the cloud customer should not be able to grant permissions for accessing cloud resources rented by other customers. A tenancy is a conceptual bucket that holds cloud resources belonging to a particular cloud customer. A tenancy of a cloud customer is isolated from another tenancy of another cloud customer. A tenancy of a cloud customer includes a plurality of active cloud resources, such as compute instances that are used to host virtual machines.

A customer tenancy is a conceptual bucket that holds cloud resources belonging to a particular cloud customer. For example, a provider of the cloud environment may rent out the customer tenancy to a cloud customer. In addition to a customer tenancy provided to a cloud customer, the cloud provider may also have its own one or more of "provider tenancies" or "service tenancy," e.g., which may be used to provide one or more of services to various cloud customers, and/or may be used for analyzing and/or monitoring a cloud customer tenancy. Generally, an administrator of a tenancy has administrative rights to set access policies for cloud resources in the tenancy; an administrator of a tenancy does not have administrative rights to set access policies for cloud resources in another tenancy. Thus, in general, because the customer tenancy is rented out to the cloud customer, the cloud customer should have administrative privileges and control on cloud resources within the customer tenancy, in an example.

In the context of software assurance, in an example, an additional role of an assurance administrator is added into the picture. The assurance administrator may be the same as the cloud provider in an example, although the assurance administrator may be different from the cloud provider in another example. In an example, the assurance administrator acts as a trusted technology provider (TTP) for the customer tenancy. With regard to the subject disclosure, in an example, the assurance administrator has a monitoring role over a manner in which the cloud customer is using cloud resources within the customer tenancy. In an example, the assurance administrator may be tasked by a regulatory agency to monitor activities within the customer tenancy, e.g., to ensure that cloud resources within the customer tenancy does not undertake prohibited activities (such as activities within a denial list). In another example, assurance administrator may be tasked by the cloud customer itself (e.g., the assurance administrator may in this example act as an internal auditor), such that possibly malicious actors may not undertake prohibited activities (such as activities within a denial list) within the customer tenancy.

Accordingly, in an example, the assurance administrator causes implementation of a security zone within the customer tenancy, where cloud resources within the security zone of the customer tenancy have to adhere to a plurality of security policies. The security zone within the customer tenancy is a logical partitioning within the customer tenancy, where cloud resources within the security zone are exposed to the corresponding security policies of the security zone. In an example, the security zone may encompass an entirety of the customer tenancy, or a part (such as one or more compartments) of the customer tenancy.

Thus, the security zone encompasses a plurality of cloud resources of the customer tenancy. In an example, the cloud resources within the security zone also includes a storage repository storing a plurality of security policies associated with the security zone. In an example, a security policy is a denial policy, which denies an incoming API call destined for a cloud resource within the security zone, if the API call violates the security policy.

In an example, the cloud environment also comprises a service tenancy, which is operated by a provider of the cloud environment and/or by personnel of the assurance administrator. In any case, the service tenancy is not operated by the cloud customer, to whom the customer tenancy is rented. In an example, the service tenancy executes a proxy service that has access to the storage repository storing the security policies. In an example, the proxy service facilitates in enforcing the security zone within the customer tenancy. For example, the proxy service intercepts API calls made to the cloud resources within the security zone of the customer tenancy. In an example, the proxy service includes a security zone plugin. The security zone plugin determines if an API call (which was destined for a cloud resource within the security zone) matches with any of the security policies. If the API call matches with at least a security policy, the proxy service blocks passage of the API call to its intended destination within the security zone. On the other hand, if the API call does not match with any of the security policies, the proxy service allows passage of the API call to its intended destination within the security zone.

In an example, the security zone plugin is developed, maintained, operated, and/or configured by the assurance administrator. For example, the cloud customer, to whom the customer tenancy is rented out, may not have any control on a configuration and/or operation of the security zone plugin.

As will be described below in further detail, each API call has a corresponding API call type and a corresponding API call parameter. Similarly, each security policy has a predefined API call type and one or more predefined API call parameters. In an example, once the proxy service receives an API call destined for a cloud resource within the security zone, the security zone plugin determines an API call type of the API call and the corresponding API parameter of the API call. The security zone plugin then compares the API call type of the API call and the corresponding API parameter of the API call to the predefined API call types and predefined API call parameters of the security policies. If the API call type of the API call and the API parameter of the API call match with any of those mentioned in one of the security policies, the proxy service denies or blocks the API call. On the other hand, if the API call does not match with any of the security policies, the proxy service allows the API call to be transmitted to its intended destination, which may be a cloud resource within the security zone.

Note that while the security zone plugin may work in conjunction with the proxy service, in an example, the security zone plugin may be implemented in a distributed manner. For example, a first instance of the security zone plugin may work with the proxy service, and a second instance of the security zone plugin may work with another service provided by the cloud provider. For example, such a service may also route calls to cloud resources within the security zone (e.g., by bypassing the proxy service), and the second instance of the security zone plugin may operate in conjunction with such a service to selectively allow or block passage of API calls destined for the security zone, as described below in further detail.

In an example, the cloud environment may further include an assurance administrator tenancy, which may be used to manage, such as create, alter, and/or delete one or more security policies. The assurance administrator tenancy may be accessed, operated, and/or configured by personnel of the assurance administrator. In an example, the assurance administrator tenancy stores or otherwise has access to a cryptographic key, where the key is used to unlock the security policies. For example, the key is used to create, modify, and/or delete one or more, or all of the security policies. Thus, the security policies are locked, and the key is used to unlock the security policies, and create, modify, and/or delete one or more or all of the security policies, as described below in further detail.

In an example, an authorized user credential of the assurance administrator tenancy may be used to create, modify, and/or delete the security policies using the key. For example, only prespecified group of administrators and/or a prespecified group of users of the assurance administrator tenancy may have privileges to temporarily unlock, create, modify, and/or delete the security policies. Users or administrators of the customer tenancy may not be able to unlock, create, modify, and/or delete the security policies.

As described above, each security policy is a denial policy applicable to cloud resources within a security zone. For example, an API call is “blocked” in response to a violation of a security policy. The customer tenancy may also be exposed to access control policies. For example, the access control policies are applicable to one or more cloud resources within an access control zone of the customer tenancy, where each access control policy is an “allow” policy. For example, an API call is “allowed” in response to satisfying an access control policy. Thus, for example, an API call is allowed in response to a match between parameters (such as API call type and API call parameter) of the API call and a corresponding access control policy. The access control zone and the security zone within the customer tenancy may at least partially or fully overlap, or may be non-overlapping, and are implementation specific.

In an example, an administrator or a user of the customer tenancy may define the access control zone, and may create, modify, and/or delete access control policies. In contrast, as described above, in an example, only personnel of the assurance administrator tenancy can create, modify, and/or delete one or more, or all of the security policies.

Thus, the access control policies provide the cloud customer some degree of control over activities within the customer tenancy (e.g., who accesses what within the customer tenancy). On the other hand, the security policies provide the assurance administrator some degree of control over activities within the customer tenancy, as described below in further detail.

As described above, due to the security policies implemented by the security zone plugin, API calls destined for the cloud resources and violating one or more security policies are selectively blocked by the security zone plugin and the proxy service. However, in an example, there may be legitimate scenarios where the cloud customer may want to perform activities that are explicitly denied in the security policies, where examples of such legitimate scenarios are described below in further detail. However, the cloud customer, to whom the customer tenancy is rented, does not have privileges to bypass, modify, configure, or delete any security policy. Such privileges are accorded to personnel of the assurance administrator tenancy.

Accordingly, in an example, bypassing of a security policy (which is also referred to as unlocking of the security policy) is performed jointly or collaboratively between the cloud customer and the assurance administrator. For example, the cloud customer and the assurance administrator may collaborate to temporarily unlock one or more of the security policies. This way, in an example, the assurance administrator is aware of activities performed by the cloud customer (such as API calls received by the cloud resources within the security zone of the customer tenancy), while one or more of the security policies are unlocked, such as temporarily lifted or bypassed.

In an example, an unlock plugin works in conjunction with the security zone plugin and/or the proxy service, to at least temporarily unlock one or more of the security policies. In an example, the security zone plugin and the unlock plugin may be combined in a single plugin. The unlock plugin causes the security zone plugin and/or the proxy service to selectively unlock one or more security policies.

For example, the cloud customer initially requests the assurance administrator to temporarily unlock one or more security policies. The assurance administrator reviews and may approve the request for temporarily unlocking the one or more security policies, as described below in further detail. The assurance administrator transmits a request for unlocking the security policies to the unlock plugin. Note that a user credential associated with the assurance administrator tenancy may be used for unlocking the security policies, and user credentials associated with the customer tenancy cannot be used to unlock security policies, as described below in further detail. In an example, an encryption key stored within the assurance administrator tenancy may also be used for authentication during the unlock process, as also described below in further detail. In an example, the unlock plugin subsequently causes the security zone plugin and/or the proxy service to unlock one or more security policies.

In an example, a coarse grain unlocking may be possible, where all the security policies are unlocked at the same time (and relocked back at the same time). This results in an unlocking of the entire security zone. Thus, in this example, all API calls destined for cloud resources within the security zone are allowed by the security zone plugin and/or the proxy service.

In another example, a fine grain unlocking may also be possible, where one or more (but not necessarily all) of a plurality of security policies are unlocked. For example, the cloud customer may request unlocking of one or more specific security policies, which may be less than a plurality of security policies asserted for the security zone. In such an example, only the requested security policies are unlocked, while remaining security policies are still enforced.

In an example, when one or more security policies are unlocked, the security zone plugin and/or the proxy service does not implement the security policies (e.g., the security policies are bypassed). For example, the security zone plugin may still check for API calls for violation of such one or more security policies, but nonetheless the proxy service allows such API calls that should have been otherwise blocked due to the one or more security policies. In another example, the security zone plugin may not even check the API calls for violation of the one or more security policies.

In an example, subsequent to unlocking the security policies, the security policies are relocked, based on detecting a triggering event. In an example and as described below in further detail, the triggering event can be a confirmation of completion of requested API call transmissions from the cloud customer. In another example and as also described below in detail, the triggering event can be completion of a pre-decided time period from the start of the unlocking event. In yet another example, the triggering event can be any of (i) the confirmation of completion of requested API call transmissions and/or (ii) the completion of the pre-decided time period, whichever of (i) or (ii) occurs earlier.

The triggering event can be detected by the assurance administrator, by the unlock plugin, and/or by the security zone plugin and/or the proxy service. In response to detecting the triggering event, the one or more security policies are relocked, as described below in further detail.

As described above, when one or more of the plurality of security policies are unlocked, the proxy service allows API calls that would otherwise be blocked during the locked state of the one or more security policies. For example, prior to unlocking a specific security policy (such as a first security policy), the cloud customer and the assurance administrator may discuss and agree upon a specific set of API calls that may be transmitted by the cloud customer, where the set of API calls violate the first security policy that is to be unlocked. Now, when the first security policy is unlocked, the cloud customer is expected (e.g., by the assurance administrator) to transmit only the specific set of API calls that violate the first security policy, and no other API calls that violate the first security policy.

However, there may be some degree of lack of trust between the cloud customer and the assurance administrator. For example, the assurance administrator may want to ensure that during the unlocked state of the first security policy, the cloud customer do not take undue advantage of the unlocked state of the first security policy, to have API calls passed through the proxy service, where one or more of such API calls violate the first security policy and is not within the pre-agreed set of API calls. Thus, the assurance administrator may want to ensure that the proxy service actually allows only the specific set of API calls that violate the first security policy, and no other API calls that violate the first security policy.

Thus, in an example, the assurance administrator may want to monitor and log API calls allowed by the proxy service. However, such monitoring and/or logging at all times (such as during the locked and unlocked states of the security policies) may not be desirable from the cloud customer point of view, as such monitoring and/or logging may be deemed as being invasive to privacy of the cloud customer. This is because, for example, the cloud customer may want to transmit API calls during the locked state of the security policies, without any additional monitoring and/or logging by the assurance administrator, as the security policies already ensure that API calls violating one or more security policies are being blocked by the proxy service. Accordingly, the assurance administrator may want to monitor and/or log API calls specifically during an unlocked state of one or more security policies.

Accordingly, in an example, the assurance administrator causes an the unlock period activity monitoring service to operate within the proxy service. Note that the unlock period activity monitoring service may be combined with the above-described security zone plugin and/or the unlock plugin.

The unlock period activity monitoring service monitors and/or selectively logs API calls, e.g., when one or more security policies are unlocked. For example, the monitoring and logging operation may be initiated by the unlock period activity monitoring service, in response to a request for unlocking the security policies, or in response to the actual unlocking operation. In yet another example, the unlocking operation and initiation of the monitoring and logging operation may be performed substantially simultaneously.

In the example, "all" API call processed by the proxy service (e.g., either blocked or allowed by the proxy service), while one or more of the security policies are unlocked, may be monitored and logged by the unlock period activity monitoring service. Thus, the following API calls may be logged: (i) first one or more API calls that do not violate any security policies, and are allowed passage by the proxy service, (ii) second one or more API calls that violate the unlocked security policies, and are allowed passage by the proxy service, and (iii) third one or more API calls that violate the locked security policies (e.g., which are not unlocked), and are blocked passage by the proxy service. Thus, in this example, all API call processed by the proxy service (e.g., either blocked or allowed by the proxy service) are logged by the unlock period activity monitoring service.

However, in another example, the unlock period activity monitoring service selectively logs only some API calls processed by the proxy service. For example, assume that the following API calls processed by the proxy service: (i) a first plurality of API calls that do not violate any security policy, and are allowed passage by the proxy service, (ii) a second plurality of API calls that violate the unlocked security policies, and are nonetheless allowed passage by the proxy service, and (iii) a third plurality of API calls that violate the locked security policies (e.g., which are not unlocked), and are blocked passage by the proxy service. Thus, in this example, the second plurality of API calls, which violate the unlocked security policies and are allowed passage by the proxy service, are logged by the unlock period activity monitoring service.

In yet another example, the logging of the following API calls are performed by the unlock period activity monitoring service: (i) the second plurality of API calls that violate the unlocked security policies and are allowed passage by the proxy service, and (ii) the third plurality of API calls that violate the locked security policies (e.g., which are not unlocked) and are blocked passage by the proxy service.

In an example, the monitoring and logging of the API calls are terminated by the unlock period activity monitoring service, in response to, immediately prior to, or simultaneously with relocking the one or more security policies.

In an example, after the monitoring and logging operation is terminated, the unlock period activity monitoring service transfers the API call activity log to a storage repository within the assurance administrator tenancy. The API call activity log can subsequently be analyzed by an analysis service within the assurance administrator tenancy.

For example, the analysis service analyzes the logged API calls, to ensure that the cloud customer did not transmit, during the unlock period, any API calls that were not agreed upon between the assurance administrator and the cloud customer and that violates the unlocked one or more security policies. For example, the analysis service compares (i) the above-described logged second plurality of API calls (e.g., which violate the one or more unlocked security policies) and (ii) a pre-agreed set of API calls that were pre-agreed upon between the assurance administrator and the cloud customer for transmission during the unlock period, where each API call within the pre-agreed set of API calls is in violation of the one or more security policies to be unlocked. In an example, a mismatch detected during the comparison operation may be an indication that the cloud customer may have transmitted unauthorized API calls, while the one or more security policies were unlocked.

Security Zones and Associated Security Policies within a Cloud Environment

FIG. 1 illustrates a block diagram of a cloud environment 100 that includes a security zone plugin 108 for implementing a security zone 101 within a customer tenancy 150. The cloud environment 100 comprises a plurality of tenancies, and one such tenancy 150 is illustrated in FIG. 1. The tenancy 150 is rented to a cloud customer, and hence, the tenancy 150 is referred to as a customer tenancy 150.

A tenancy is an isolated and logical partition within the cloud environment 100, such that resources in different tenancies are isolated from each other unless explicitly shared. A customer tenancy is a conceptual bucket that holds cloud resources belonging to a particular cloud customer. In addition to a "customer tenancy" provided to a cloud customer, the cloud provider may also have its own one or more of "provider tenancies" or "service tenancy," e.g., which may be used to provide one or more of services to various cloud customers, and/or may be used for analyzing and/or monitoring a cloud customer tenancy.

Generally, an administrator of a tenancy has administrative rights to set access policies for cloud resources in the tenancy; an administrator of a tenancy does not have administrative rights to set access policies for cloud resources in another tenancy. Thus, in general, because the customer tenancy 150 is rented out to the cloud customer, the cloud customer should have administrative privileges and control on cloud resources within the customer tenancy 150, in an example.

However, in the context of software assurance, in an example, an additional role of an assurance administrator is added into the picture. The assurance administrator may be the same as the cloud provider in an example, although the assurance administrator may be different from the cloud provider in another example. In an example, the assurance administrator acts as a trusted technology provider (TTP) for the customer tenancy 150.

With regard to the subject disclosure, in an example, the assurance administrator has a monitoring role over a manner in which the cloud customer is using cloud resources within the customer tenancy 150. In an example, the assurance administrator may be tasked by a regulatory agency to monitor activities within the customer tenancy 150, e.g., to ensure that cloud resources within the customer tenancy 150 does not undertake prohibited activities (such as activities within a denial list). In another example, assurance administrator may be tasked by the cloud customer itself (e.g., the assurance administrator may in this example act as an internal auditor), such that possibly malicious actors may not undertake prohibited activities (such as activities within a denial list) within the customer tenancy 150. Thus, the assurance administrator has a monitoring role on the customer tenancy 150, where the assurance administrator is different from the cloud customer to whom the customer tenancy 150 is rented by the provider of the cloud environment 100.

Thus, in an example, the assurance administrator needs to have a role or control over one or more activities performed within the customer tenancy 150 of the cloud customer, e.g., for purposes of software assurance within the customer tenancy 150. For example, the assurance administrator may want to prohibit or deter the cloud customer from undertaking certain activities, without explicit knowledge of the assurance administrator.

Accordingly, in an example, the assurance administrator causes implementation of a security zone 101 within the customer tenancy 150, where cloud resources 102*a*, . . . , 102M, 102N within the security zone 101 of the customer tenancy 150 have to adhere to a plurality of security policies 120*a*, 120*b*, . . . , 120R.

The security zone 101 within the customer tenancy 150 is a logical partitioning within the tenancy 150. In an example, the security zone 101 may encompass an entirety of the customer tenancy 150, and in such an example, the entirety of the customer tenancy is subjected to security policies 120*a*, . . . , 120R of the security zone.

In another example, the security zone 101 may encompass only a part or section of the customer tenancy 150. For example, the customer tenancy 150 may be subdivided in a plurality of compartments, where the security zone 101 may dictate security policies of cloud resources within one or more compartments of the plurality of compartments of the customer tenancy 150.

In yet another example, the customer tenancy 150 may span multiple geographical areas of the cloud environment, also referred to as cloud regions of the cloud environment 100. In such an example, the security zone 101 may encompass a section of the customer tenancy 150 that is within a cloud region. Merely as an example, if the customer tenancy 150 spans three cloud regions, a first security zone 101 may encompass a first portion of the customer tenancy 150 that is within a first cloud region, a second security zone may encompass a second portion of the customer tenancy 150 that is within a second cloud region, and so on.

Thus, the boundary of the security zone 101 zone (e.g., whether the security zone covers the entire customer tenancy 150, or a portion of a cloud region that is within the customer tenancy 150, or one or more compartments of the customer tenancy 150) is implementation specific. In an example, personnel of the assurance administrator dictate the boundary of the security zone 101, where an example boundary of the security zone 101 is illustrated using dotted lines in FIG. 1.

Although a single example security zone 101 is illustrated in FIG. 1, in another example, the customer tenancy 150 may include more than one security zone 101. For example, a first security zone may encompass a first plurality of cloud resources of the customer tenancy 150, a second security zone may encompass a second plurality of cloud resources of the customer tenancy 150, and so on.

In the example of FIG. 1, the security zone 101 encompasses a plurality of cloud resources 102*a*, 102*b*, . . . , 102N, 102M. The cloud resources 102*a*, 102*b*, . . . , 102N may be cloud resources generally within the customer tenancy 150, such as compute instances, one or more services offered by the customer tenancy 150, storage repositories, databases, virtual network components, one or more physical or virtual resources rented out by the provider of the cloud environment 100 to the cloud customer, etc.

The cloud resource 102N is a storage repository storing a plurality of security policies 120*a*, . . . , 120R. The security policies 120*a*, . . . , 120R are associated with the security zone 101. For example, each security policy 120 is a denial policy, which denies an incoming API call destined for the security zone 101, if a condition of the corresponding security policy 120 is satisfied. Thus, the security policies 120*a*, . . . , 120R comprises a plurality of denial policies for denying API call incoming to the security zone 101.

In an example, the cloud environment 100 also comprises a service tenancy 160. In an example, the service tenancy 160 is operated by a provider of the cloud environment 100. In another example, the service tenancy 160 is operated by the assurance administrator. In any case, the service tenancy is not operated by the cloud customer, to whom the customer tenancy 150 is rented and within which the security zone 101 is implemented.

In an example, the service tenancy 160 executes a proxy service 104. The proxy service 104 has access to the storage repository 102N storing the security policies 120*a*, 120*b*, . . . , 120R. Note that the storage repository 102N is within the customer tenancy 150. Thus, rules of the customer tenancy 150 is implemented on the storage repository 102N. In an example, the storage repository 102N may be accessible to the proxy service 104 (e.g., through a gateway of the customer tenancy 150 and/or a gateway of the service tenancy 160).

The proxy service 104 facilitates in enforcing the security zone 101 within the customer tenancy 150. For example, the proxy service 104 intercepts API calls 112*a*, 112*b*, 112*c*, . . . , 112*p* made to the cloud resources 102*a*, . . . , 102N of the security zone 101. Thus, each of the API calls 112*a*, 112*b*, 112*c*, . . . , 112*p* have a target destination within the security zone 101.

In an example, the proxy service 104 includes a security zone plugin 108. The security zone plugin 108 determines if an API call 112 matches with any of the security policies 120*a*, . . . , 120R of the storage repository 102N. If the API call matches with at least a security policy 120, the proxy service 104 blocks passage of the API call to its intended destination within the security zone 101. On the other hand, if the API call does not match with any of the security policies 120*a*, . . . , 120R, the proxy service 104 allows passage of the API call to its intended destination within the security zone 101.

For example, in the implementation of FIG. 1, the proxy service 104 receives a series or stream of API calls 112*a*, 112*b*, 112*c*, . . . , 112*p*, where the API call 112*b* matches with at least one of the security policies 120*a*, . . . , 120R. Accordingly, the proxy service 104 blocks passage of the API call 112*b* to its intended destination within the security zone 101, as illustrated in FIG. 1. On the other hand, none of the API calls 112*a*, 112*c*, . . . , 112*p* matches with any of the security policies 120*a*, . . . , 120R, and the proxy service 104 allows passage of these API calls 112*a*, 112*c*, . . . , 112*p* to their respective intended destinations within the security zone 101, as also illustrated in FIG. 1. Thus, the security zone plugin 108 compare each incoming API call (which are destined for the security zone 101) with the plurality of security policies 120*a*, . . . , 102N, and selectively blocks or allows the corresponding API call based on the comparison result.

In an example, the security zone plugin 108 is developed, maintained, and/or configured by the assurance administrator. For example, the cloud customer, to whom the customer tenancy 150 is rented out, may not have any control on a configuration and/or operation of the security zone plugin 108.

FIG. 2 illustrates examples of security policies 120*a*, 120*b*, . . . , 120R implemented on API calls 112*a*, . . . , 112*p* destined for cloud resources 102*a*, . . . , 102N of the security zone 101 of the customer tenancy 150. For example, each of the API calls 112*a*, . . . , 112*p* has a corresponding API call type and a corresponding API call parameter. Each security policy has a predefined API call type and one or more predefined API call parameters.

An example security policy 120*a* is for denying API calls of type A, if such an API call includes an API parameter AP. Similarly, example security policy 120*b* is for denying API calls of type B, if such an API call includes an API parameter BP. In yet another example, security policy 120*c* is for denying API calls of type C, irrespective of the corresponding API parameter within the API call. In a further example, security policy 120*d* is for denying API calls of type D, if the API parameter does not include DP1, . . . , and/or DPp (e.g., indicates a whitelist or safe list of API parameters for API calls of type D). Similarly, example security policy 120R is for denying API calls of type R, if such a call includes an API parameter RP. Thus, the security policies 120*a*, . . . , 120R are essentially a denial list, representative of which API calls are to be denied, based on corresponding API call types and/or API parameters.

Once the proxy service 104 receives an API call 112 destined to a cloud resource 102 within the security zone 101, the security zone plugin 108 determines an API call type of the API call and the corresponding API parameter of the API call. The security zone plugin 108 then compares the API call type of the API call and the corresponding API parameter of the API call to the predefined API call types and predefined API call parameters of the security policies 120*a*, . . . , 120R. If the API call type of the API call and the API parameter of the API call matches to any of those mentioned in one of the security policies 120*a*, . . . , 120R, the proxy service 104 denies or blocks the API call. For example, for the API call to be successful, the proxy service 104 has to route the API call to its destination within the security zone 101. But in this scenario, the proxy service 104 blocks, e.g., refrains from forwarding the API call to its intended destination.

On the other hand, if the API call does not match with any of the security policies 120*a*, . . . , 120R, the proxy service 104 allows the API call to be transmitted to its intended destination, which may be a cloud resource within the security zone 101.

Described below are some example security policies 120*a*, . . . , 120R that can be implemented for the security zone 101. In a first example, a security policy may result in blocking of an API call that aims to add users to an administrator (admin) group of the customer tenancy 150. An API call may be made to add a user to a specific group. Thus, here the API call type is to add a user to a group. The API parameter specifies the group name (or group type). For example, the group name can be a user group, a client group, a customer group, an administrator group, etc. However, if the API parameter for this call type specifies the group name to be admin (or an administrator group), then the API call is blocked. Thus, the corresponding security policy may be "Deny API call for 'adding a user to a group,' and with API parameter (e.g., group name) of 'admin' or 'administrative group'." In contrast, an API call to add a user to a user group or another group (other than the admin or administrative group) is allowed by the proxy service 104. In this example, a destination of the API call may be a cloud service operating within the security zone 101 (such as the cloud resource 102*a*), where the cloud service adds users to groups associated with the customer tenancy 150.

In another example, any API call to request to alter a security policy 120 can similarly be rejected by the proxy service 104. Thus, if the API call is to alter a security policy 120, the proxy service 104 may reject the API call, irrespective of the security policy that is to be changed. Thus, the corresponding security policy may look like be "Deny API call for altering a security policy, irrespective of the security policy that is to be altered." In this example, a destination of the API call may be the storage repository 102N string the security policies.

In yet another example, an API call may be made to spawn a compute instance from a specific image, or from an image from a specific location (such as a specific container or a specific storage repository storing the image). The API parameter specifies a name of the image or a location of the image. Thus, the corresponding security policy may be: "Deny API call for creating a compute instance from an image, if the API parameter indicating the image name does not include safe_image_1, safe_image_2, . . . , safe_image_p, or if the API parameter indicating the image location does not include safe_image_location_1, safe_image_location_2, . . . , safe_image_location_q." Thus, the security zone plugin 108 may only allow API calls to create a compute instance within the security zone 101, if the compute instance is to be created from a safe list of images. In this example, a destination of the API call may be a cloud service operating within the security zone 101 (such as the cloud resource 102*a*), where the cloud service creates compute instances within the security zone 101.

In yet another example, an API call made to terminate a compute instance used for production purpose may similarly be rejected. For example, compute instances used for production may be locked from being terminated, so that they wouldn't be terminated by mistake. Even though a user may have permission to "manage instances," the user may not have permission to terminate the instance due to a corresponding security policy. The API call type is for an instance termination. The corresponding security policy may be: "Deny API call for terminating a compute instance, if the API parameter indicates that the compute instance is used for production purpose." In this example, a destination of the API call may be a cloud service operating within the security zone 101 (such as the cloud resource 102*a*), where the cloud service terminates compute instances within the security zone 101.

Thus, in the above examples, API calls that do not violate any security policy (e.g., does not match with parameters of any of the security policies 120*a*, . . . , 120R) are allowed to pass by the security zone plugin 108. Only those API calls, which violates one or more corresponding security policies, are blocked by the security zone plugin 108. Thus, using the security policies 120*a*, . . . , 120R, the assurance administrator may control activities within the customer tenancy 150, thereby providing software assurance within the customer tenancy 150.

Figure 3:
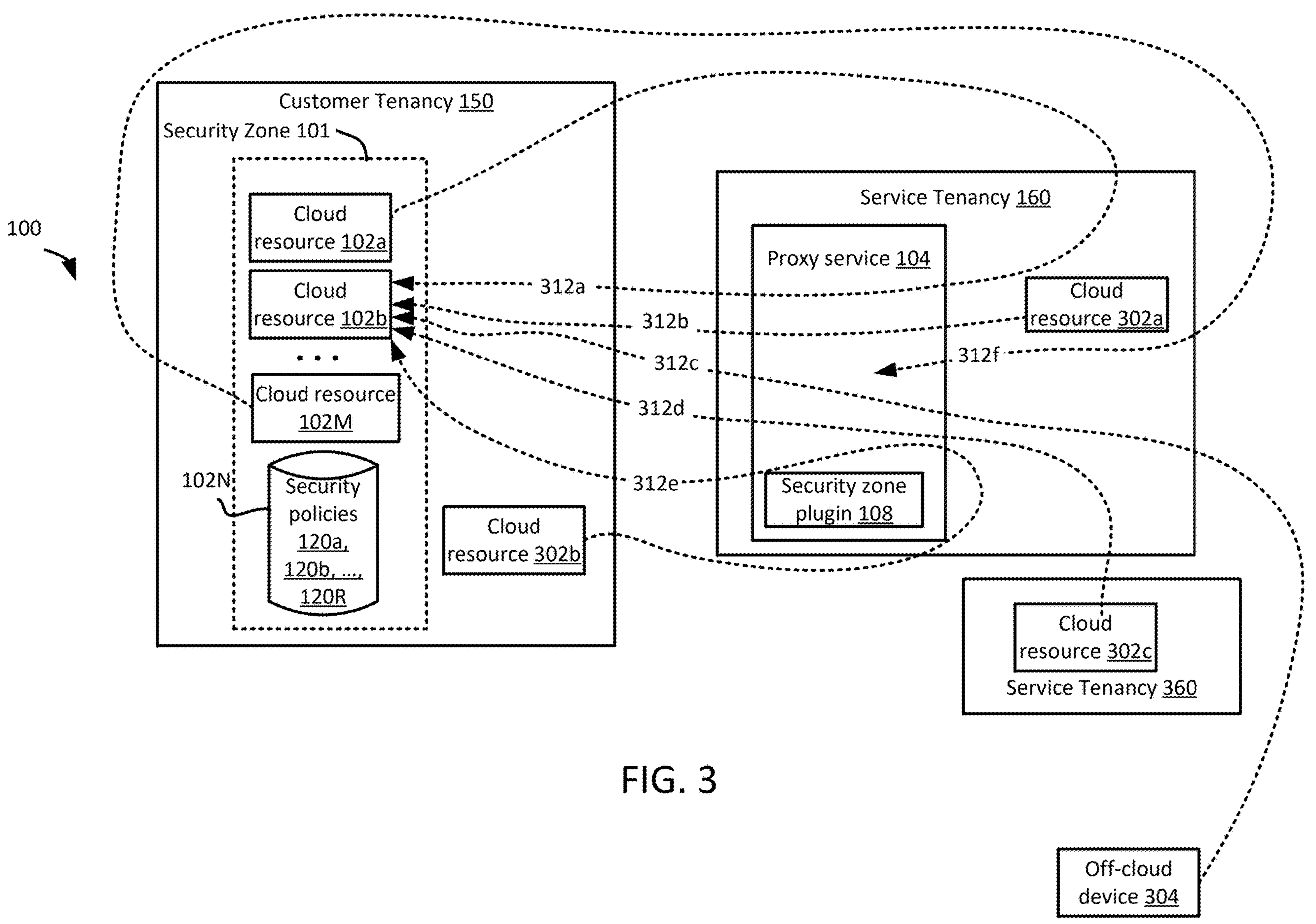
FIG. 3 illustrates example components from which API calls may be initiated, where the API calls are destined for cloud resources within a security zone of a customer tenancy, and where the API calls are selectively allowed or blocked by a proxy service implementing security policies of the security zone.

FIG. 3 illustrates example components from which API calls may be initiated, where the API calls are destined for cloud resources within a security zone 101 of a customer tenancy 150, and where the API calls are selectively allowed or blocked by a proxy service 104 implementing security policies 120*a*, . . . , 120R of the security zone 101. Thus, FIG. 3 illustrates origins of a plurality of API calls 312*a*, . . . , 312*f* reaching the proxy service 104 and destined for cloud resources within the security zone 101. Paths of individual API calls are illustrated using dotted lines in FIG. 3.

For example, a first API call 312 originates from a cloud resource 102*a* within the security zone 101, and is destined for the cloud resource 102*b*. The security zone plugin 108 compares the API call type and the API call parameter of the API call 312 to those of the security policies 120*a*, . . . , 120R. In response to the API call type and the API call parameter of the API call 312 not matching those of the security policies 120*a*, . . . , 120R, the proxy service 104 allows passage of the API call 312*a* to its target, which is the cloud resource 102*b*.

Similarly, in an example, a cloud resource 302*a* of the service tenancy 160, which is outside of the security zone 101, transmits an API call 312*b* intended for the cloud resource 302*a* 102*b*, which the proxy service 104 allows.

Similarly, in another example, an off-cloud device 304 (e.g., which is outside the cloud environment 100, and connects to the cloud environment 100 using a public network, such as the Internet) transmits an API call 312*c* intended for the cloud resource 102*b*, which the proxy service 104 allows.

Similarly, in yet another example, a cloud resource 302*c* of another service tenancy 360 transmits an API call 312*d* intended for the cloud resource 102*b*, which the proxy service 104 allows.

Similarly, in a further example, a cloud resource 302*b* within the customer tenancy 150 (e.g., which is outside the security zone 101) transmits an API call 312*e* intended for the cloud resource 102*b*, which the proxy service 104 allows.

On the other hand, a cloud resource 102M within the security zone 101 transmits an API call 312*f* intended for the cloud resource 102*b*, which the proxy service 104 blocks, e.g., based on a match between the API call type and API call parameter of the API call 312*f* and those of a corresponding security policy 120.

Figure 4:
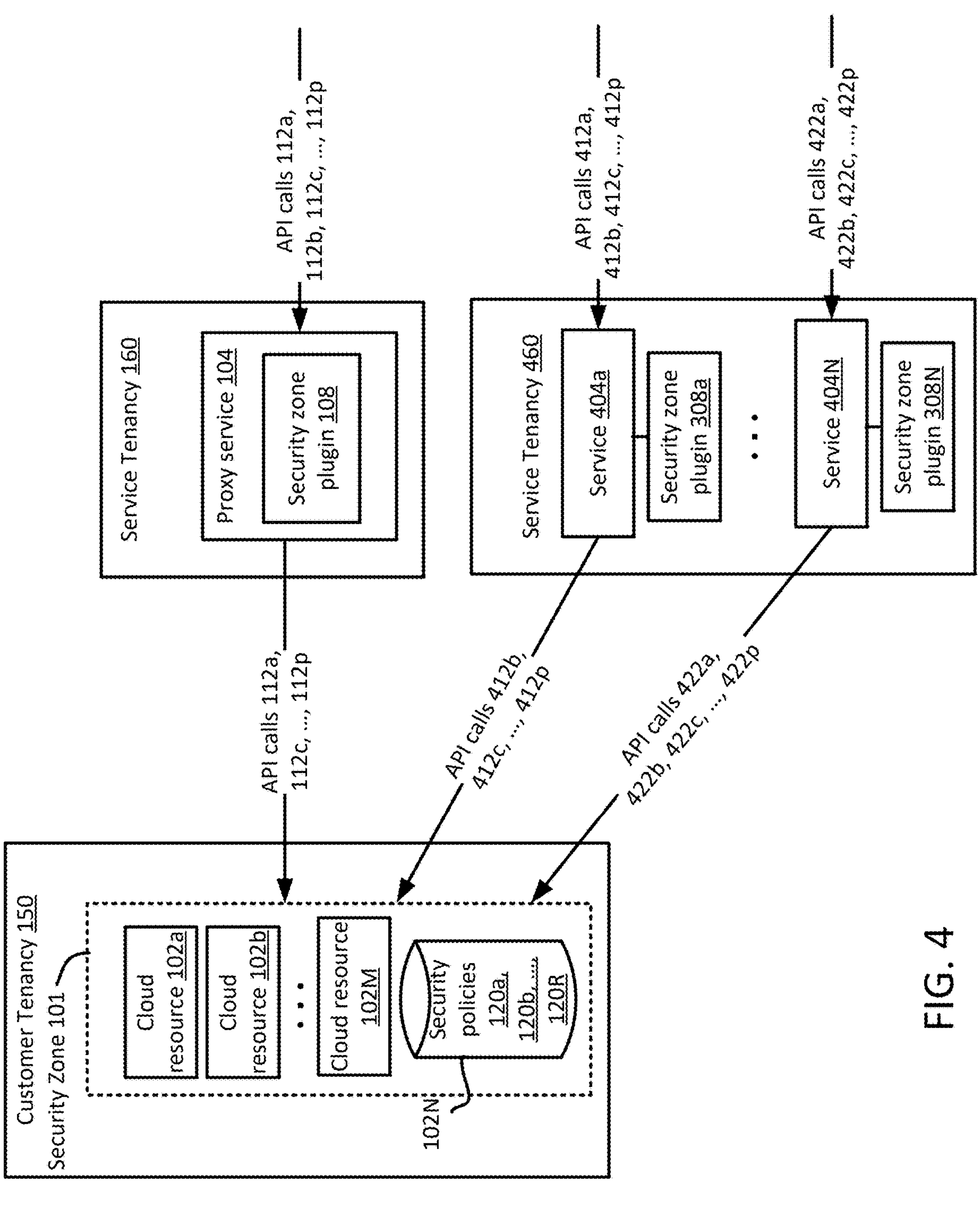
FIG. 4 illustrates a distributed implementation of security zone plugins for implementing security policies within a security zone of a customer tenancy.

FIG. 4 illustrates a distributed implementation of security zone plugins for implementing security policies 120*a*, . . . , 120R within a security zone 101 of a customer tenancy 150. For example, in FIG. 1, a single security zone plugin 108 checks for possible violation of security policies of all API calls destined for the security zone 101, and a single proxy service 104 either blocks or allows individual API calls destined for the security zone 101. In contrast, in FIG. 4, multiple such security zone plugins 108, 308*a*, . . . , 308N check for possible violation of security policies of API calls destined for the security zone 101.

For example, in FIG. 4, the security zone plugin 108 works in conjunction with (or is included within) the proxy service 104. However, there may be API calls that originate from one or more services, and which are to be routed to the customer tenancy 150 by bypassing the proxy service 104.

For example, the cloud environment 400 of FIG. 4 includes a service tenancy 460 including a plurality of services 404*a*, . . . , 404N. API calls 412*a*, . . . , 412*p* to the service 404*a* may be selectively routed to the security zone 101 by bypassing the proxy service 104. Accordingly, a security zone plugin 308*a* works along with the service 404*a* (or may be a part of the service 404*a*), e.g., to determine which API calls to be blocked, and which API calls to be allowed passage to corresponding cloud resources 102*a*, . . . , 102M of the security zone 101. Merely as an example, in FIG. 4, API call 412*a* is blocked by the service 404*a*, and API calls 412*b*, . . . , 412*p* are allowed passage to corresponding cloud resources 102*a*, . . . , 102M of the security zone 101.

Similarly, API calls 422*a*, . . . , 422*p* to a service 404N may be selectively routed to the security zone 101 by bypassing the proxy service 104. Accordingly, another security zone plugin 308N works along with the service 404N, e.g., to determine which API calls to be blocked, and which API calls to be allowed passage to corresponding cloud resources 102*a*, . . . , 102M of the security zone 101. For example, in FIG. 4, none of these API calls is blocked by the service 404N, and API calls 422*a*, . . . , 422*p* are allowed passage to corresponding cloud resources 102*a*, . . . , 102M of the security zone 101.

Note that FIG. 3 illustrates example origins of API calls, and FIG. 4 illustrates example routes of API calls. In an example, FIGS. 3 and 4 may be combined, such that the cloud resources 102*a*, 102M, 302*a*, 302*b*, 302*c*, 304, and/or one or more other cloud resources may transmit API calls destined for the security zone 101, and routed through one or more of the proxy service 104 and/or services 404*a*, . . . , 404N.

Figure 5:
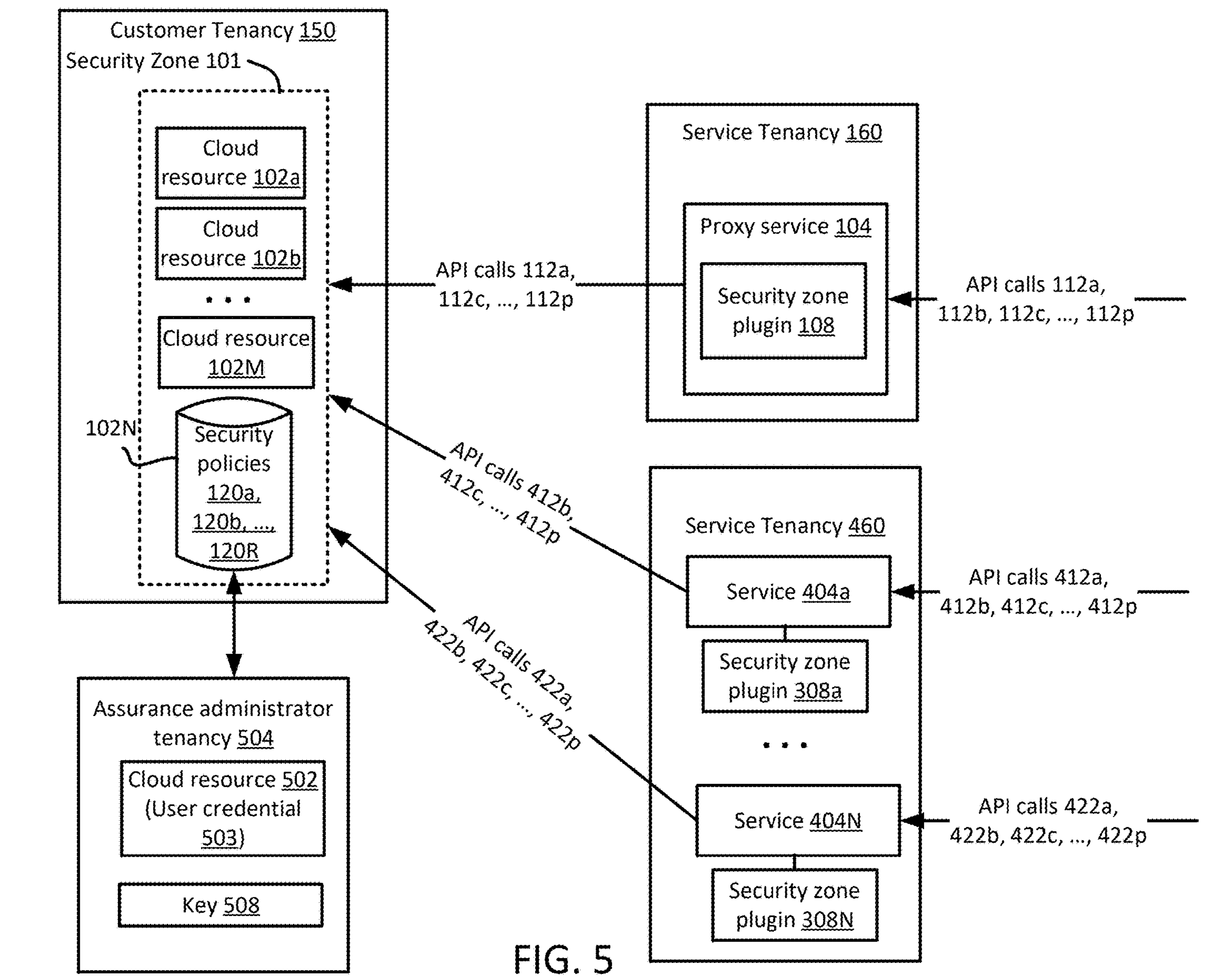
FIG. 5 illustrates an assurance administrator tenancy within a cloud environment, from which one or more security policies may be created, modified, and/or deleted.

FIG. 5 illustrates an assurance administrator tenancy 504, from which one or more security policies 120*a*, . . . , 120R may be created, modified, and/or deleted. For example, the assurance administrator tenancy 504 may be accessed, operated, and/or configured by personnel of the assurance administrator.

The assurance administrator tenancy 504 stores or otherwise has access to a key 508, where the key 508 is used to lock the security policies 120*a*, 120*b*, . . . , 120R. For example, the key 508 is used to create, modify, and/or delete one or more, or all of the security policies 120*a*, 120*b*, . . . 120R. Thus, the security policies 120*a*, 120*b*, . . . , 120R are locked, and the key 508 is used to unlock the security policies 120*a*, 120*b*, . . . , 120R, and create, modify, and/or delete one or more or all of the security policies 120*a*, 120*b*, . . . , 120R.

In an example, the key 508 may be a cryptographic key or a session token that may be usable to create, modify, and/or delete one or more, or all of the security policies 120*a*, 120*b*, . . . , 120R. Thus, any request to create, modify, and/or delete the security policies 120*a*, 120*b*, . . . , 120R may be accompanied by the cryptographic key 508. For example, any request to create, modify, and/or delete the security policies 120*a*, 120*b*, . . . , 120R may be conditioned upon having an accompanying cryptographic key (such as the 5008)) and/or based on a role of the requester issuing the request (where the role of the requester is described below).

However, in another example, in addition to (or instead of) a key 508, an authorized user credential 503 of the assurance administrator tenancy 504 may be used to create, modify, and/or delete the security policies 120*a*, 120*b*, . . . , 120R. For example, only prespecified group of administrators and/or a certain group of users of the assurance administrator tenancy 504 may have privileges to temporarily unlock, create, modify, and/or delete the security policies 120*a*, 120*b*, . . . , 120R. For example, FIG. 5 illustrates a cloud resource 502 within the assurance administrator tenancy 504 storing a user credential 503 (also referred to as a "user principal"). The user credential 503 is usable to authenticate a user of the assurance administrator tenancy 504 to an Identity and Access Management (IAM) service of the cloud environment 100. The user credential 503 is assigned to an assurance administrator personnel, such as a user belonging to an administrator group or a certain user group of the assurance administrator tenancy 504. A user having the user credential 503 can be authenticated by the IAM, and such authenticated user may be authorized by the IAM (or another service of the cloud environment 100) to temporarily unlock, create, modify, and/or delete the security policies 120*a*, 120*b*, . . . , 120R. In another example, the user having the user credential 503 may temporarily unlock, create, modify, and/or delete the security policies 120*a*, 120*b*, . . . , 120R using the key 508. Thus, in an example, a specific group of requester (such as a requester having the user credential 503), who optionally also has access to the key 508, may temporarily unlock, create, modify, and/or delete the security policies 120*a*, 120*b*, . . . , 120R. Note that although a single user credential 503 is illustrated in FIG. 5, a plurality of such user credentials maybe possible, where each such user credentials may be assigned to personnel of the assurance administrator (and not to personnel of the cloud customer of the customer tenancy 150), where each such user credentials may be authenticated and authorized to temporarily unlock, create, modify, and/or delete the security policies 120*a*, 120*b*, . . . , 120R.

Figure 6:
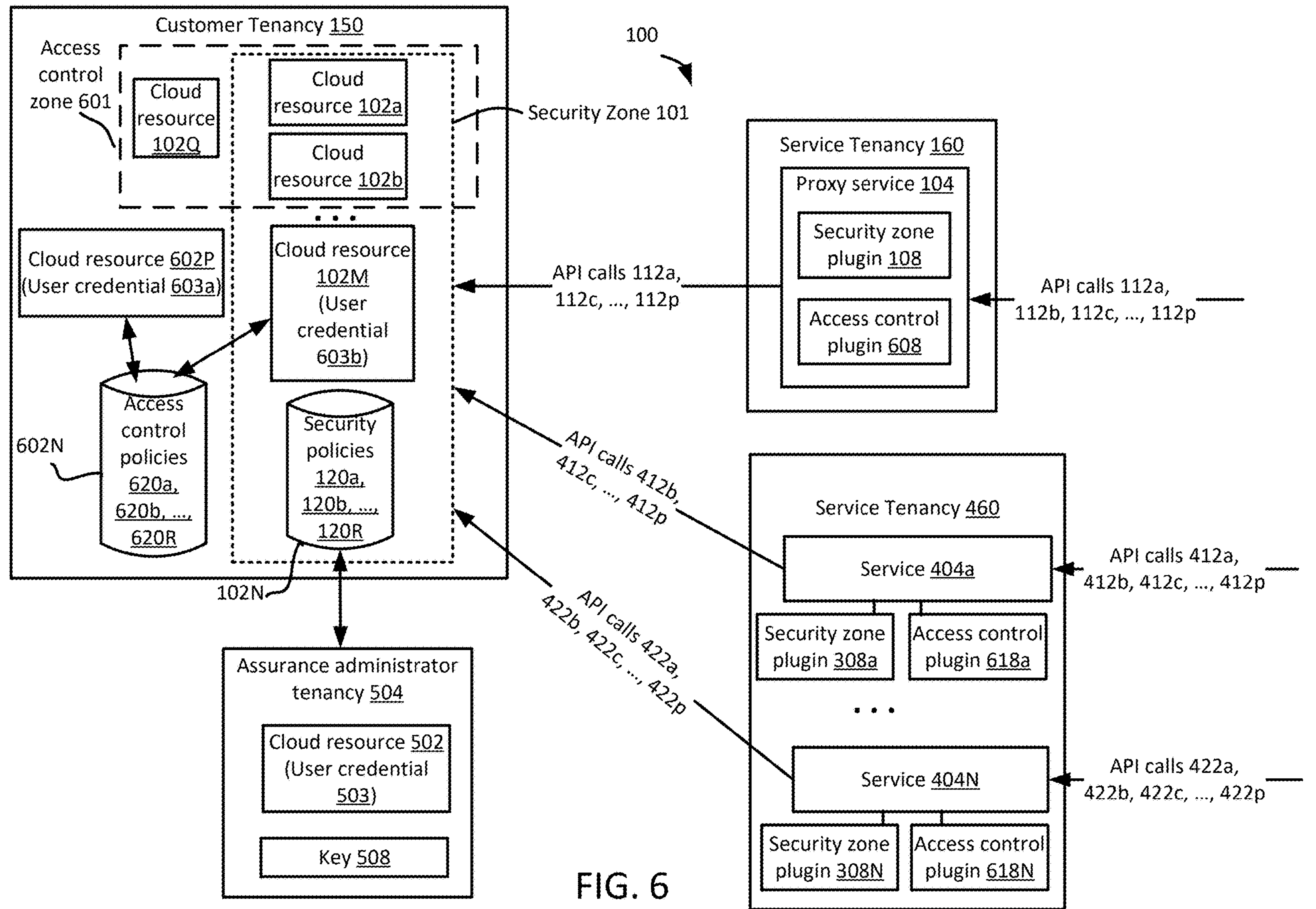
FIG. 6 illustrates at least a part of a customer tenancy being exposed to security policies and also to access control policies.

FIG. 6 illustrates at least a part of a customer tenancy 150 being exposed to security policies 120*a*, . . . , 120R and also to access control policies 620*a*, . . . , 620R. For example, the security policies 120*a*, . . . , 120R are applicable to the security zone 101 of the customer tenancy 150, where each security policy 120 is a denial policy. For example, an API call is "blocked" in response to a violation of a security policy 120. Thus, for example, an API call is blocked in response to a match between parameters (such as API call type and API call parameter) of the API call and a corresponding security policy 120.

In contrast, the access control policies 620*a*, . . . , 620R are applicable to one or more cloud resources of the customer tenancy 150, where each access control policy 620 is an "allow" policy. For example, an API call is "allowed" in response to satisfying an access control policy. Thus, for example, an API call is allowed in response to a match between parameters (such as API call type and API call parameter) of the API call and a corresponding access control policy 620.

The access control policies 620*a*, . . . , 620R are applicable at a desired level of granularity within the customer tenancy 150. For example, the access control policies 620*a*, . . . , 620R are applicable to a corresponding access control zone 601, where the access control zone 601 may encompass an entirety of the customer tenancy 150, or only a part of the customer tenancy 150. For example, the access control zone 601 may encompass one or more compartments of the customer tenancy 150, one or more VCNs of the customer tenancy 150, one or more cloud resources of the customer tenancy 150, or the like. Merely as an example in FIG. 6, the access control zone 601 is illustrated to encompass cloud resources 102*a*, 102*b*, 102Q of the customer tenancy 150.

Thus, the access control zone 601 and the security zone 101 of the customer tenancy 150 can be at least partly overlapping (as illustrated in FIG. 6), or can be non-overlapping. In an example, the access control zone 601 and the security zone 101, although having some common cloud resources, may not coincide or fully overlap. For example, there may be one or more cloud resources that are within the access control zone 601 and not within the security zone 101 (such as cloud resource 102Q illustrated in FIG. 6). Similarly, in an example, there may be one or more cloud resources that are within the security zone 101 and not within the access control zone 601 (such as cloud resources 102M and 102N illustrated in FIG. 6).

In an example, an administrator or a user of the customer tenancy 150 (which is a root compartment) defines the user groups and compartments in the customer tenancy 150, and selects groups or compartments for implementing the access control policies 620*a*, . . . , 620R. Thus, personnel of the customer tenancy 150 (such as an administrator or a user of the customer tenancy 150) may have some degree of control, or full control, of a boundary of the access control zone 601. For example, personnel of the customer tenancy 150 may create, define and/or alter a boundary, and/or delete the access control zone 601.

In contrast, personnel of the customer tenancy 150 (such as an administrator or a user of the customer tenancy 150) may not have any control or substantial control of a boundary of the security zone 101. For example, personnel of the assurance administrator tenancy 604 (such as an administrator or a user of the assurance administrator tenancy 540, a user having the user credential 503, and/or a user having access to the key 508) may have some degree of control, or full control, of a boundary of the security zone 101. For example, personnel of the assurance administrator tenancy 504 may create, define and/or alter the boundary of the security zone 101, and/or altogether delete the security zone 101.

As described above, the security policies 120*a*, . . . , 120R may comprise a denial list representative of which API calls are to be denied, based on corresponding API call types and/or API parameters. In contrast, in an example, the access control policies 620*a*, . . . , 620R comprises an allow list to selectively allow API calls. Access control policies 620*a*, . . . , 620R specify which users can perform which actions on which resources in which compartment. Generally, access control policies may have following format: Allow group the <identity_domain_name>/<group_name> to <verb> <resource-type> in compartment <compartment_name>. The cloud provider and/or the cloud customer defines the possible verbs and resource-types that can be use in policies.

In an example, personnel of the customer tenancy 150 (such as an administrator or a user of the customer tenancy 150) can make changes to access control policies 620. For example, as illustrated in FIG. 6, user credentials 603*a* and 603*b* are assigned to users and/or administrators of the customer tenancy 150 (FIG. 6 illustrates these user credentials 603*a* and 603*b* being stored within the cloud resources of the customer tenancy 150). Users with such user credentials 603*a* and 603*b* can create, modify, and/or delete one or more, or all of the access control policies 620*a*, . . . 620R. In contrast, as described above, in an example, only personnel of the assurance administrator tenancy 504 can create, modify, and/or delete one or more, or all of the security policies 120*a*, . . . , 120R.

Thus, the access control policies 620*a*, . . . , 620R provide the cloud customer some degree of control over activities within the customer tenancy 150 (e.g., who accesses what within the customer tenancy 150), whereas the security policies 120*a*, . . . , 120R provide the assurance administrator some degree of control over activities within the customer tenancy 150.

In an example, an access control plugin 608 acts in unison with the security zone plugin 108 within the proxy service 104, as illustrated in FIG. 6. The access control plugin 608 also monitors (such as in parallel or along with the security zone plugin 108) API calls destined for the access control zone 601. In response to a match between API call type and API call parameter of an API call and those of an access control policy 620, the access control plugin 608 allows passage of the API call. Furthermore, more than one access control plugin may be possible, such as access control plugins 618*a*, . . . , 618N associated with the services 404*a*, . . . , 404N, as illustrated in FIG. 6.

Figure 7:
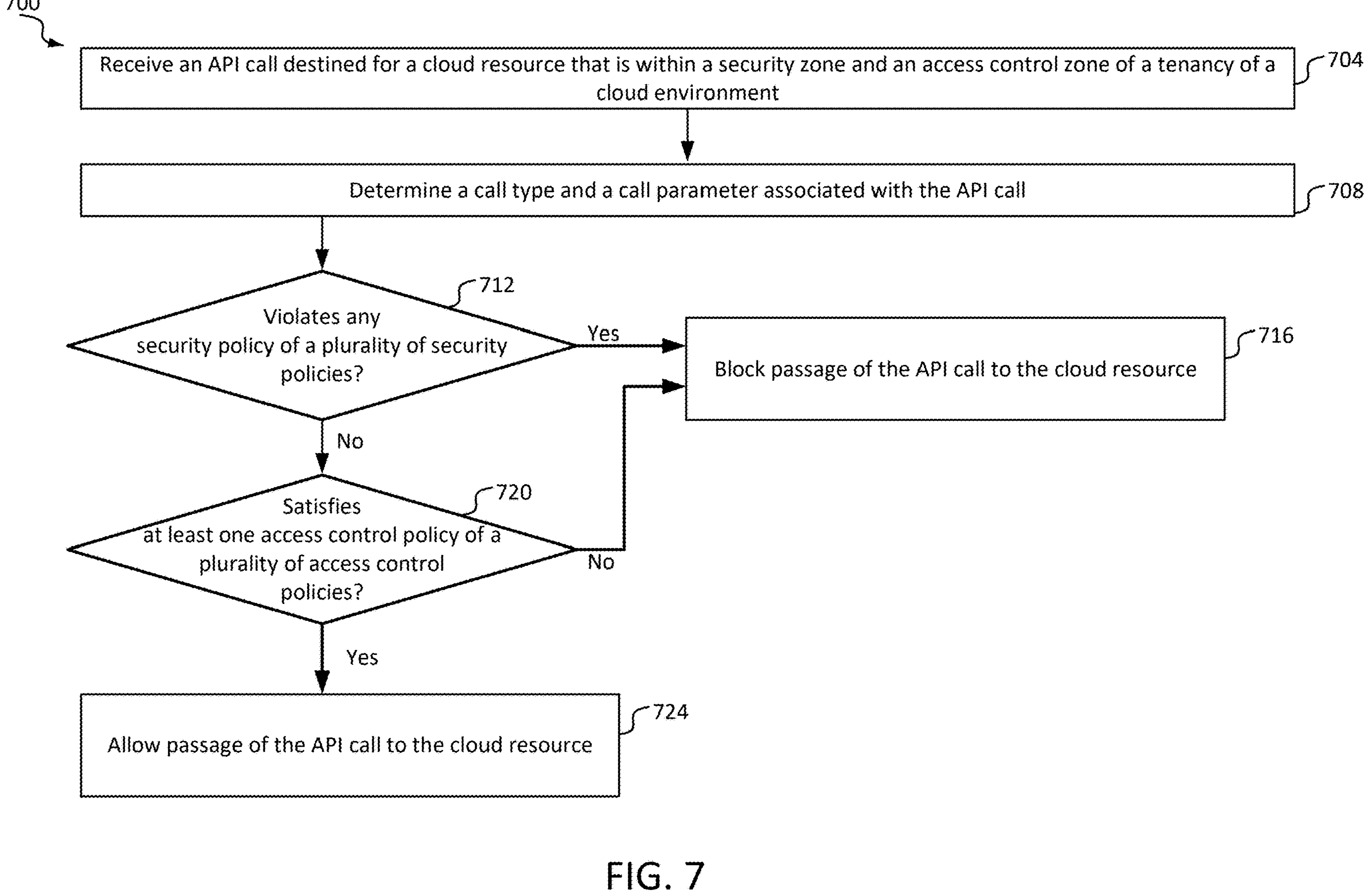
FIG. 7 illustrates a flow diagram depicting a method for selectively allowing or blocking passage of an API call destined for a cloud resource that is within (i) a security zone and (ii) an access control zone of a tenancy of a cloud environment.

FIG. 7 illustrates a flow diagram depicting a method 700 for selectively allowing or blocking passage of an API call destined for a cloud resource that is within (i) a security zone and (ii) an access control zone of a tenancy of a cloud environment.

At 704, an API call is received (e.g., by the proxy service 104 including the security zone plugin 108 and the access control plugin 608, or by any of the services 404*a*, . . . , 404N). The API call is destined for a cloud resource that is within a security zone and an access control zone of a tenancy of a cloud environment (such as the cloud resource 102*b* that is within the security zone 101 and the access control zone 601 of the customer tenancy 150 of the cloud environment of FIG. 6).

At 708, a call type and a call parameter associated with the API call is determined (e.g., by a security zone plugin and/or an access control plugin). At 712, a determination is made as to whether the API call having the determined call type and the determined call parameter violates any security policy of a plurality of security policies (such as security policies 120*a*, . . . , 120R). For example, if there is a match between the determined call type and the determined call parameter of the API call with a predefined call type and a predefined call parameter of a security policy, then the API call violates the security policy.

If "Yes" at 712 (e.g., if the API call violates any security policy of the plurality of security policies), then the method 700 proceeds from 712 to 716, where passage of the API call to the cloud resource is blocked (e.g., by the security zone plugin).

If "No" at 712 (e.g., if the API call does not violate any security policy of the plurality of security policies), then the method 700 proceeds from 712 to 720. At 720, a determination is made as to whether the API call having the determined call type and the determined call parameter satisfies at least one access control policy of a plurality of access control policies (such as access control policies 620*a*, . . . , 620R). For example, if there is a match between the determined call type and the determined call parameter of the API call with a predefined call type and a predefined call parameter of an access control policy, then the API call satisfies the access control policy.

If "No" at 720 (e.g., if the API call does not satisfy any access control policy of the plurality of access control policies), then the method 700 proceeds from 720 to 716. At 716, a passage of the API call to the cloud resource is blocked (e.g., by the proxy service 104 or any of the services 404*a*, . . . , 404N).

On the other hand, if "Yes" at 720 (e.g., if the API call satisfies at least one access control policy of the plurality of access control policies), then the method 700 proceeds from 720 to 724. At 724, the API call is allowed passage to its intended target, which is the cloud resources within the security zone and the access control zone of the tenancy of the cloud environment.

Note that in FIG. 7, violation of any security policy by the API call is checked at 712, and satisfaction of at least one access control policy by the API call is checked at 720. In the example of FIG. 7, operation 712 is performed prior to operation 720. However, in another example, operations 712 and 720 can be performed in any order, or may be performed at least in part simultaneously.

Figure 8:
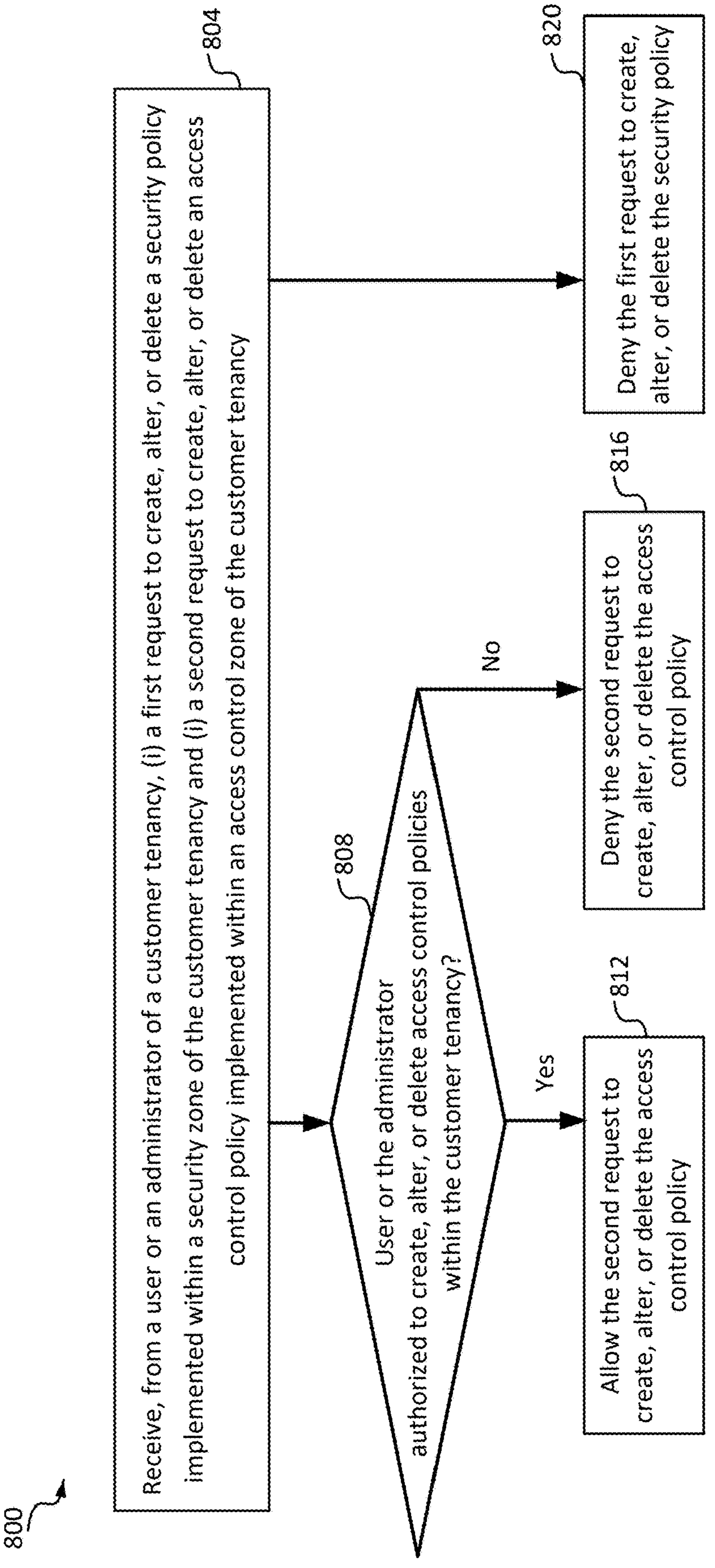
FIG. 8 illustrates a flow diagram depicting a method for processing requests received from a user or an administrator of a customer tenancy, wherein the requests are to create, alter, or delete (i) a security policy implemented within a security zone of the customer tenancy and (ii) an access control policy implemented within an access control zone of the customer tenancy.

FIG. 8 illustrates a flow diagram depicting a method 800 for processing requests received from a user or an administrator of a customer tenancy, wherein the requests are to create, alter, or delete (i) a security policy implemented within a security zone of the customer tenancy and (ii) an access control policy implemented within an access control zone of the customer tenancy.

At 804, a first request and a second request are received from a user or an administrator of a customer tenancy (such as from the user credential 603*a* or 603*b* of FIG. 6). The first request is to create, alter, or delete a security policy implemented within a security zone of the customer tenancy, such as the security policy 120*a* implemented within the security zone 101 of the customer tenancy 150. The second request is to create, alter, or delete an access control policy implemented within an access control zone of the customer tenancy, such as the access control policy 620*a* implemented within the access control zone 601 of the customer tenancy 150.

The method 800 proceeds from 804 to 808, at which a determination is made as to whether the user or the administrator is authorized to create, alter, or delete access control policies within the customer tenancy. For example, the user credential 603*a* or 603*b* is authenticated (e.g., by the IAM), and then checked to determine if this user credential is authorized to create, alter, or delete access control policies within the customer tenancy. The checking may be done by IAM of the cloud environment 100.

If "Yes" at 808 (e.g., if the user or the administrator is authorized to create, alter, or delete security policies within the customer tenancy, as verified by the IAM), then the method 800 proceeds from 808 to 812. At 812 of the method 800, the second request to create, alter, or delete the access control policy is allowed.

If "No" at 808 (e.g., if the user or the administrator is not authorized to create, alter, or delete security policies within the customer tenancy, as confirmed by the IAM), then the method 800 proceeds from 808 to 816. At 816 of the method 800, the second request to create, alter, or delete the access control policy is denied.

Thus, as described above with respect to operations 808, 812, and 816, a user or an administrator of a customer tenancy may be selectively allowed to create, alter, or delete security policies within the customer tenancy, based on privileges allocated to the user or the administrator of the customer tenancy.

The method 800 also proceeds from 804 to 820. At 820, the second request to create, alter, or delete the security policy is denied. For example, because the request originates from a user or an administrator of a customer tenancy in which the security zone is implemented, such a user or administrator cannot create, alter, or delete the security policy. For example, no user or administrator of the customer tenancy can create, alter, or delete the security policy. As described above, the security policy can be created, altered, and/or deleted by personnel of the assurance administrator, such as a user or an administrator of the assurance administrator tenancy 504, but not be personnel of the customer tenancy 150. Additionally or alternatively, the second request to create, alter, or delete the security policy is denied, e.g., for failing to be accompanied by a cryptographic key, such as the key 508 discussed above with respect to FIG. 5. So, in an example, the second request to create, alter, or delete the security policy is denied, due to one or both of (i) the request originating from a user or an administrator of a customer tenancy in which the security zone is implemented, and/or (ii) for failing to be accompanied by a cryptographic key. In an example, the IAM may check for condition (i) above, and a key verification component may check for condition (ii).

Figure 9:
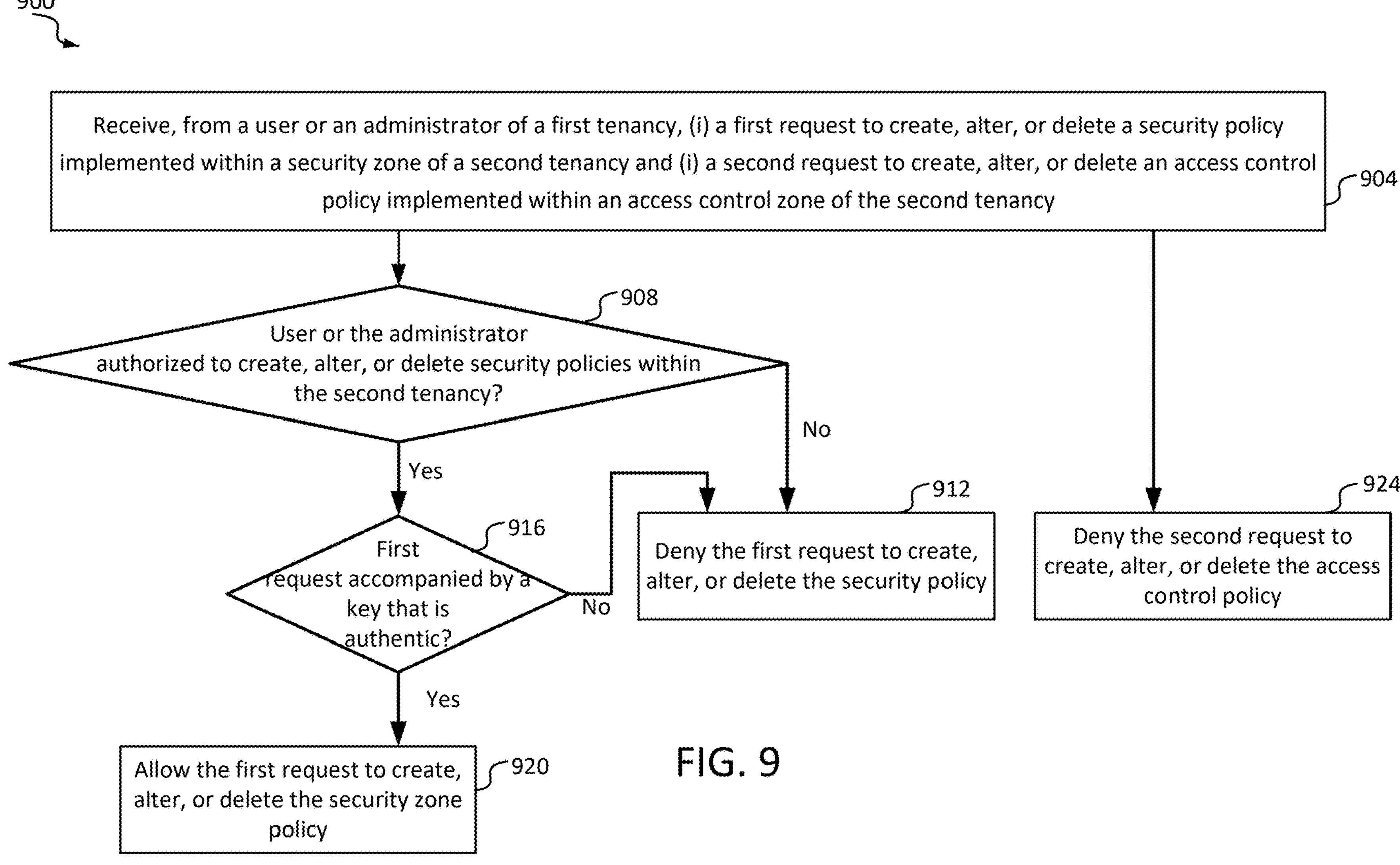
FIG. 9 illustrates a flow diagram depicting a method for processing requests received from a user or an administrator of a first tenancy (such as an assurance administrator tenancy), wherein the requests are to create, alter, or delete (i) a security policy implemented within a security zone of a second tenancy (such as a customer tenancy) and (ii) an access control policy implemented within an access control zone of the second tenancy.

FIG. 9 illustrates a flow diagram depicting a method 900 for processing requests received from a user or an administrator of a first tenancy (such as the assurance administrator tenancy 504), wherein the requests are to create, alter, or delete (i) a security policy implemented within a security zone of a second tenancy (such as the customer tenancy 150) and (ii) an access control policy implemented within an access control zone of the second tenancy.

At 904, a first request and a second request are received from a user or an administrator of a first tenancy (such as the assurance administrator tenancy 504). The first request is to create, alter, or delete a security policy implemented within a security zone of a second tenancy (such as the security policy 120*a* implemented within the security zone 101 of the customer tenancy 150). The second request is to create, alter, or delete an access control policy implemented within an access control zone of the second tenancy, such as the access control policy 620*a* implemented within the access control zone 601 of the customer tenancy 150. Note that the determination as to whether a user is authorized to create, alter, or delete security policies may be made by the IAM and/or by a key verification component. For example, as described above with respect to FIG. 5, a cryptographic key (such as the key 508) may have to accompany the first request to create, alter, or delete security policies within the customer tenancy 150. So, in a first example, a user having access to the key 508 may create, alter, or delete security policies within the customer tenancy 150, and in this case, the key verification component may verify an authenticity of the key. In a second example, a user from a prespecified group of users (such as a user or an administrator of the assurance administrator tenancy 504) may create, alter, or delete security policies within the customer tenancy 150, and in this case, the IAM may authenticate and/or authorize the user. In a third example, (i) a user who has access to the key 508 and (ii) who is also from the prespecified group of users (such as a user or an administrator of the assurance administrator tenancy 504) may create, alter, or delete security policies within the customer tenancy 150. In the third example, the IAM and/or the key verification component may verify as to whether the user is authorized to create, alter, or delete security policies. For example, in the third example described above, the IAM can authenticate and authorize the user, whereas the key verification component may verify the authenticity of the key, such that the combination of the IAM and the key verification component is used to determine whether the user is authorized to create, alter, or delete security policies.

The method 900 proceeds from 904 to 908, at which a determination is made as to whether the user or the administrator is authorized to create, alter, or delete security policies within the customer tenancy. The determination at 908 is performed by the IAM, as also described above. Note that in an example, as preselected users or administrators of only the assurance administrator tenancy 504 are allowed to create, alter, or delete security policies within the customer tenancy 150, the user or the administrator of the assurance administrator tenancy 504 may be authorized, in an example, to create, alter, or delete security policies within the customer tenancy.

If "No" at 908 (e.g., if the user or the administrator is not authorized to create, alter, or delete security policies within the second tenancy, and/or if the request is not accompanied by the key 508), then the method 900 proceeds from 908 to 912. At 912, the first request to create, alter, or delete the security policy is denied.

On the other hand, if "Yes" at 908 (e.g., if the user or the administrator is authorized to create, alter, or delete security policies within the second tenancy, and/or if the request is accompanied by the key 508), then the method 900 proceeds from 908 to 916. At 916, a determination is made as to whether the first request is accompanied by an authentic key, such as the key 508 of the assurance administrator tenancy 504 (see FIGS. 5 and 6). For example, if the key is present, an authentication operation of the key is performed (e.g., by the IAM, or another service responsible for creation, alteration, or deletion of security policies, such as the above-described key verification component).

If "Yes" at 916 (e.g., if the first request is accompanied by a key that passes an authentication check), then the method 900 proceeds from 916 to 920. At 920, the first request to create, alter, or delete the security policy is allowed.

On the other hand, if "No" at 916 (e.g., if the first request is not accompanied by a key, or the key cannot be authenticated), then the method 900 proceeds from 916 to 912, where the first request to create, alter, or delete the security policy is denied.

Note that operation 908 checks to see if the user or the administrator issuing the first request is authorized to create, alter, or delete security policies within the second tenancy, whereas operation 916 checks to see if the first request is accompanied by a cryptographic key (e.g., key 508). In an example, either operation 908, or operation 916, or both of operations 908 and 916 may be performed. Thus, at least one, or both of operations 908 and 916 may be performed, prior to allowing the first request to alter or delete the security zone policy.

The method 900 also proceeds from 904 to 924. At 924, the second request to create, alter, or delete the access control policy is denied e.g., by the IAM. For example, because the second request originates from a user or an administrator of the second tenancy (e.g., the assurance administrator tenancy 504) and not from the first tenancy (such as the customer tenancy 150), such a user or administrator cannot create, alter, or delete the access control policy. For example, no user or administrator of the assurance administrator tenancy can create, alter, or delete the access control policy. As described above, the access control policy can be created, altered, and/or deleted by personnel of the customer tenancy.

Unlocking and Relocking of Security Policies within a Cloud Environment

As described above, due to the security policies 120*a*, . . . , 120R implemented by the security zone plugin 108, API calls destined for the cloud resources 102*a*, . . . , 102N and violating one or more security policies are selectively blocked by the security zone plugin 108 and the proxy service 104. However, in an example, there may be legitimate scenarios where the cloud customer may want to perform activities that are explicitly denied in the security policies 120*a*, . . . , 120R.

For example, as described above, a security policy may prohibit passage of an API call to add a user to an administrator group of the customer tenancy 150, because the assurance administrator wants some degree of control or at least a monitoring role over users added to the administrator group of the customer tenancy 150. However, the cloud customer may legitimately want to add a user to the administrator group of the customer tenancy 150.

In another example and as also described above, a security policy may prohibit passage of an API call to create a compute instance from an unapproved image. However, the cloud customer may legitimately want to create a compute instance from an unapproved image of a virtual machine, e.g., for development and/or testing purposes.

In an example, there may be several such scenarios where the cloud customer may want to at least temporarily bypass one or more security policies 120, for legitimate purposes.

However, as described above, the cloud customer, to whom the customer tenancy 150 is rented, does not have privileges to modify, configure, or delete any security policy. Such privileges are accorded to personnel of the assurance administrator tenancy 504.

Accordingly, in an example, such bypassing of a security policy is performed jointly or collaboratively between the cloud customer and the assurance administrator. For example, the cloud customer and the assurance administrator may collaborate to temporarily unlock one or more of the security policies 120*a*, . . . , 120R. This way, the assurance administrator is aware of activities performed by the cloud customer (such as API calls received by the cloud resources 102*a*, . . . , 102M), while one or more of the security policies 120*a*, . . . , 120R are unlocked, or temporarily lifted or bypassed.

Figure 10:
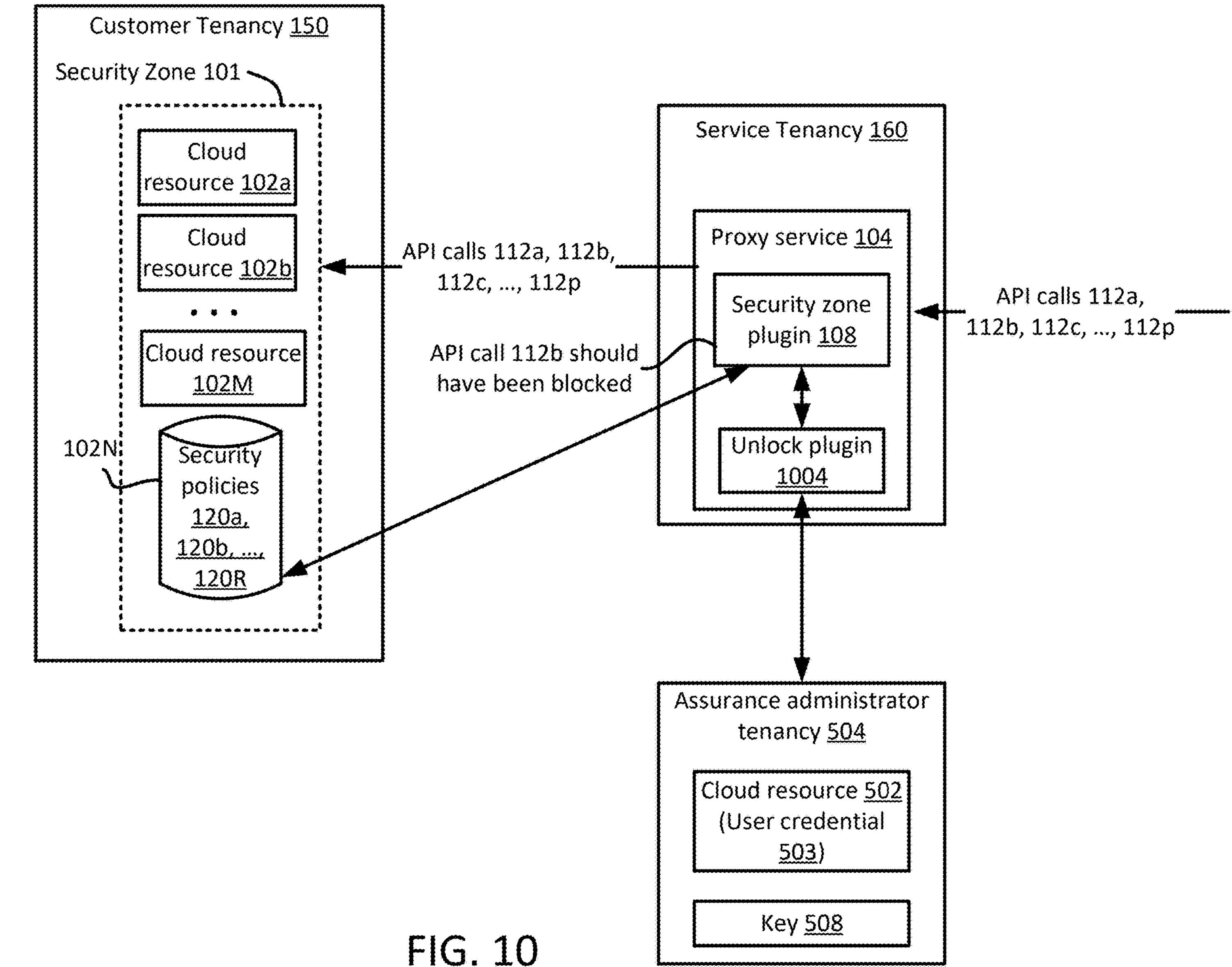
FIG. 10 illustrates an unlock plugin for temporarily unlocking one or more of a plurality of security policies implemented within a security zone of a customer tenancy of a cloud environment.

FIG. 10 illustrates an unlock plugin 1004 for temporarily unlocking one or more of a plurality of security policies 120*a*, . . . , 120R implemented within a security zone 101 of a customer tenancy 150 of a cloud environment 1000. The unlock plugin 1004 communicates with the security zone plugin 108 and the proxy service 104, to at least temporarily unlock one or more of the security policies 120*a*, . . . , 120R. Although illustrated as being two separate plugins, in an example, the security zone plugin 108 and the unlock plugin 1004 may be combined in a single plugin.

Figure 11:
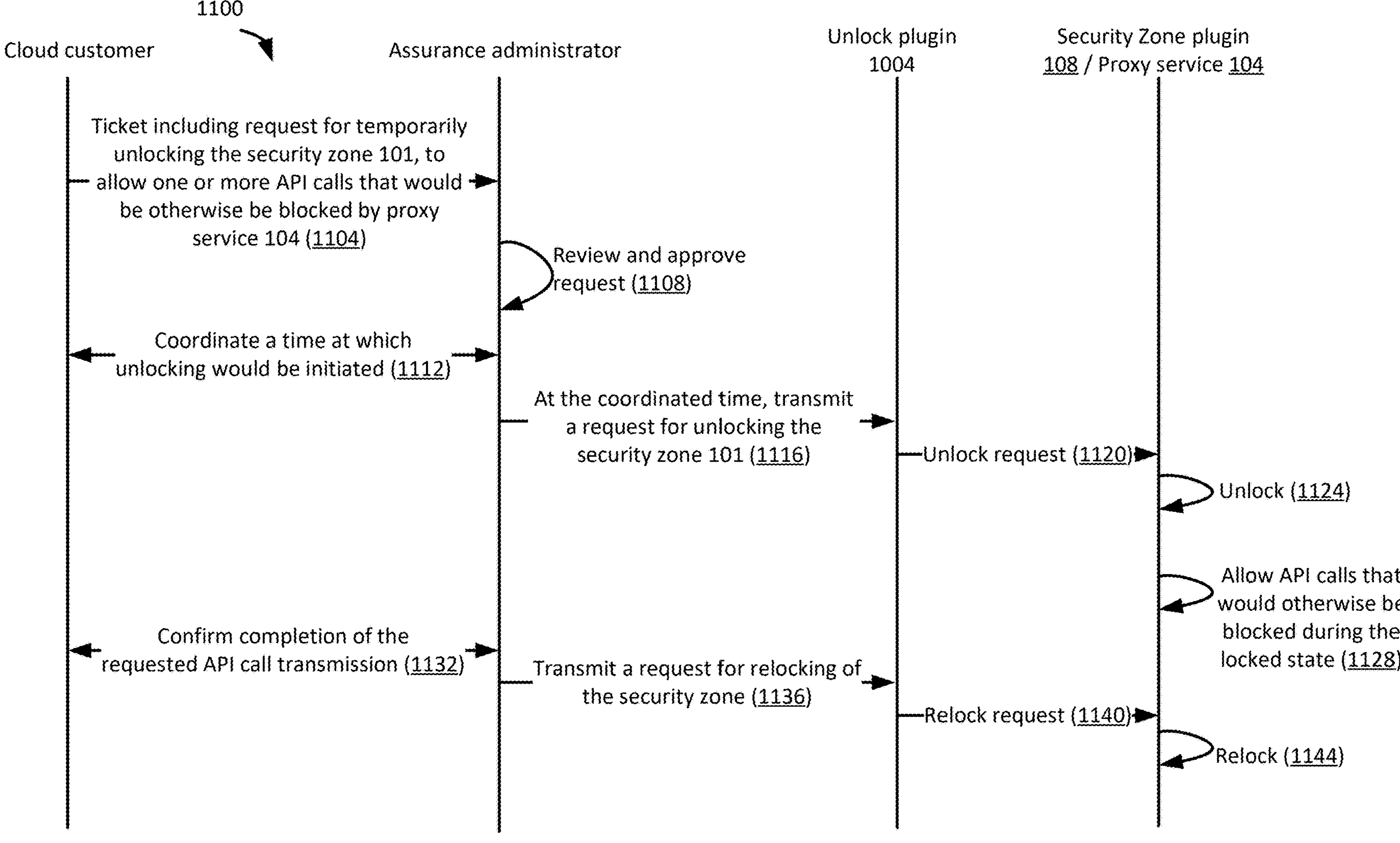
FIG. 11 illustrates a flow diagram depicting temporary unlocking of a plurality of security policies implemented within a security zone of a customer tenancy of a cloud environment.

FIG. 11 illustrates a flow diagram 1100 depicting temporary unlocking of a plurality of security policies 120*a*, . . . , 120R implemented within a security zone 101 of a customer tenancy 150 of a cloud environment 1000. The flow diagram 1100 can be implemented within the cloud environment 1000 of FIG. 10. The actors participating in the flow diagram 1100 includes the cloud customer (such as a user or an administrator of the customer tenancy 150, a personnel and/or a device of the cloud customer), the assurance administrator (such as a user or an administrator of the assurance administrator tenancy 504, a personnel and/or a device of the assurance administrator), the unlock plugin 1004 illustrated in FIG. 10, and the security zone plugin 108 and/or the proxy service 104 of FIG. 10.

At 1104 of the flow diagram 1100, the cloud customer transmits a ticket to the assurance administrator. The ticket includes a request for temporarily unlocking the security zone 101, to allow one or more API calls that would be otherwise be blocked by proxy service 104. The ticket may be in the form of an email, a memo, an electronic message, a verbal conversation, or any form of electronic communication between the cloud customer and the assurance administrator. The request at 1104 may include indication of one or more types of API calls and/or corresponding API call parameters the cloud customer wants to be allowed while the security zone 101 is unlocked.

At 1108, the assurance administrator reviews and approves the request for temporarily unlocking the security zone 101. For example, the assurance administrator reviews the list of API calls that the cloud customer wants to be transmitted to one or more of the cloud resources 102*a*, . . . , 102M, while the security zone 101 is unlocked. Based on such a review, if the assurance administrator finds the list of API calls to be satisfactory, the assurance administrator approves the request at 1108, in an example.

At 1112, the cloud customer and the assurance administrator mutually coordinate a time at which the unlocking of the security zone would be initiated.

At 1116, at the coordinated time, the assurance administrator transmits a request for unlocking the security zone 101 to the unlock plugin 1004. As illustrated in FIG. 10, the assurance administrator tenancy 504 communicates with the unlock plugin 1004. In an example, such a request for unlocking may be from an authorized user credential 503 of the assurance administrator tenancy 504 (see FIGS. 5 and 10). Thus, such a request for unlocking may be from a user or an administrator from a preselected group of users or administrators of the assurance administrator tenancy 504, where the members of the group is authorized to unlock the security zone 101 and/or unlock individual (or all) the security policies 120*a*, . . . , 120R. In an example, the request for unlocking at 1116 of FIG. 11 may be accompanied by the above-described key 508 of FIGS. 5 and 10.

The unlock plugin 1004 may authenticate the request for unlocking. For example, the unlock plugin 1004 may communicate with the IAM, to authenticate and/or authorize an originator of the unlocking request (such as the user credential 503) and/or the accompanying key 508. In another example, the request for unlocking may be transmitted to the unlock plugin 1004 through the IAM, where the IAM authenticates an originator of the request (such as the user credential 503) and/or the key, authorizes fulfillment of the unlocking request, and forwards the authorization to the unlock plugin 1004.

In an example, once the unlock plugin 1004 has authenticated and authorized the originator of the unlocking request (such as the user credential 503) and/or the accompanying key 508, the unlock plugin 1004 forwards the unlock request to the security zone plugin 108 and/or the proxy service 104, e.g., at 1120 of FIG. 11. In an example where the unlock plugin 1004 and the security zone plugin 108 are combined in a single plugin module, the operations at 1120 may be superfluous.

At 1124, the security zone plugin 108 and/or the proxy service 104 unlocks the security zone 101. Thus, when the security zone plugin 108 is unlocked, the security zone plugin 108 and/or the proxy service 104 does not implement the security policies 120*a*, . . . , 120R. For example, the security zone plugin 108 may still check for API calls for violation of security policies, but nonetheless the proxy service 104 allows such API calls that should have been otherwise blocked due to a security policy. In another example, the security zone plugin 108 may not even check the API calls for violation of security policies.

For example, at 1128, the security zone plugin 108 and/or the proxy service 104 allow API calls that would otherwise be blocked during the locked state of the security zone 101. For example, referring to FIG. 10, assume that API call 112*b* should have been blocked for violation of a security policy, if the security zone 101 was locked. However, in the unlocked state, the proxy service 104 allows the API call 112*b* to its intended destination, along with the other API calls 112*a*, 112*c*, . . . , 112*p*. In one example, the security zone plugin 108 detects that the API call 112*b* is in violation of a security policy, and the proxy service 104 still allows the API call 112*b* to its intended destination. In another example, the security zone plugin 108 does not even detect that the API call 112*b* is in violation of a security policy, as the security policy is temporarily unlocked.

Once the API calls, which the cloud customer wanted to transmit during the unlocked state of the security zone, have been transmitted, at 1132, the cloud customer and the assurance administrator communicate between themselves to confirm completion of such API calls.

Now the assurance administrator can relock the security zone 101. Accordingly, at 1136, the assurance administrator transmits to the unlock plugin 1004 a request for relocking of the security zone 101. In an example, the request may be from the user credential 503 and/or may be accompanied by the key 508. Similar to the operations described above with respect to at 1116, the sender of the request at 1136 and/or the key 508 are authenticated and authorized (e.g., by the IAM and/or the unlock plugin 1004). Subsequently, at 1140, the unlock plugin 1004 transmits a relock request to the security zone plugin 108 and/or the proxy service 104. At 1144, the security zone 101 is relocked, such that API calls in violation of one or more security policies are again blocked by the proxy service 104.

Thus, in the flow diagram 1100 FIG. 11, the entire security zone 101 is unlocked at 1124, and relocked at 1144, such that all the security policies 120*a*, . . . , 120R are, in unison, (i) either implemented (e.g., when the security zone 101 is locked), or (ii) bypassed or temporarily lifted (e.g., when the security zone 101 is unlocked). This is an example of a coarse grain unlocking, as all security policies are temporarily bypassed or unlocked at the same time, and all security policies are relocked or reimplemented at the same time.

However, instead of unlocking and relocking all security policies at the same time, a finer level of control may be implemented on the security policies, such that one or more (but not necessarily all) security policies can be temporarily unlocked or bypassed, and then relocked, as described below with respect to FIG. 12.

Figure 12:
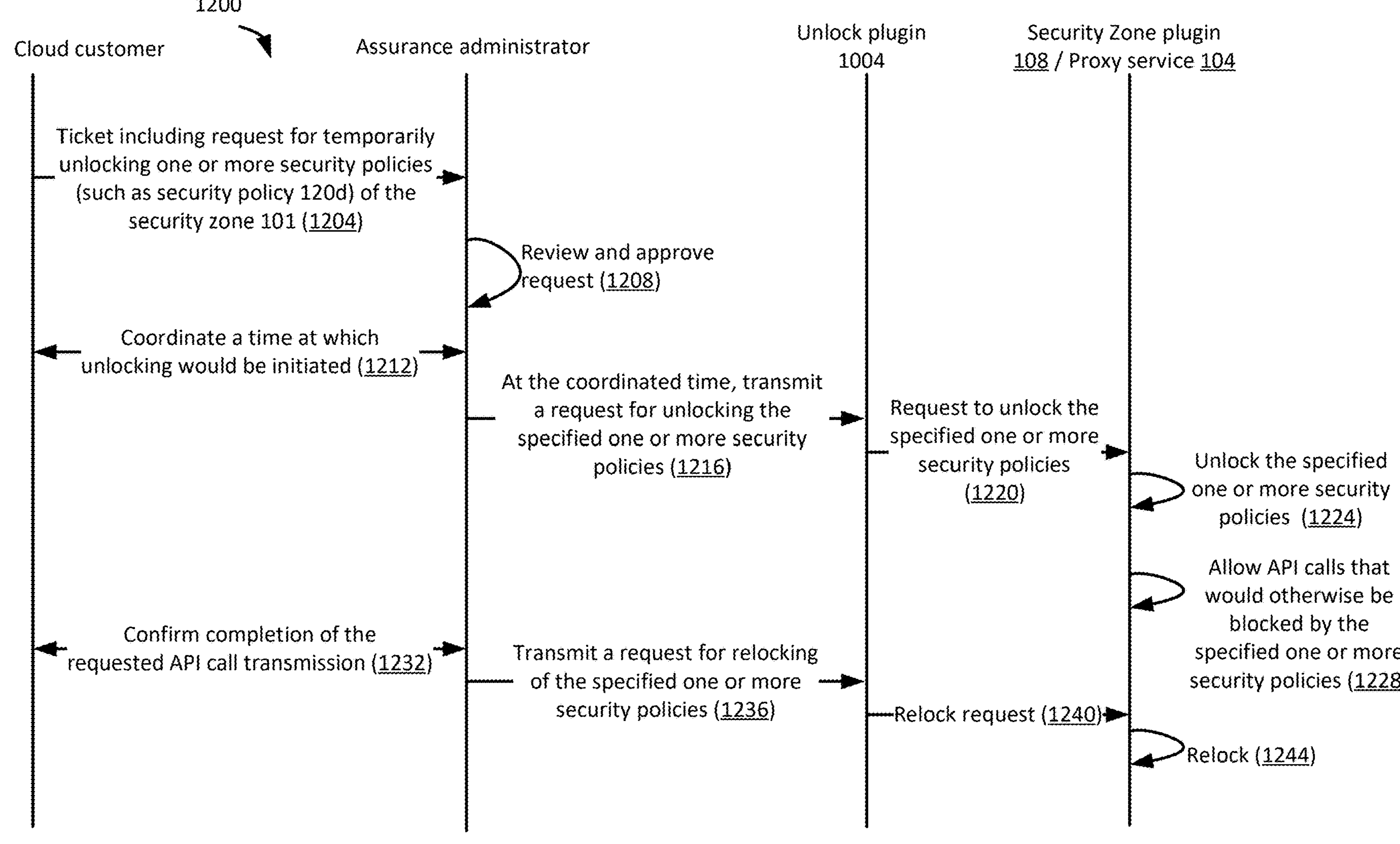
FIG. 12 illustrates a flow diagram depicting temporary unlocking of one or more (but not necessarily all) of a plurality of security policies implemented within a security zone of a customer tenancy of a cloud environment.

FIG. 12 illustrates a flow diagram 1200 depicting temporary unlocking of one or more (but not necessarily all) of a plurality of security policies 120*a*, . . . , 120R implemented within a security zone 101 of a customer tenancy 150 of a cloud environment 1000.

The flow diagram 1200 can be implemented within the cloud environment 1000 of FIG. 10. The actors participating in the flow diagram 1200 includes the cloud customer (such as a user or an administrator of the customer tenancy 150, a personnel and/or a device of the cloud customer), the assurance administrator (such as a user or an administrator of the assurance administrator tenancy 504, a personnel and/or a device of the assurance administrator), the unlock plugin 1004 illustrated in FIG. 10, and the security zone plugin 108 and/or the proxy service 104 of FIG. 10.

At 1204 of the flow diagram 1200, the cloud customer transmits a ticket to the assurance administrator. The ticket includes a request for temporarily unlocking specific one or more security policies of the plurality of security policies 120*a*, . . . , 120R of the security zone 101, to allow one or more API calls that would be otherwise be blocked by proxy service 104 based on the specified one or more security policies. Meely as an example, FIG. 12 specifies an example security policy 120*d* that is to be temporarily unlocked (such as temporarily bypassed). As described above, the ticket may be in the form of an email, a memo, an electronic message, a verbal conversation, or any form of electronic communication between personnel of the cloud customer and the assurance administrator.

At 1208, the assurance administrator reviews and approves the request for temporarily unlocking the specified one or more security policies (e.g., as described above with respect to 1108 of FIG. 11).

At 1212, personnel of the cloud customer and the assurance administrator coordinate a time at which the unlocking of the specified one or more security policies (as specified within the request of 1204) would be initiated.

At 1216, at the coordinated time, the assurance administrator transmits a request for unlocking the specified one or more security policies. In an example, origination and/or authentication of the request at 1216 may be similar to the description above with respect to 1116 of FIG. 11.

Once the unlock plugin 1004 has authenticated the originator of the unlocking request (such as the user credential 503) and/or the accompanying key 508, the unlock plugin 1004 forwards the unlock request to the security zone plugin 108 and/or the proxy service 104 at 1220, along with an identification of the specified one or more security policies that are to be unlocked. In an example where the unlock plugin 1004 and the security zone plugin 108 are combined in a single plugin module, the operations at 1220 may be superfluous.

At 1224, the security zone plugin 108 selectively unlocks or lifts the specified one or more security policies. For example, security policies not specified within the request of 1204 are still implemented. Only the specified security policies (such as the security policy 120*d*) are unlocked. Thus, from 1224, the security zone plugin 108 and/or the proxy service 104 does not implement the unlocked one or more security policies (such as the specified security policy 120*d*). For example, the security zone plugin 108 may still check for API calls for violation of the unlocked security policies, but nonetheless allows such API calls that should have been otherwise blocked due to the unlocked security policies.

For example, if the cloud customer has requested unlocking of a specific security policy 120*d*, then at 1228 of FIG. 12, the security policies 120*a*, 120*b*, 120*c*, 120*e*, . . . , 120R (but not security policy 120*d*) are implemented as usual by the security zone plugin 108 and/or the proxy service 104. Furthermore, as the security policy 120*d* is unlocked, at 1228, the security zone plugin 108 and/or the proxy service 104 allow passage of API calls that would otherwise be blocked during the locked state of the security policy 120*d*. In one example, the security zone plugin 108 detects that the API calls that are in violation of the security policy 120*d*, and the proxy service 104 nonetheless allows such API calls to their intended destinations within the security zone 101.

In another example, the security zone plugin 108 does not even detect that the API calls that may be in violation of the security policy 120*d*, as the security policy 120*d* is temporarily unlocked.

Once the API calls, which the cloud customer wanted to transmit during the unlocked state of the specified security policies, have been transmitted, at 1232, the cloud customer and the assurance administrator communicates between themselves to confirm completion of such API calls. Now the assurance administrator can relock the security policies that are currently unlocked.

Accordingly, at 1236, the assurance administrator transmits to the unlock plugin 1004 a request for relocking of the specified security policies. In an example, the request may be from the user credential 503 and/or may be accompanied by the key 508. In an example, similar to the operations described above with respect to at 1116, the sender of the request at 1236 and/or the key 508 are authenticated (e.g., by the IAM and/or the unlock plugin 1004).

Subsequently, at 1240, the unlock plugin 1004 transmits a relock request to the security zone plugin 108 and/or the proxy service 104. At 1244, the security policies are relocked, such that API calls in violation of such security policies are again blocked by the proxy service 104.

Figure 13:
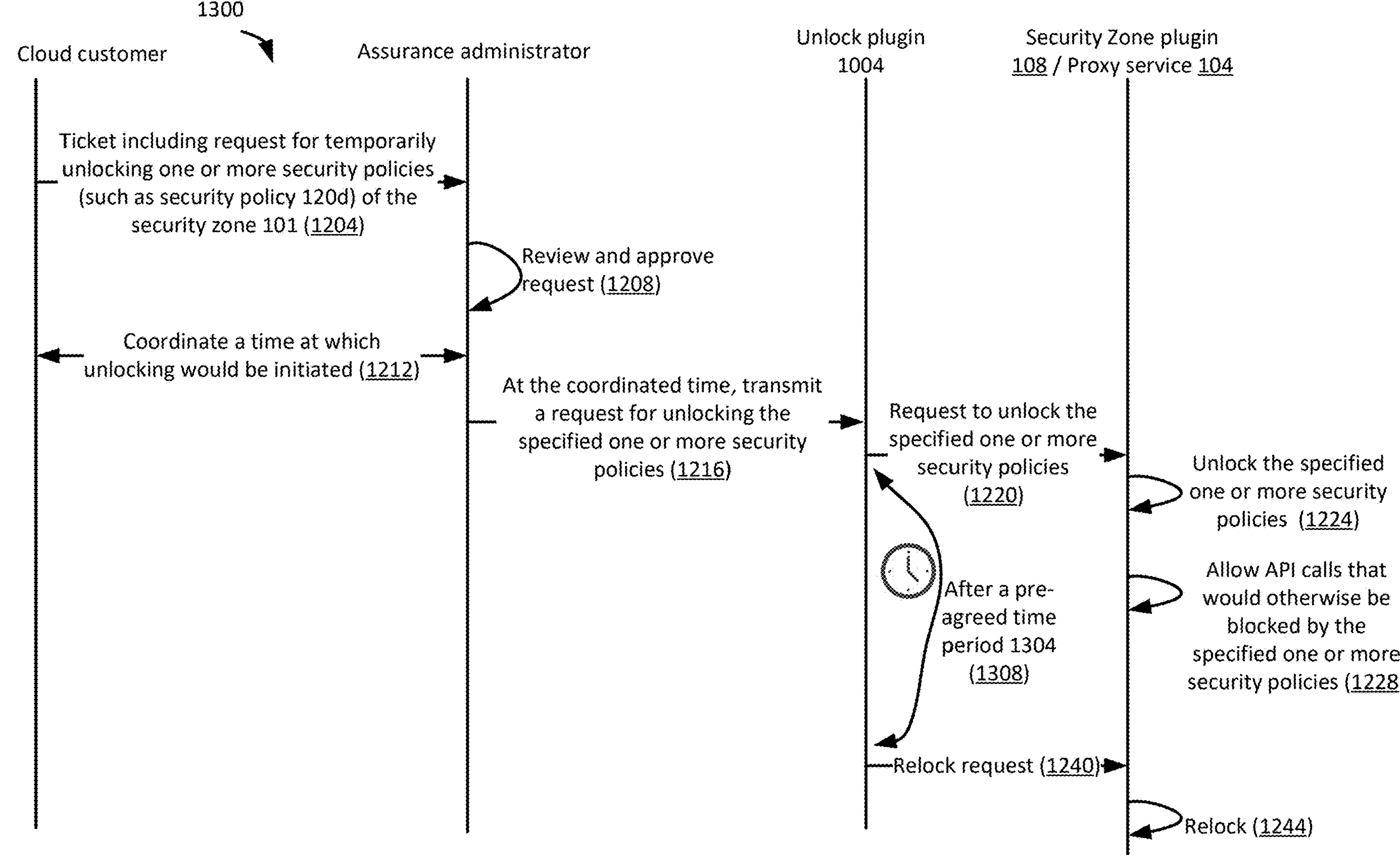
FIG. 13 illustrates a flow diagram depicting temporary unlocking of one or more (but not necessarily all) of a plurality of security policies implemented within a security zone of a customer tenancy of a cloud environment, wherein the unlocked security policies are relocked after elapse of a predefined time period from temporary unlocking the security policies.

FIG. 13 illustrates a flow diagram 1300 depicting temporary unlocking of one or more (but not necessarily all) of a plurality of security policies 120*a*, . . . , 120R implemented within a security zone 101 of a customer tenancy 150 of a cloud environment 1000, wherein the unlocked security policies are relocked after elapse of a predefined time period from temporary unlocking the security policies.

The flow diagram 1300 of FIG. 13 is at least in part similar to the flow diagram 1200 of FIG. 12. For example, the flow diagram 1300 of FIG. 13 comprises operations 1204, 1208, 1212, 1216, 1220, 1224, and 1228, which are similar to the corresponding operations described above with respect to flow diagram 1200 of FIG. 12.

However, in the flow diagram 1200 of FIG. 12, the relocking request at 1240 is triggered based on operation 1232, where the assurance administrator receives confirmation of completion of the requested API calls. In contrast, in the flow diagram 1300 of FIG. 13, the relocking request at 1240 is triggered automatically upon completion of a pre-agreed time period 1304 from unlocking of the security policies (labelled as operation 1308 in FIG. 13).

In an example, the pre-agreed time period 1304 may be negotiated between personnel of the cloud customer and the assurance administrator, e.g., during operations 1204 and/or 1212, or at another time. For example, the pre-agreed time period 1304 may be sufficient to complete all the API calls that the cloud customer wants to transmit during the unlocked period. Thus, the duration of the pre-agreed time period 1304 may be based on a number of API calls that the cloud customer wants to transmit during the unlocked period.

In an example, the pre-agreed time period 1304 commences from a time at which the request to unlock the specified one or more security policies is transmitted at 1220 to the security zone plugin 108 and/or the proxy service 104, as illustrated in FIG. 13. In another example, the pre-agreed time period 1304 commences from a time at which the actual unlocking of the specified one or more security policies occurs. In yet another example, the pre-agreed time period 1304 commences from a time at which the request to unlock the specified one or more security policies is received by the security zone plugin 108 and/or the proxy service 104.

After completion of the time period 1304, the unlock plugin 1004 transmits the request 1240 to relock the security policies that were earlier unlocked. Based on such a request, at 1244, the specified security policies are relocked by the security zone plugin 108 and/or the proxy service 104.

Note that the time bound approach to relock the security policies of FIG. 13 can be applicable to the scenario described with respect to FIG. 12 (where individual security policies can be unlocked and relocked) and/or can also be applicable to the scenario described with respect to FIG. 11 (where the entire security zone 101 is unlocked and relocked at its entirety).

Figure 14:
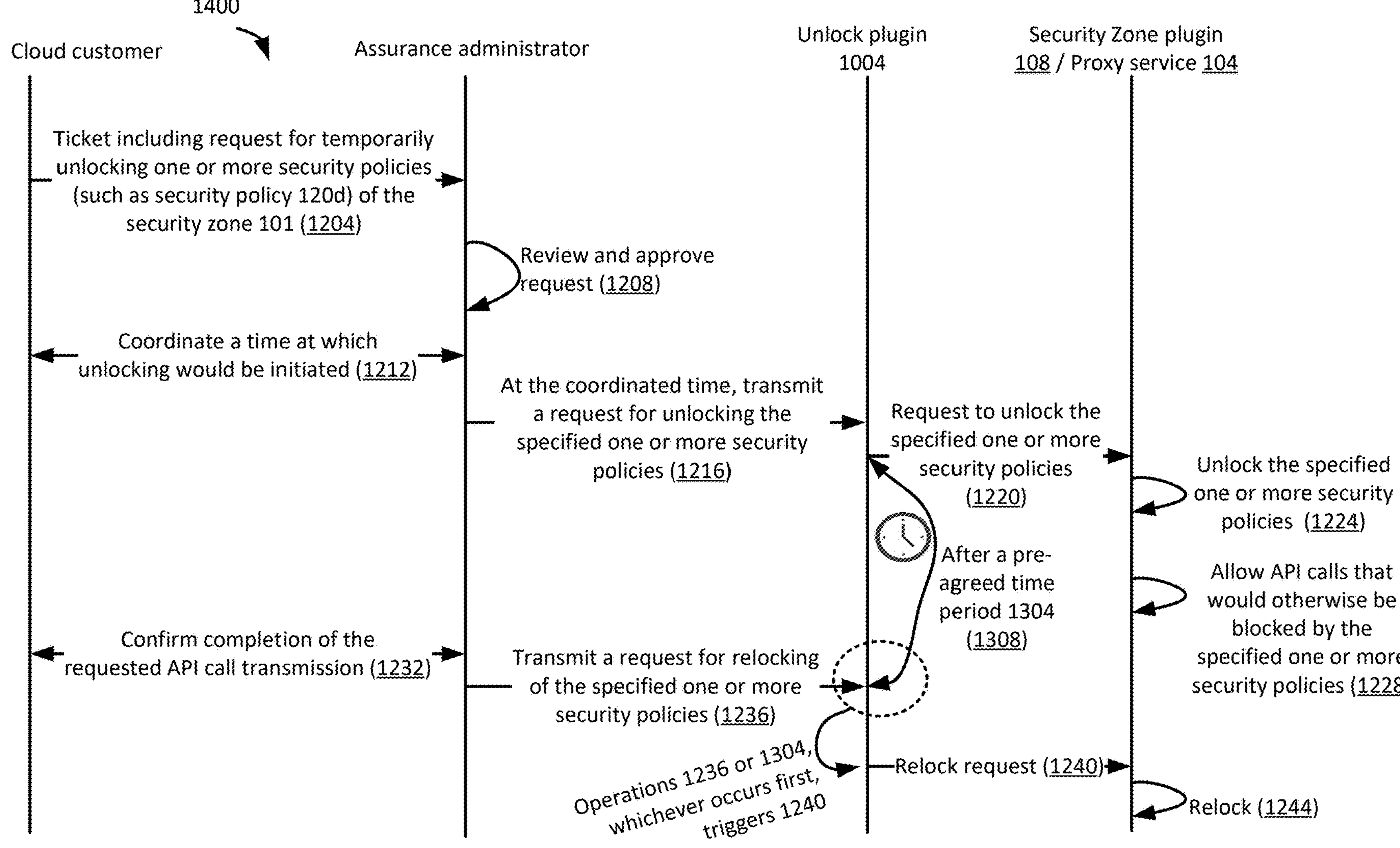
FIG. 14 illustrates a flow diagram depicting temporary unlocking of one or more (but not necessarily all) of a plurality of security policies implemented within a security zone of a customer tenancy of a cloud environment, wherein the unlocked security policies are relocked in response to any of (i) after elapse of a predefined time period from temporary unlocking the security policies, or (ii) receiving a confirmation of completion of requested API call transmissions.

FIG. 14 illustrates a flow diagram 1400 depicting temporary unlocking of one or more (but not necessarily all) of a plurality of security policies 120*a*, . . . , 120R implemented within a security zone 101 of a customer tenancy 150 of a cloud environment 1000, wherein the unlocked security policies are relocked in response to any of (i) after elapse of a predefined time period from temporary unlocking the security policies, or (ii) receiving a confirmation of completion of requested API call transmissions.

The flow diagram 1400 of FIG. 14 is at least in part similar to the flow diagrams 1200 and 1300 of FIGS. 12 and 13, respectively. For example, the flow diagram 1400 of FIG. 14 comprises operations 1204, 1208, 1212, 1216, 1220, 1224, 1228, and 1308, which are similar to the corresponding operations described above with respect to flow diagram 1300 of FIG. 13. The flow diagram 1400 of FIG. 14 also comprises operations 1232 and 1236, which are similar to the corresponding operations described above with respect to flow diagram 1200 of FIG. 12.

Thus, the flow diagram 1400 of FIG. 14 is a combination of the flow diagram 1200 of FIG. 12 and the flow diagram 1300 of FIG. 13. For example, in the flow diagram 1400 of FIG. 14, the relock request 1240 is triggered by operation 1236 or 1308, whichever occurs first.

Thus, in the flow diagram 1200 of FIG. 12, the assurance administrator communicates with the cloud customer in real or near-real time, to receive updates on whether the requested API call transmissions are completed while one or more (or all) of the security policies are unlocked, and requests relocking of the security policies after receiving a confirmation of completion of the requested API call transmissions from the cloud customer. On the other hand, in the flow diagram 1300 of FIG. 13, the security policies are relocked after a specified amount of time 1304 from the unlocking event. In an example, the two approaches described in the flow diagrams 1200 and 13300 may be combined, to form a hybrid relocking approach, as depicted in the flow diagram 1400 of FIG. 14.

For example, the time period 1304 of FIG. 14 may be set to a maximum time period that the security policies may remain unlocked. The actual relocking of the security policies occurs either (i) after confirmation from the cloud administrator to the assurance administrator that the requested activities are complete (see operations 1232 and 1236), or (ii) after the maximum time period 1304 set by a time has expired (see operation 1308), whichever one of (i) or (ii) occurs earlier. Thus, as illustrated in FIG. 14, operations 1236 or 1304, whichever occurs earlier, triggers the relocking request at 1240. The flow diagram 1400 will be evident, based on the above description, and the description with respect to FIGS. 12 and 13.

FIG. 15 illustrates a method 1500 for temporary unlocking and relocking of one or more security policies implemented within a security zone of a customer tenancy of a cloud environment. The method 1500 can be implemented within the cloud environment 1000 of FIG. 10.

At 1504 of the method 1500, a request to temporarily unlock one or more security policies of a plurality of security policies is received. In an example, the plurality of security policies may be applicable to a security zone of a tenancy within a cloud environment, such as applicable to the security zone 101 of the customer tenancy 150 of the cloud environment 1000 of FIG. 10. In an example, the request may be received by the assurance administrator. In another example, the request may be received by the unlock plugin 1004. In yet another example, the request may be received by the IAM of the cloud environment 1000. In a further example, the request may be received by the security zone plugin 108 and/or the proxy service 104.

At 1508, a user credential associated with an origin of the request to temporarily unlock the one or more security policies is determined. The determination may be made by the unlock plugin 1004, the IAM of the cloud environment 1000, the security zone plugin 108, and/or the proxy service 104. In an example, the user credential may be that of a personnel of the assurance administrator, such as a user or an administrator of the assurance administrator tenancy 150. For example, as described above, the user credential may be the user credential 503, see FIGS. 5 and 10.

At 1512, a determination is made that the user credential is included in a prespecified group of user credentials, wherein the prespecified group of user credentials excludes any administrator or any user of the tenancy. The prespecified group represent a group of users who are authorized to temporarily unlock one or more security policies.

For example, as described above, a user or an administrator of the assurance administrator tenancy 504 can unlock security policies, and hence, the prespecified group of user credentials includes personnel of the assurance administrator, such as one or more users and/or one or more administrators of the assurance administrator tenancy 504. However, as also described above, personnel of the cloud customer (such as users and/or administrators of the customer tenancy 150) cannot create, modify, delete, or unlock security policies. Accordingly, in an example, the prespecified group of users, who are authorized to temporarily unlock one or more security policies, excludes any administrator or any user of the customer tenancy 150.

At 1516, the one or more security policies of the plurality of security policies are temporarily unlocked. For example, at operation 1124 or 1224 of FIGS. 11-14, one or more security policies applicable to the security zone 101 (or all security policies applicable to the security zone 101) are unlocked. In an example, the unlocking is performed, in response to the determination at 1512 that the user credential is included in the prespecified group of user credentials. The unlocking at 1516 can be done by the security zone plugin 108 and/or the proxy service 104, as described above with respect to FIGS. 11-14.

At 1520, API calls, which (i) are destined for cloud resources within the security zone and (ii) would have been blocked by the one or more security policies if these were not unlocked, are allowed passage to their intended targets, such as cloud resources 102*a*, . . . , 102M within the security zone 101. Such allowance of passage of the API calls are also described above with respect to operations 1128 and 1228 of FIGS. 11-14.

At 1524, a triggering event for relocking the one or more security policies is detected. As described above with respect to FIGS. 11 and 12, the triggering event can be a confirmation of completion of requested API call transmission (such as operations 1132, 1136 of FIG. 11, or 1232, 1236 of FIG. 12). As described above with respect to FIG. 13, the triggering event can be completion of the time period 1304 (such as operation 1308 of FIG. 13). As described above with respect to FIG. 14, the triggering event can be any of (i) the confirmation of completion of requested API call transmission (such as operations 1232, 1236 of FIG. 14) and/or (ii) the completion of the time period 1304 (such as operation 1308 of FIG. 14), whichever of (i) or (ii) occurs earlier. The triggering event at 1524 can be detected by the assurance administrator, by the unlock plugin 1004, and/or by the security zone plugin 108 and/or the proxy service 104.

At 1528, in response to detecting the triggering event, the one or more security policies are relocked. Such relocking operation of the security policies are described above with respect to operations 1144 and 1244 of FIGS. 11-14.

Activity Monitoring During Unlocked State of Security Policies within a Cloud Environment As described above, when one or more of the security policies 120*a*, . . . , 120R are unlocked, the proxy service 104 allows API calls that would otherwise be blocked during the locked state of these security policies. For example, during the unlocked state of the security policies, the cloud resources 102*a*, . . . , 102N are expected to receive and allow API calls associated specifically with activities mentioned within the ticket request (see operations 1104 or 1204 of FIGS. 11-14) that was initially transmitted by the cloud customer to the assurance administrator. Thus, the proxy service 104 is expected to allow API calls associated specifically with activities mentioned within the ticket request. Thus, during this unlocked period, the cloud resources 102*a*, . . . , 102N are expected to receive API calls pertaining to activities that were pre-agreed between the cloud customer and the assurance administrator.

However, there may be some degree of lack of trust between the cloud customer and the assurance administrator. For example, the assurance administrator may want to ensure that during the unlocked state of the one or more security policies, the proxy service 104 actually allows those API calls, which were pre-agreed upon between the cloud customer and the assurance administrator. For example, the assurance administrator may want to ensure that the cloud customer do not take undue advantage of the unlocked state of the security policies, to have API calls passed through the proxy service 104, where one or more of such API calls were not previously pre-agreed upon between the cloud customer and the assurance administrator.

Thus, in an example, the assurance administrator may want to monitor and log API calls allowed by the proxy service 104. However, such monitoring and/or logging at all times (such as during the locked and unlocked states of the security policies) may not be desirable from the cloud customer point of view, as such monitoring and/or logging may be deemed as being invasive to privacy of the cloud customer. This is because, for example, the cloud customer may want to transmit API calls during the locked state of the security policies, without any additional monitoring and/or logging by the assurance administrator, as the security policies already ensure that API calls violating one or more security policies are being blocked by the proxy service 104. Accordingly, the assurance administrator may want to monitor and/or log API calls specifically during an unlocked state of one or more security policies.

Figure 16:
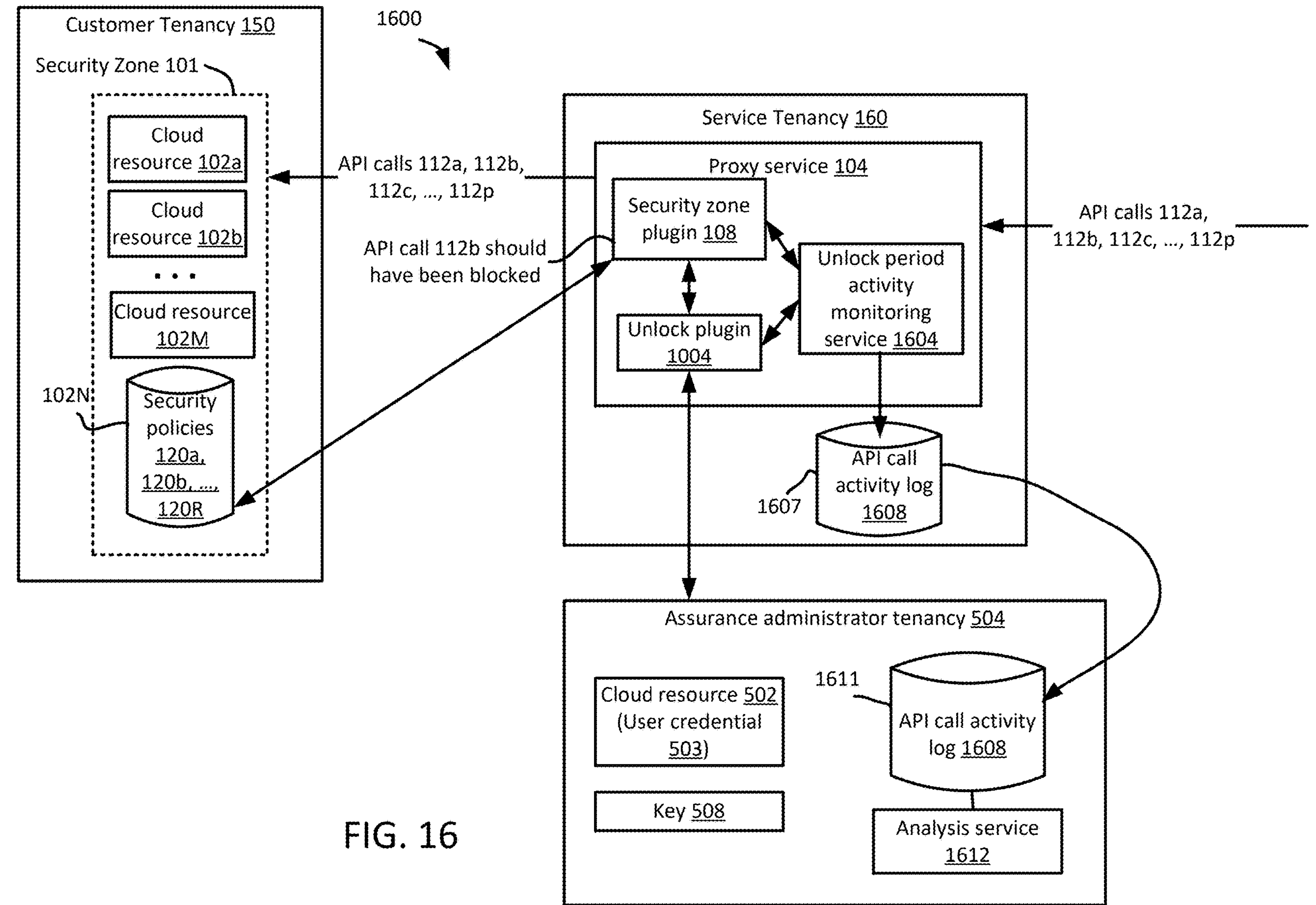
FIG. 16 illustrates an unlock period activity monitoring service for monitoring and/or logging API calls made during an unlock period of a security zone of a customer tenancy within a cloud environment.

FIG. 16 illustrates an unlock period activity monitoring service 1604 for monitoring and/or logging API calls made during an unlock period of a security zone 101 of a customer tenancy 150 within a cloud environment 1600. The "unlock period of the security zone 101" implies that one or more (or all) security policies associated with the security zone 101 are unlocked or bypassed, as described above with respect to FIGS. 10-15.

In an example, during the unlock period of the security zone 101, all security policies associated with the security zone 101 may be bypassed or unlocked, e.g., as described above with respect to FIG. 11 (also referred to as "coarse grain unlocking" herein above). In another example, during the unlock period of the security zone 101, one or more (but not necessarily all) of the security policies associated with the security zone 101 may be bypassed or unlocked, e.g., as described above with respect to FIGS. 11-14 (also referred to as "fine grain unlocking" herein above).

For example, the unlock period activity monitoring service 1604 monitors and logs API calls made during the unlock period of the security zone 101, such as when one or more of the security policies 120*a*, . . . , 120R are unlocked. The unlock period activity monitoring service 1604 stores an API call activity log 1608 within a storage repository 1607 that is within the service tenancy 160, where the API call activity log 1608 includes a selective log of one or more API calls that were allowed passage by the proxy service 104 during the unlock period of the security zone 101, such as when one or more of the security policies 120*a*, . . . , 120R are unlocked.

Figure 17:
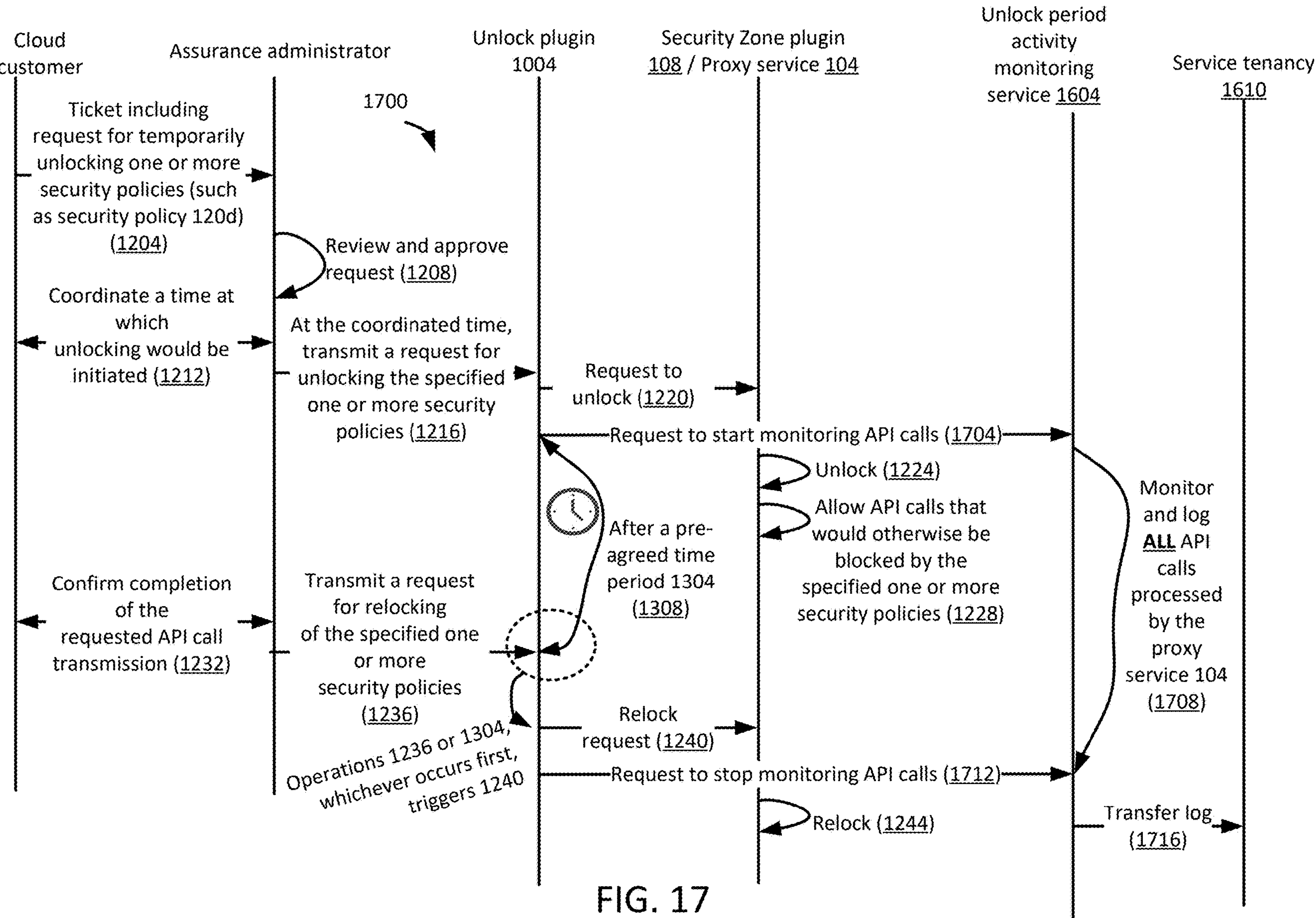
FIG. 17 illustrates a flow diagram depicting monitoring and/or logging of API calls processed by a security zone plugin and/or a proxy service, when one or more security policies associated with a security zone of a customer tenancy within a cloud environment are unlocked.

FIG. 17 illustrates a flow diagram 1700 depicting monitoring and/or logging of API calls processed by a security zone plugin 108 and/or a proxy service 104, when one or more security policies associated with a security zone 101 of a customer tenancy 150 within a cloud environment 1600 are unlocked.

The flow diagram 1700 includes operations 1204, 1208, 1212, 1216, 1220, 1224, 1228, 1308, 1232, 1236, 1240, and 1244, which are at least in part similar to the corresponding operations of the flow diagrams 1200-1400 of FIGS. 12-14. Additionally, the flow diagram 1700 of FIG. 17 includes an operation 1704, where the unlock plugin 1004 of FIG. 16 transmits a request to start monitoring API calls to the unlock period activity monitoring service 1604. The request at 1704 is transmitted in response to, or simultaneously with, or immediately before the unlock plugin 1004 transmitting the request to unlock one or more security policies at 1220 to the security zone plugin 108 and/or a proxy service 104.

Note that in an example, the unlock plugin 1004, the security zone plugin 108, and/or the unlock period activity monitoring service 1604 may be combined in a single plugin, in which case the operation 1704 may be redundant or optional.

Upon receiving the request at 1704, and while one or more of the security policies are unlocked, the unlock period activity monitoring service 1604 starts to monitor and log API calls passing through the proxy service 104 (labelled as operation 1708 in FIG. 17). In the example of FIG. 17, "all" API calls processed by the proxy service 104, while one or more of the security policies are unlocked, are monitored and logged by the unlock period activity monitoring service 1604.

For example, the unlock period activity monitoring service 1604 updates the API call activity log 1608 within the storage repository 1607 of the service tenancy 160 with indication of all the API calls processed by the proxy service 104. For example, an API call type, an API call parameter, and/or a target destination of each such API call are logged in the API call activity log 1608 by the unlock period activity monitoring service 1604. Any other pertinent information associated with the API call (such as an origin of the API call, metadata associated with the API call, etc.) may also be logged by the unlock period activity monitoring service 1604.

Note that in the example of FIG. 17, the monitoring and logging operation at 1708 is initiated in response to the request at 1704. However, in another example, the monitoring and logging operation at 1708 may be initiated in response to the unlocking operation at 1224. In yet another example, the unlocking operation 1224 and initiation of the monitoring and logging operation at 1708 may be performed substantially simultaneously.

After or simultaneously with the unlock plugin 1004 transmitting the relock request 1240, the unlock plugin 1004 also transmits a request to stop monitoring API calls at 1712 to the unlock period activity monitoring service 1604. In response, the unlock period activity monitoring service 1604 stops monitoring and logging the API calls (e.g., causes termination of the monitoring and logging operation 1708).

Note that in the example of FIG. 17, the monitoring and logging operation at 1708 is terminated in response to the request at 1712. However, in another example, the monitoring and logging operation at 1708 may be terminated in response to, or immediately prior to, the relocking operation at 1244. In yet another example, the relocking operation 1244 and termination of the monitoring and logging operation at 1708 may be performed substantially simultaneously.

Thus, as described above with respect to FIGS. 16 and 17, in an example, the monitoring by the unlock period activity monitoring service 1604 may be performed when one or more security policies are unlocked, and not at other times. For example, the monitoring and logging is triggered, based on or simultaneously with unlocking the one or more security policies. Similarly, the monitoring and logging is stopped, based on or simultaneously with relocking the security policies.

Thus, in an example, the monitoring and logging is performed when the security policies are unlocked, and for example, not when the security policies are locked. This ensures that API calls, which are allowed or blocked by the proxy service 104 at the locked state of the security policies, are not logged and/or monitored by the unlock period activity monitoring service 1604. This ensures privacy or secrecy of the API calls destined for the cloud resource 102*a*, . . . , 102N of the security zone within the customer tenancy 150, while the security policies 120*a*, . . . , 120R are all locked.

In an example, after the monitoring and logging operation at 1708 is terminated, the unlock period activity monitoring service 1604 transfers the API call activity log 1608 to a storage repository 1611 within the assurance administrator tenancy 504, labelled as operation 1716 in FIG. 17.

In an example, after the API call activity log 1608 is stored within the storage repository 1611 of the assurance administrator tenancy 504, personnel of the assurance administrator use an analysis service 1612 to analyze the API calls logged within the API call activity log 1608. For example, the assurance administrator conducts such an analysis, to ensure that the cloud customer has transmitted during the unlocked period only those API calls, which were pre-agreed upon between the assurance administrator and the cloud customer. For example, the assurance administrator conducts such an analysis, to determine if the cloud customer has taken undue advantage of the unlocking of the one or more security policies, to transmit API calls that were (i) not pre-agreed upon between the assurance administrator and the cloud customer and (ii) that would have otherwise been blocked by the one or more security policies, if such security policies were not unlocked. In an example, results of such an analysis may be displayed on a user interface (UI) that is viewable by personnel of the assurance administrator.

Figure 18:
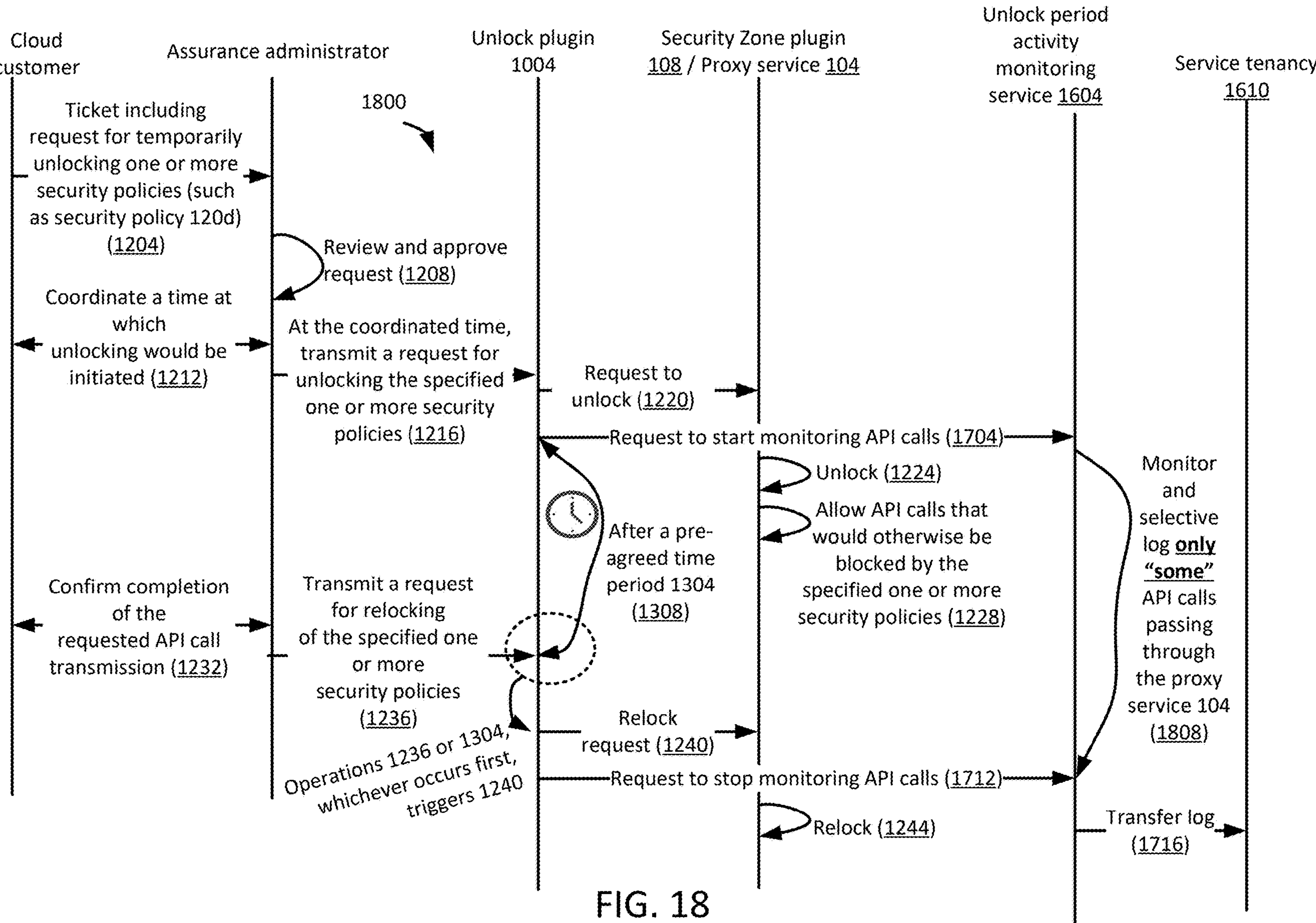
FIG. 18 illustrates a flow diagram depicting monitoring and/or logging of API calls processed by a security zone plugin and/or a proxy service, when one or more security policies associated with a security zone of a customer tenancy within a cloud environment is unlocked, wherein the logging is done for those API calls, which (i) are allowed passage by the proxy service during the unlocked state of the one or more security policies and (ii) would otherwise be blocked if the one or more security policies were locked.

FIG. 18 illustrates a flow diagram 1800 depicting monitoring and/or logging of API calls processed by a security zone plugin 108 and/or a proxy service 104, when one or more security policies associated with a security zone 101 of a customer tenancy 150 within a cloud environment 1600 is unlocked, wherein the logging is done for those API calls, which (i) are allowed passage by the proxy service 104 during the unlocked state of the one or more security policies and (ii) would otherwise be blocked if the one or more security policies were locked. Thus, when the one or more security policies are unlocked, the logging is done for those API calls that are in violation of the unlocked one or more security policies and are destined for cloud resources within the security zone 101.

The flow diagram 1800 of FIG. 18 is at least in part similar to the flow diagram 1700 of FIG. 17. However, in FIG. 17, during operation 1708, all API calls processed by the proxy service 104 are monitored and logged. In contrast, in the example of FIG. 18, the operation 1708 is replaced by a corresponding operation 1808. At 1808, only "some" (and not all) API calls processed by the proxy service 104 are logged.

For example, only those API calls, which (i) are allowed passage by the proxy service 104 during the unlocked state of the one or more security policies and (ii) would otherwise be blocked if the one or more security policies were locked, are logged within the API call activity log 1608 by the unlock period activity monitoring service 1604, as described below with respect to FIG. 19

FIG. 19 illustrates an example categorization of API calls processed by the proxy service 104, wherein the API calls are destined for cloud resources 102*a*, . . . , 102N of the security zone 101 of the customer tenancy 150 within the cloud environment 1600 of FIG. 16, and further illustrates an example manner in which the unlock period activity monitoring service 1604 logs one or more such API calls. FIG. 19 is described with respect to the cloud environment 1600 of FIG. 16 and the flow diagram 1800 of FIG. 18.

Top portion of FIG. 19 illustrates an example scenario in which example security policies 120*a*, 120*d* are to be unlocked at 1224 of flow diagram 1800 of FIG. 18, and example security policies 120*b*, 120*c*, 120*e*, 120*f*, . . . , 120R are to remain locked at 1224 of flow diagram 1800 of FIG. 18.

Bottom portion of FIG. 19 illustrates a table depicting categories of API calls received by the proxy service 104 during the unlock period of the security policies 120*a*, 120*d* (e.g., between 1224 and 1244 of flow diagram 1800 of FIG. 18).

For example, referring to the first row of the table of FIG. 19, a first category of API calls received and processed by the proxy service 104 during the unlock period includes a first plurality of API calls that do not violate any of the security policies 120*a*, 120*b*, . . . , 120R (e.g., do not violate any locked or unlocked security policy). Accordingly, the proxy service 104 allows such API calls. Note that these API calls would be always allowed, irrespective of whether security policies are locked or unlocked. Furthermore, in an example and as illustrated in first row of the table of FIG. 19, the unlock period activity monitoring service 1604 does not log such API calls at operation 1808 of the flow diagram 1800 of FIG. 18

Now referring to the second row of the table of FIG. 19, a second category of API calls received and processed by the proxy service 104 during the unlock period includes a second plurality of API calls that violate the unlocked security policies 120*a*, 120*d*. Because the security policies 120*a*, 120*d* are unlocked, the proxy service 104 allows such API calls. However, in an example and as illustrated in second row of the table of FIG. 19, because these API calls are in violation of the unlocked security policies 120*a*, 120*d*, the unlock period activity monitoring service 1604 logs such API calls at operation 1808 of the flow diagram 1800 of FIG. 18, and stores information associated with such API calls within the API call activity log 1608.

Now referring to the third row of the table of FIG. 19, a third category of API calls received and processed by the proxy service 104 during the unlock period includes a third plurality of API calls that violate the locked security policies 120*b*, 120*c*, 120*e*, 120*f*, . . . , 120R. Because the security policies 120*b*, 120*c*, 120*e*, 120*f*, . . . , 120R remain locked, the proxy service 104 blocks passage of such API calls to their target destination within the security zone 101.

Furthermore, as these third plurality of API calls are anyway blocked, and as the cloud customer is not getting any advantage for these third plurality of API calls by unlocking the security policies 120*a*, 120*d*, in an example, the unlock period activity monitoring service 1604 does not log such API calls at operation 1808 of the flow diagram 1800 of FIG. 18.

As described above, the analysis service 1612 analyzes the logged API calls, to ensure that the cloud customer did not transmit, during the unlock period, any API calls that were not agreed upon between the assurance administrator and the cloud customer. For example, the analysis service 1612 compares the logged second plurality of API calls (e.g., which violate the unlocked security policies 120*a*, 120*d*) of FIG. 19 with API calls that were pre-agreed upon between the assurance administrator and the cloud customer for transmission during the unlock period.

As illustrated in FIG. 19, for the flow diagram 1800 of FIG. 18, the unlock period activity monitoring service 1604 only logs the second category of API calls. However, in another example and as described above with respect to the flow diagram 1700 of FIG. 17, the unlock period activity monitoring service 1604 may monitor and log all the three categories of API calls during the unlock period of the security policies (e.g., monitor and log all API calls processed by the proxy service 104 during the unlock period).

In yet another example, the unlock period activity monitoring service 1604 may monitor and log only the second and the third plurality of API calls during the unlock period of the security policies (and not the first plurality of API calls). Thus, in this example, the unlock period activity monitoring service 1604 monitors and logs those API calls that are in violation of at least one security policy, irrespective of whether the security policy is unlocked (such as the security policy 102*a* or 102*d*) or the security policy remains unlocked (such as any of the security policies 102*b*, 120*c*, 102*e*, . . . , 120R).

Figure 20:
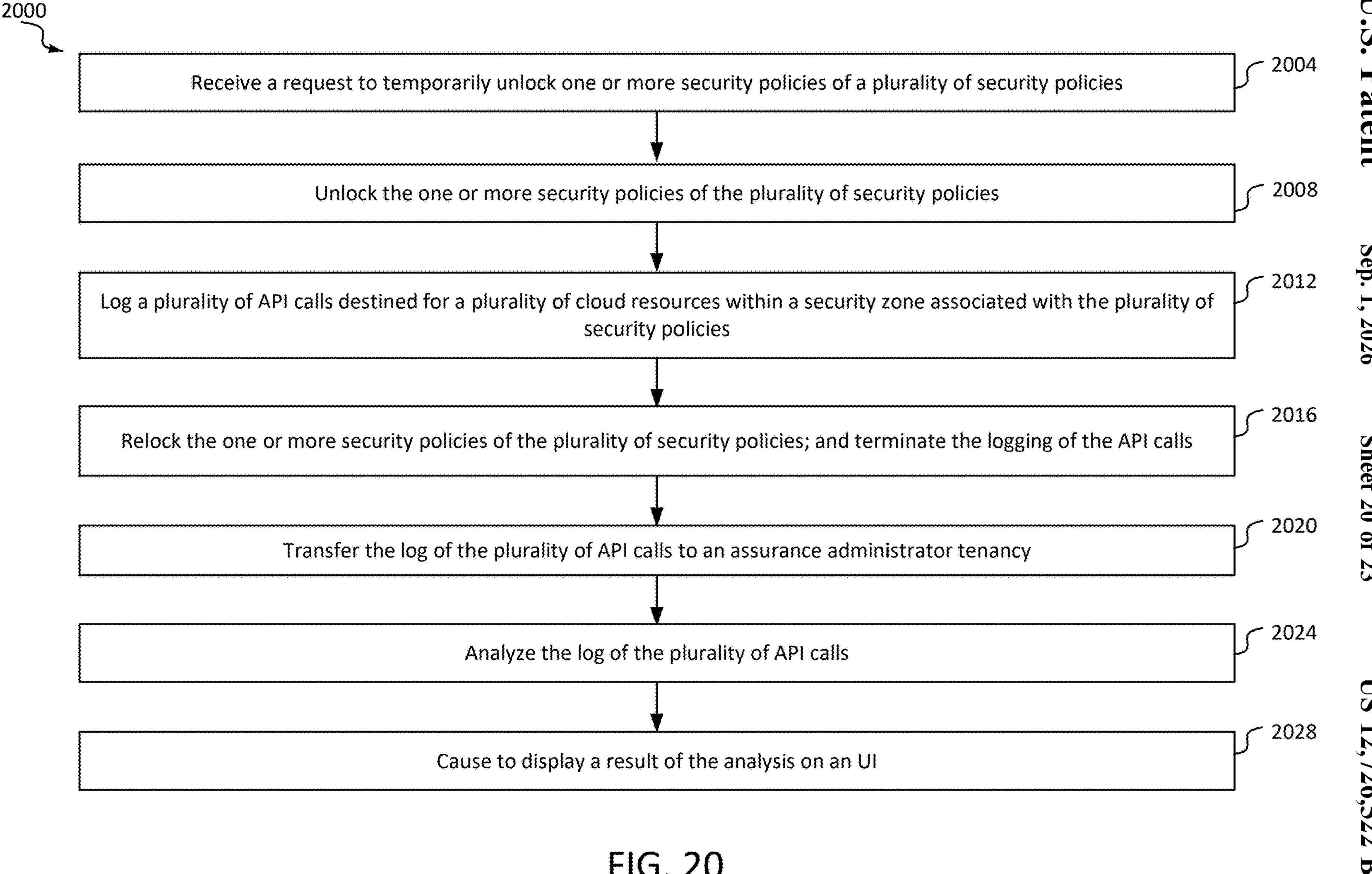
FIG. 20 illustrates a method for selectively logging API calls destined for a security zone of a customer tenancy within a cloud environment, while one or more security policies associated with the security zone is unlocked.

FIG. 20 illustrates a method 2000 for selectively logging API calls destined for a security zone 101 of a customer tenancy 150 within a cloud environment 1600, while one or more security policies associated with the security zone is unlocked. The method 2000 can be implemented within the cloud environment 1600 of FIG. 16.

At 2004, a request to temporarily unlock one or more security policies of a plurality of security policies 120*a*, . . . , 120R is received. The request may be received by the assurance administrator, the unlock plugin 1004, the security zone plugin 108, and/or the proxy service 104. Thus, the request at 2004 can be any of the requests at 1204, 1216, or 1220 of the flow diagrams 1700 or 1800 of FIG. 17 or 18, respectively. As described above, the plurality of security policies is applicable to a security zone of a tenancy within a cloud environment, such as the security zone 101 of the customer tenancy 150 within the cloud environment 1600 of FIG. 16. The security zone encompasses a plurality of cloud resources of the tenancy, such as cloud resources 102*a*, . . . , 102N within the security zone 101.

The method 2000 proceeds from 2004 to 2008. At 2008, the one or more security policies of the plurality of security policies are unlocked. The unlocking is performed by any of the unlock plugin 1004, the security zone plugin 108, and/or the proxy service 104, e.g., as described above with respect to FIG. 16.

The method 2000 proceeds from 2008 to 2012. At 2012, while the one or more security policies of the plurality of security policies are unlocked, a plurality of API calls destined for the plurality of cloud resources within the security zone are logged. The logging of the API calls may be performed by the unlock period activity monitoring service 1604. For example, the unlock period activity monitoring service 1604 generates and stores an API call activity log 1608 in a storage repository 1607 within a service tenancy 160.

Furthermore, while the one or more security policies of the plurality of security policies are unlocked, the proxy service 104 allows passage of one or more API calls to cloud resources within the security zone 101. For example, as described above with respect to FIG. 19, the proxy service 104 allows passage of a first plurality of API calls that do not violate any of the plurality of security policies associated with the security zone 101. In another example and as also described above with respect to FIG. 19, the proxy service 104 allows passage of a second plurality of API calls, which violate one or more of the plurality of security policies that are unlocked. In yet another example and as also described above with respect to FIG. 19, the proxy service 104 blocks passage of a third plurality of API calls, which violate another one or more of the plurality of security policies that are not unlocked (e.g., that remain locked).

Moreover, in an example and as described above with respect to FIG. 17, all API calls processed by the proxy service 104, when the one or more security policies are unlocked, are logged by the unlock period activity monitoring service 1604. In another example and as described above with respect to FIGS. 18-19, the above described second plurality of API calls, which violate the unlocked one or more security policies and which are nonetheless allowed passage by the proxy service 104, are logged by the unlock period activity monitoring service 1604. In a further example, the above described second and third plurality of API calls, which violate the unlocked one or more security policies and/or violate the other one or more security policies that remain locked, are logged by the unlock period activity monitoring service 1604.

In an example, for individual logged API calls, a corresponding API call type, a corresponding API call parameter, and/or a corresponding destination of the API call may be recorded or logged. Any other pertinent information associated with the API call (such as an origin of the API call, metadata associated with the API call, etc.) may also be logged by the unlock period activity monitoring service 1604.

The method 2000 proceeds from 2012 to 2016. At 2016, the one or more security policies of the plurality of security policies are relocked. The relocking may be performed by any of the unlock plugin 1004, the security zone plugin 108, and/or the proxy service 104, e.g., as described above with respect to FIG. 16.

Also at 2016 of the method 2000, the logging of API calls destined for the plurality of cloud resources within the security zone is terminated. The termination of the logging may be in response to, or immediately prior to, or simultaneously with relocking the one or more security policies.

The method 2000 proceeds from 2016 to 2020. At 2020, the log of the plurality of API calls are transferred to an assurance administrator tenancy. For example, referring to FIG. 16, the API call activity log 1608 is transferred from the storage repository 1607 in the service tenancy 160 to the storage repository 1611 in the assurance administrator tenancy 504. The transfer of the log of the plurality of API calls may be caused by the unlock period activity monitoring service 1604, in an example.

The method 2000 proceeds from 2020 to 2024. At 2024, the log of the plurality of API calls may be analyzed, e.g., by the analysis service 1612. For example, the analysis service 1612 analyzes the logged API calls, to ensure that the cloud customer did not transmit, during the unlock period, any API calls that were not agreed upon between the assurance administrator and the cloud customer. For example, the analysis service 1612 compares the above-described logged second plurality of API calls (e.g., which violate the unlocked security policies) of FIG. 19 with API calls that were pre-agreed upon between the assurance administrator and the cloud customer for transmission during the unlock period.

At 2028, a result of the analysis is caused to be displayed on an UI. For example, the analysis service 1612 causes the result of the analysis to be displayed on an UI. For example, if the above-described logged second plurality of API calls (e.g., which violate the unlocked security policies) of FIG. 19 does not match with API calls that were pre-agreed upon between the assurance administrator and the cloud customer for transmission during the unlock period, such a mismatch may be an indication of an anomalous or suspicious transmission of API calls during the unlock period. Accordingly, information pertinent to such a mismatch may be displayed on the UI. In an example, the UI is visible to personnel of the assurance administrator.

Computer System Architecture

Figure 21:
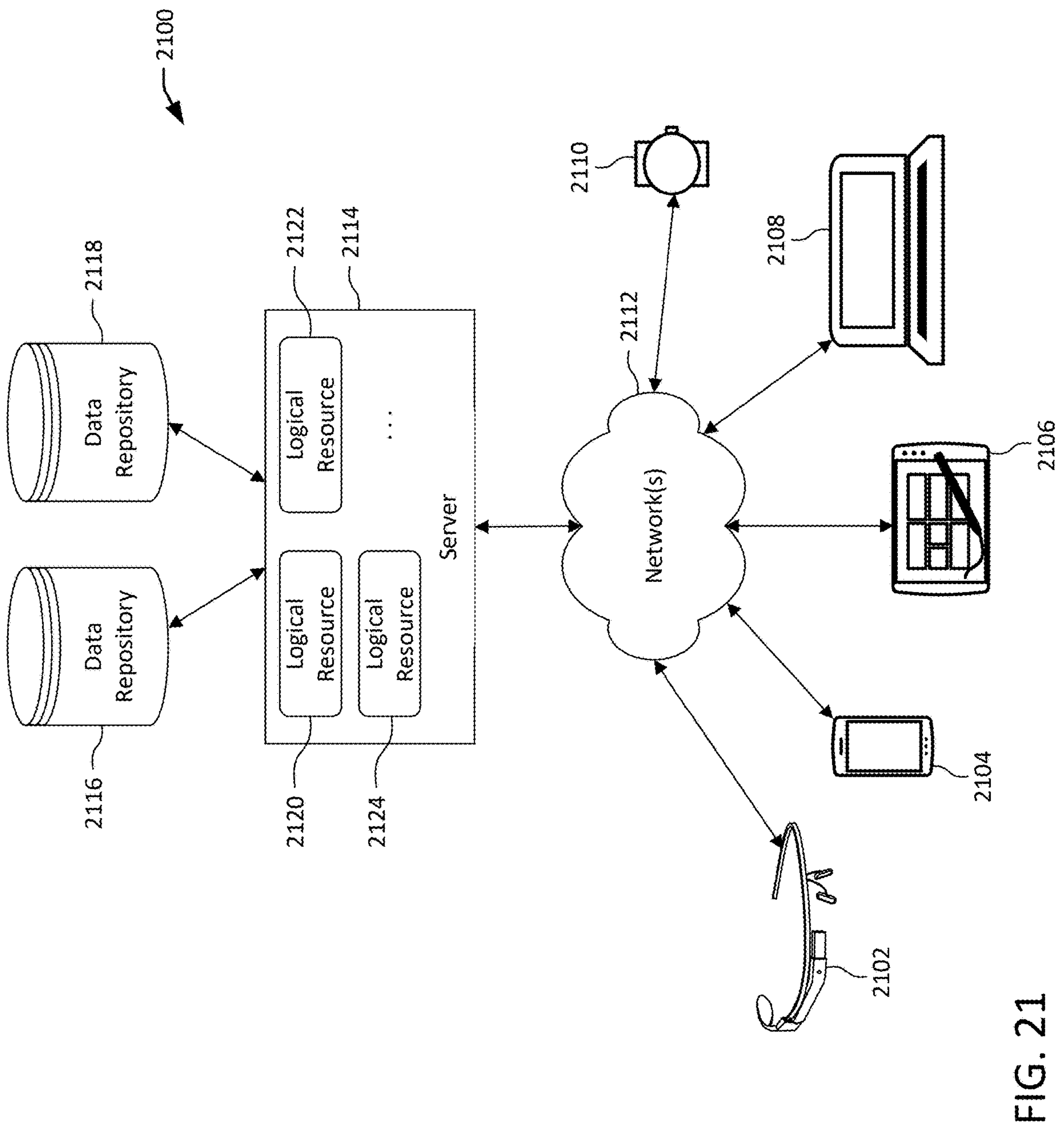
FIG. 21 depicts a simplified diagram of a distributed system for implementing certain aspects.
Figure 22:
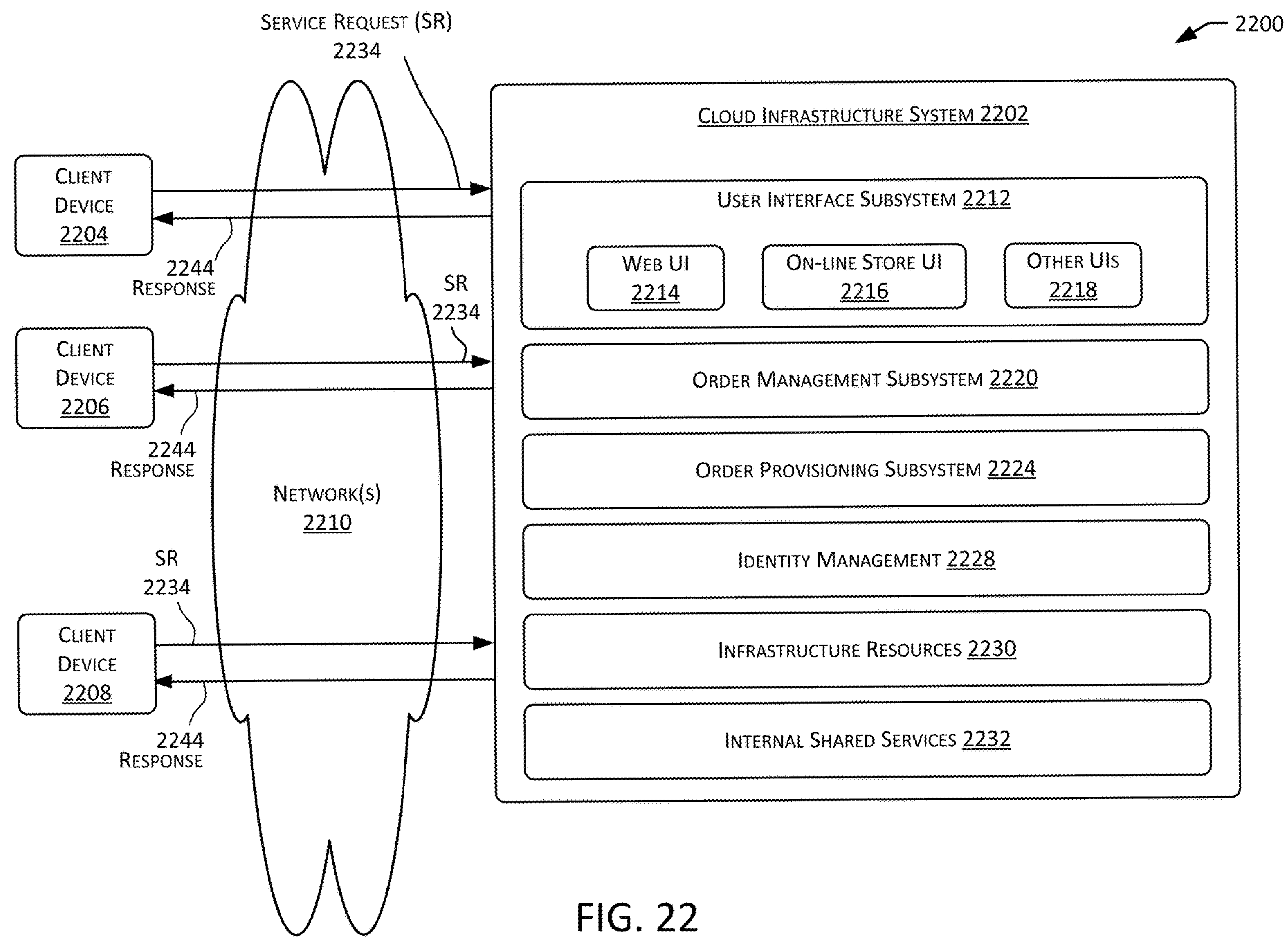
FIG. 22 is a simplified block diagram of one or more components of a system environment by which services provided by one or more components of an embodiment system may be offered as cloud services, in accordance with certain aspects.
Figure 23:
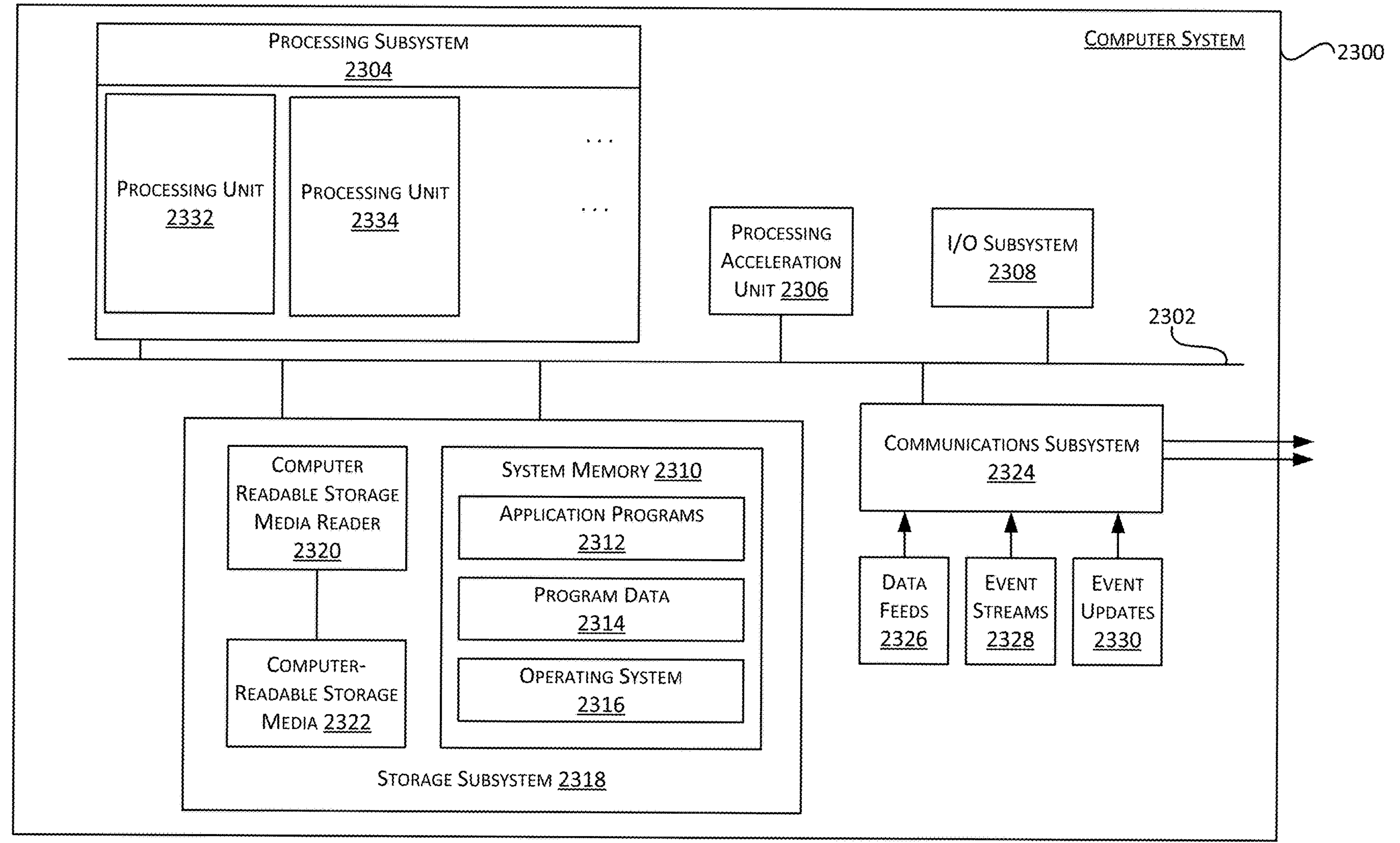
FIG. 23 illustrates an example computer system that may be used to implement certain aspects.

FIG. 21 depicts a simplified diagram of a distributed system 2100 for implementing an embodiment. In the illustrated embodiment, distributed system 2100 includes one or more client computing devices 2102, 2104, 2106, 2108, and/or 2110 coupled to a server 2114 via one or more communication networks 2112. Clients computing devices 2102, 2104, 2106, 2108, and/or 2110 may be configured to execute one or more applications.

In various aspects, server 2114 may be adapted to run one or more services or software applications that enable techniques for implementing security zones and associated security policies within a cloud environment, unlocking and relocking of security policies within the cloud environment, and/or activity monitoring during an unlocked state of one or more security policies within the cloud environment.

In certain aspects, server 2114 may also provide other services or software applications that can include non-virtual and virtual environments. In some aspects, these services may be offered as web-based or cloud services, such as under a Software as a Service (SaaS) model to the users of client computing devices 2102, 2104, 2106, 2108, and/or 2110. Users operating client computing devices 2102, 2104, 2106, 2108, and/or 2110 may in turn utilize one or more client applications to interact with server 2114 to utilize the services provided by these components.

In the configuration depicted in FIG. 21, server 2114 may include one or more components 2120, 2122 and 2124 that implement the functions performed by server 2114. These components may include software components that may be executed by one or more processors, hardware components, or combinations thereof. It should be appreciated that various different system configurations are possible, which may be different from distributed system 2100. The embodiment shown in FIG. 21 is thus one example of a distributed system for implementing an embodiment system and is not intended to be limiting.

Users may use client computing devices 2102, 2104, 2106, 2108, and/or 2110 for techniques for implementing security zones and associated security policies within a cloud environment, unlocking and relocking of security policies within the cloud environment, and/or activity monitoring during an unlocked state of one or more security policies within the cloud environment, in accordance with the teachings of this disclosure. A client device may provide an interface that enables a user of the client device to interact with the client device. The client device may also output information to the user via this interface. Although FIG. 21 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android™, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 2112 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 2112 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth™, and/or any other wireless protocol), and/or any combination of these and/or other networks.

Server 2114 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 2114 can include one or more virtual machines running virtual operating systems, or other computing architectures involving virtualization such as one or more flexible pools of logical storage devices that can be virtualized to maintain virtual storage devices for the server. In various aspects, server 2114 may be adapted to run one or more services or software applications that provide the functionality described in the foregoing disclosure.

The computing systems in server 2114 may run one or more operating systems including any of those discussed above, as well as any commercially available server operating system. Server 2114 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 2114 may include one or more applications to analyze and consolidate data feeds and/or event updates received from users of client computing devices 2102, 2104, 2106, 2108, and/or 2110. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2114 may also include one or more applications to display the data feeds and/or real-time events via one or more display devices of client computing devices 2102, 2104, 2106, 2108, and/or 2110.

Distributed system 2100 may also include one or more data repositories 2116, 2118. These data repositories may be used to store data and other information in certain aspects. For example, one or more of the data repositories 2116, 2118 may be used to store information for techniques for implementing security zones and associated security policies within a cloud environment, unlocking and relocking of security policies within the cloud environment, and/or activity monitoring during an unlocked state of one or more security policies within the cloud environment. Data repositories 2116, 2118 may reside in a variety of locations. For example, a data repository used by server 2114 may be local to server 2114 or may be remote from server 2114 and in communication with server 2114 via a network-based or dedicated connection. Data repositories 2116, 2118 may be of different types. In certain aspects, a data repository used by server 2114 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 2116, 2118 may also be used by applications to store application data. The data repositories used by applications may be of different types such as, for example, a key-value store repository, an object store repository, or a general storage repository supported by a file system.

In one embodiment, server 2114 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

FIG. X8 is a simplified block diagram of a cloud-based system environment which implements techniques for implementing security zones and associated security policies within a cloud environment, unlocking and relocking of security policies within the cloud environment, and/or activity monitoring during an unlocked state of one or more security policies within the cloud environment, in accordance with certain aspects. In the embodiment depicted in FIG. X8, cloud infrastructure system X802 may provide one or more cloud services that may be requested by users using one or more client computing devices X804, X806, and X808. Cloud infrastructure system X802 may comprise one or more computers and/or servers that may include those described above for server 2114. The computers in cloud infrastructure system X802 may be organized as general purpose computers, specialized server computers, server farms, server clusters, or any other appropriate arrangement and/or combination.

Network(s) X810 may facilitate communication and exchange of data between clients X804, X806, and X808 and cloud infrastructure system X802. Network(s) X810 may include one or more networks. The networks may be of the same or different types. Network(s) X810 may support one or more communication protocols, including wired and/or wireless protocols, for facilitating the communications.

The embodiment depicted in FIG. X8 is only one example of a cloud infrastructure system and is not intended to be limiting. It should be appreciated that, in some other aspects, cloud infrastructure system X802 may have more or fewer components than those depicted in FIG. X8, may combine two or more components, or may have a different configuration or arrangement of components. For example, although FIG. X8 depicts three client computing devices, any number of client computing devices may be supported in alternative aspects.

The term cloud service is generally used to refer to a service that is made available to users on demand and via a communication network such as the Internet by systems (e.g., cloud infrastructure system X802) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network X810 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system X802 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system X802 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system X802. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system X802. Cloud infrastructure system X802 then performs processing to provide the services requested in the tenant's subscription order. Cloud infrastructure system X802 may be configured to provide one or even multiple cloud services.

Cloud infrastructure system X802 may provide the cloud services via different deployment models. In a public cloud model, cloud infrastructure system X802 may be owned by a third party cloud services provider and the cloud services are offered to any general public tenant, where the tenant can be an individual or an enterprise. In certain other aspects, under a private cloud model, cloud infrastructure system X802 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system X802 and the services provided may be shared by several organizations in a related community. Various other models such as hybrids of the above mentioned models may also be used.

Client computing devices X804, X806, and X808 may be of different types (such as devices 2102, 2104, 2106, and 2108 depicted in FIG. 21) and may be capable of operating one or more client applications. A user may use a client device to interact with cloud infrastructure system X802, such as to request a service provided by cloud infrastructure system X802.

In some aspects, the processing performed by cloud infrastructure system X802 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system X802 for determining the intent of an utterance. The data used for this analysis may include structured data (e.g., data stored in a database or structured according to a structured model) and/or unstructured data (e.g., data blobs (binary large objects)).

As depicted in the embodiment in FIG. X8, cloud infrastructure system X802 may include infrastructure resources X830 that are utilized for facilitating the provision of various cloud services offered by cloud infrastructure system X802. Infrastructure resources X830 may include, for example, processing resources, storage or memory resources, networking resources, and the like.

In certain aspects, to facilitate efficient provisioning of these resources for supporting the various cloud services provided by cloud infrastructure system X802 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system X802 may itself internally use services X832 that are shared by different components of cloud infrastructure system X802 and which facilitate the provisioning of services by cloud infrastructure system X802. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system X802 may comprise multiple subsystems. These subsystems may be implemented in software, or hardware, or combinations thereof. As depicted in FIG. X8, the subsystems may include a user interface subsystem X812 that enables users of cloud infrastructure system X802 to interact with cloud infrastructure system X802. User interface subsystem X812 may include various different interfaces such as a web interface X814, an online store interface X816 where cloud services provided by cloud infrastructure system X802 are advertised and are purchasable by a consumer, and other interfaces X818. For example, a tenant may, using a client device, request (service request X834) one or more services provided by cloud infrastructure system X802 using one or more of interfaces X814, X816, and X818. For example, a tenant may access the online store, browse cloud services offered by cloud infrastructure system X802, and place a subscription order for one or more services offered by cloud infrastructure system X802 that the tenant wishes to subscribe to. The service request may include information identifying the tenant and one or more services that the tenant desires to subscribe to. For example, a tenant may place a subscription order for a chatbot related service offered by cloud infrastructure system X802. As part of the order, the client may provide information identifying the input (e.g. utterances).

In certain aspects, such as the embodiment depicted in FIG. X8, cloud infrastructure system X802 may comprise an order management subsystem (OMS) X820 that is configured to process the new order. As part of this processing, OMS X820 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS X820 may then invoke the order provisioning subsystem (OPS) X824 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS X824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system X802 may send a response or notification X844 to the requesting tenant to indicate when the requested service is now ready for use. In some instances, information (e.g., a link) may be sent to the tenant that enables the tenant to start using and availing the benefits of the requested services.

Cloud infrastructure system X802 may provide services to multiple tenants. For each tenant, cloud infrastructure system X802 is responsible for managing information related to one or more subscription orders received from the tenant, maintaining tenant data related to the orders, and providing the requested services to the tenant or clients of the tenant. Cloud infrastructure system X802 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system X802 may provide services to multiple tenants in parallel. Cloud infrastructure system X802 may store information for these tenants, including possibly proprietary information. In certain aspects, cloud infrastructure system X802 comprises an identity management subsystem (IMS) X828 that is configured to manage tenant's information and provide the separation of the managed information such that information related to one tenant is not accessible by another tenant. IMS X828 may be configured to provide various security-related services such as identity services, such as information access management, authentication and authorization services, services for managing tenant identities and roles and related capabilities, and the like.

FIG. X9 illustrates an exemplary computer system X900 that may be used to implement certain aspects. As shown in FIG. X9, computer system X900 includes various subsystems including a processing subsystem X904 that communicates with a number of other subsystems via a bus subsystem X902. These other subsystems may include a processing acceleration unit X906, an I/O subsystem X908, a storage subsystem X918, and a communications subsystem X924. Storage subsystem X918 may include non-transitory computer-readable storage media including storage media X922 and a system memory X910.

Bus subsystem X902 provides a mechanism for letting the various components and subsystems of computer system X900 communicate with each other as intended. Although bus subsystem X902 is shown schematically as a single bus, alternative aspects of the bus subsystem may utilize multiple buses. Bus subsystem X902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem X904 controls the operation of computer system X900 and may comprise one or more processors, application specific integrated circuits (ASICs), or field programmable gate arrays (FPGAs). The processors may be single core or multicore processors. The processing resources of computer system X900 can be organized into one or more processing units X932, X934, etc. A processing unit may include one or more processors, one or more cores from the same or different processors, a combination of cores and processors, or other combinations of cores and processors. In some aspects, processing subsystem X904 can include one or more special purpose co-processors such as graphics processors, digital signal processors (DSPs), or the like. In some aspects, some or all of the processing units of processing subsystem X904 can be implemented using customized circuits, such as application specific integrated circuits (ASICs), or field programmable gate arrays (FPGAs).

In some aspects, the processing units in processing subsystem X904 can execute instructions stored in system memory X910 or on computer readable storage media X922. In various aspects, the processing units can execute a variety of programs or code instructions and can maintain multiple concurrently executing programs or processes. At any given time, some or all of the program code to be executed can be resident in system memory X910 and/or on computer-readable storage media X922 including potentially on one or more storage devices. Through suitable programming, processing subsystem X904 can provide various functionalities described above. In instances where computer system X900 is executing one or more virtual machines, one or more processing units may be allocated to each virtual machine.

In certain aspects, a processing acceleration unit X906 may optionally be provided for performing customized processing or for off-loading some of the processing performed by processing subsystem X904 so as to accelerate the overall processing performed by computer system X900.

I/O subsystem X908 may include devices and mechanisms for inputting information to computer system X900 and/or for outputting information from or via computer system X900. In general, use of the term input device is intended to include all possible types of devices and mechanisms for inputting information to computer system X900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system X900 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem X918 provides a repository or data store for storing information and data that is used by computer system X900. Storage subsystem X918 provides a tangible non-transitory computer-readable storage medium for storing the basic programming and data constructs that provide the functionality of some aspects. Storage subsystem X918 may store software (e.g., programs, code modules, instructions) that when executed by processing subsystem X904 provides the functionality described above. The software may be executed by one or more processing units of processing subsystem X904. Storage subsystem X918 may also provide a repository for storing data used in accordance with the teachings of this disclosure.

Storage subsystem X918 may include one or more non-transitory memory devices, including volatile and non-volatile memory devices. As shown in FIG. X9, storage subsystem X918 includes a system memory X910 and a computer-readable storage media X922. System memory X910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system X900, such as during start-up, may typically be stored in the ROM. The RAM typically contains data and/or program modules that are presently being operated and executed by processing subsystem X904. In some implementations, system memory X910 may include multiple different types of memory, such as static random access memory (SRAM), dynamic random access memory (DRAM), and the like.

By way of example, and not limitation, as depicted in FIG. X9, system memory X910 may load application programs X912 that are being executed, which may include various applications such as Web browsers, mid-tier applications, relational database management systems (RDBMS), etc., program data X914, and an operating system X916. By way of example, operating system X916 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media X922 may store programming and data constructs that provide the functionality of some aspects. Computer-readable media X922 may provide storage of computer-readable instructions, data structures, program modules, and other data for computer system X900. Software (programs, code modules, instructions) that, when executed by processing subsystem X904 provides the functionality described above, may be stored in storage subsystem X918. By way of example, computer-readable storage media X922 may include non-volatile memory such as a hard disk drive, a magnetic disk drive, an optical disk drive such as a CD ROM, digital video disc (DVD), a Blu-Ray® disk, or other optical media. Computer-readable storage media X922 may include, but is not limited to, Zip® drives, flash memory cards, universal serial bus (USB) flash drives, secure digital (SD) cards, DVD disks, digital video tape, and the like. Computer-readable storage media X922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem X918 may also include a computer-readable storage media reader X920 that can further be connected to computer-readable storage media X922. Reader X920 may receive and be configured to read data from a memory device such as a disk, a flash drive, etc.

In certain aspects, computer system X900 may support virtualization technologies, including but not limited to virtualization of processing and memory resources. For example, computer system X900 may provide support for executing one or more virtual machines. In certain aspects, computer system X900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system X900. Accordingly, multiple operating systems may potentially be run concurrently by computer system X900.

Communications subsystem X924 provides an interface to other computer systems and networks. Communications subsystem X924 serves as an interface for receiving data from and transmitting data to other systems from computer system X900. For example, communications subsystem X924 may enable computer system X900 to establish a communication channel to one or more client devices via the Internet for receiving and sending information from and to the client devices. For example, the communications subsystem may be used to transmit a response to a user regarding the inquiry for a chatbot.

Communications subsystem X924 may support both wired and/or wireless communication protocols. For example, in certain aspects, communications subsystem X924 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem X924 can provide wired network connectivity (e.g., Ethernet) in addition to or instead of a wireless interface.

Communications subsystem X924 can receive and transmit data in various forms. For example, in some aspects, in addition to other forms, communications subsystem X924 may receive input communications in the form of structured and/or unstructured data feeds X926, event streams X928, event updates X930, and the like. For example, communications subsystem X924 may be configured to receive (or send) data feeds X926 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem X924 may be configured to receive data in the form of continuous data streams, which may include event streams X928 of real-time events and/or event updates X930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem X924 may also be configured to communicate data from computer system X900 to other computer systems or networks. The data may be communicated in various different forms such as structured and/or unstructured data feeds X926, event streams X928, event updates X930, and the like to one or more databases that may be in communication with one or more streaming data source computers coupled to computer system X900.

Computer system X900 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system X900 depicted in FIG. X9 is intended only as a specific example. Many other configurations having more or fewer components than the system depicted in FIG. X9 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A non-transitory computer-readable medium including instructions that when executed by one or more processors, cause a system including the one or more processors to perform operations including:

receiving a request to temporarily unlock one or more security policies of a plurality of security policies, wherein the plurality of security policies are applicable to a security zone of a tenancy within a cloud environment, the security zone encompassing a plurality of cloud resources of the tenancy;

unlocking the one or more security policies of the plurality of security policies;

while the one or more security policies of the plurality of security policies are unlocked, logging a plurality of application programming interface (API) calls destined for the plurality of cloud resources within the security zone, wherein prior to unlocking the one or more security policies and while the one or more security policies are locked, API calls destined for the plurality of cloud resources within the security zone are not logged;

detecting a triggering event to end the unlocking of the one or more security policies; and in response to detecting the triggering event, relocking the one or more security policies of the plurality of security policies.

2. The non-transitory computer-readable medium of claim 1, wherein the operations further include:

terminating the logging of API calls destined for the plurality of cloud resources within the security zone, in response to, or immediately prior to, or simultaneously with relocking the one or more security policies.

3. The non-transitory computer-readable medium of claim 1, wherein:

the one or more security policies that are unlocked are first one or more security policies;

the plurality of security policies comprises (i) the first one or more security policies that are unlocked, and (ii) second one or more security policies that remain locked while the first one or more security policies are unlocked; and the operations further include:

while the first one or more security policies are unlocked, receiving (i) first one or more API calls, each of which is in violation of a corresponding one of the first one or more security policies, (ii) second one or more API calls, each of which is in violation of a corresponding one of the second one or more security policies, and (iii) third one or more API calls, none of which is in violation of any of the plurality of security policies, wherein each of the first one or more, second one or more, and third one or more API calls are destined for corresponding one of the plurality of cloud resources within the security zone; and in response to unlocking the first one or more security policies, allowing passage of the first one or more API calls and the third one or more API calls to their respective destinations within the security zone.

4. The non-transitory computer-readable medium of claim 3, wherein logging the plurality of API calls destined for the plurality of cloud resources within the security zone comprises:

logging the first one or more API calls, without logging the second one or more API calls or the third one or more API calls.

5. The non-transitory computer-readable medium of claim 3, wherein logging the plurality of API calls destined for the plurality of cloud resources within the security zone comprises logging the first one or more API calls, and wherein the operations further include:

prior to unlocking the first one or more security policies, receiving a list of API calls that (i) are in violation with the first one or more security policies, and (ii) are to be transmitted while the first one or more security policies are to be unlocked;

subsequent to relocking the first one or more security policies, comparing (i) the list of API calls and (ii) the logged second one or more API calls; and causing to display a result of the comparison.

6. The non-transitory computer-readable medium of claim 3, wherein the operations further include:

while the first one or more security policies are unlocked and in response to the second one or more security policies remaining locked, blocking passage of the second one or more API calls to their respective destination within the security zone.

7. The non-transitory computer-readable medium of claim 3, wherein logging the plurality of API calls destined for the plurality of cloud resources within the security zone comprises:

logging the first one or more API calls and the second one or more API calls.

8. The non-transitory computer-readable medium of claim 3, wherein logging the plurality of API calls destined for the plurality of cloud resources within the security zone comprises:

logging the first, second, and third one or more API calls.

9. The non-transitory computer-readable medium of claim 1, wherein logging the plurality of API calls destined for the plurality of cloud resources within the security zone comprises:

while the one or more security policies of the plurality of security policies are unlocked, logging all API calls destined for the plurality of cloud resources within the security zone.

10. The non-transitory computer-readable medium of claim 1, wherein logging the plurality of API calls destined for the plurality of cloud resources within the security zone comprises:

receiving, while the one or more security policies of the plurality of security policies are unlocked, (i) first one or more API calls, each of which is in violation of a corresponding security policy of the one or more security policies, and (ii) second one or more API calls, none of which is in violation of the one or more security policies; and logging the first one or more API calls, without logging the second one or more API calls.

11. The non-transitory computer-readable medium of claim 1, wherein logging the plurality of API calls destined for the plurality of cloud resources within the security zone comprises:

logging an API call type, an API call parameter, and/or a destination of a first API call of the logged plurality of API calls.

12. The non-transitory computer-readable medium of claim 1, wherein the tenancy is a first tenancy, wherein the logging occurs within a second tenancy, and wherein the operations include:

transmitting the log of the plurality of API calls to a third tenancy, to cause analysis of the logged plurality of API calls.

13. A method comprising:

receiving a request to temporarily unlock one or more security policies of a plurality of security policies, wherein the plurality of security policies are applicable to a security zone of a tenancy within a cloud environment, the security zone encompassing a plurality of cloud resources of the tenancy;

unlocking the one or more security policies of the plurality of security policies;

while the one or more security policies of the plurality of security policies are unlocked, logging a plurality of application programming interface (API) calls destined for the plurality of cloud resources within the security zone, wherein prior to unlocking the one or more security policies and while the one or more security policies are locked, API calls destined for the plurality of cloud resources within the security zone are not logged;

detecting a triggering event to end the unlocking of the one or more security policies; and in response to detecting the triggering event, relocking the one or more security policies of the plurality of security policies.

14. The method of claim 13, further comprising:

terminating the logging of API calls destined for the plurality of cloud resources within the security zone, in response to, or immediately prior to, or simultaneously with relocking the one or more security policies.

15. The method of claim 13, wherein:

the one or more security policies that are unlocked are first one or more security policies;

the plurality of security policies comprises (i) the first one or more security policies that are unlocked, and (ii) second one or more security policies that remain locked while the first one or more security policies are unlocked; and the method further comprises:

while the first one or more security policies are unlocked, receiving (i) first one or more API calls, each of which is in violation of a corresponding one of the first one or more security policies, (ii) second one or more API calls, each of which is in violation of a corresponding one of the second one or more security policies, and (iii) third one or more API calls, none of which is in violation of any of the plurality of security policies, wherein each of the first one or more, second one or more, and third one or more API calls are destined for corresponding one of the plurality of cloud resources within the security zone; and in response to unlocking the first one or more security policies, allowing passage of the first one or more API calls and the third one or more API calls to their respective destinations within the security zone.

16. The method of claim 15, wherein logging the plurality of API calls destined for the plurality of cloud resources within the security zone comprises:

logging the first one or more API calls, without logging the second one or more API calls or the third one or more API calls.

17. The method of claim 15, wherein logging the plurality of API calls destined for the plurality of cloud resources within the security zone comprises logging the first one or more API calls, and wherein the method further comprises:

prior to unlocking the first one or more security policies, receiving a list of API calls that (i) are in violation with the first one or more security policies, and (ii) are to be transmitted while the first one or more security policies are to be unlocked;

subsequent to relocking the first one or more security policies, comparing (i) the list of API calls and (ii) the logged second one or more API calls; and causing to display a result of the comparison.

18. A system comprising:

one or more processors;

a storage repository; and one or more non-transitory computer-readable media storing instructions, which, when executed by the system, cause the system to perform operations including:

receiving a request to temporarily unlock one or more security policies of a plurality of security policies, wherein the plurality of security policies are applicable to a security zone of a tenancy within a cloud environment, the security zone encompassing a plurality of cloud resources of the tenancy;

unlocking the one or more security policies of the plurality of security policies;

while the one or more security policies of the plurality of security policies are unlocked, logging, within the storage repository, a plurality of application programming interface (API) calls destined for the plurality of cloud resources within the security zone, wherein prior to unlocking the one or more security policies and while the one or more security policies are locked, API calls destined for the plurality of cloud resources within the security zone are not logged;

detecting a triggering event to end the unlocking of the one or more security policies; and in response to detecting the triggering event, relocking the one or more security policies of the plurality of security policies.

19. The system of claim 18, wherein:

the tenancy is a first tenancy;

the storage repository is a first storage repository that is within a second tenancy; and the operations further include:

transferring the log of the plurality of API calls from the first storage repository within the second tenancy to a second storage repository within a third tenancy, to cause analysis of the logged plurality of API calls.

20. The system of claim 18, wherein:

the one or more security policies that are unlocked are first one or more security policies;

the plurality of security policies comprises (i) the first one or more security policies that are unlocked, and (ii) second one or more security policies that remain locked while the first one or more security policies are unlocked; and the operations further include:

while the first one or more security policies are unlocked, receiving (i) first one or more API calls, each of which is in violation of a corresponding one of the first one or more security policies, (ii) second one or more API calls, each of which is in violation of a corresponding one of the second one or more security policies, and (iii) third one or more API calls, none of which is in violation of any of the plurality of security policies, wherein each of the first one or more, second one or more, and third one or more API calls are destined for corresponding one of the plurality of cloud resources within the security zone; and in response to unlocking the first one or more security policies, allowing passage of the first one or more API calls and the third one or more API calls to their respective destinations within the security zone.

21. The non-transitory computer-readable medium of claim 1, wherein the triggering event comprises at least one of (i) determining an expiration of a predefined time period from an initiation of the unlocking of the one or more security policies, (ii) receiving a confirmation that one or more API calls, which were designated to be transmitted while the one or more security policies are unlocked, have been transmitted, and (iii) receiving a request to relock.

22. The non-transitory computer-readable medium of claim 1, wherein unlocking the one or more security policies comprises:

temporarily and at least in part lifting or bypassing the one or more security policies.

* * * * *